United States Patent [19]

Weslow et al.

[11] 4,215,410
[45] Jul. 29, 1980

[54] SOLAR TRACKER

[75] Inventors: Jerome H. Weslow, Rte. 4, St. Pat's Dr., Green Bay, Wis. 54303; James A. Rodrian, Menomonee Falls, Wis.

[73] Assignees: Jerome H. Weslow; Harold J. Weslow; Thomas A. Weslow, all of Green Bay; Paul R. Netzow; Roland Weslow, both of Hartland, all of Wis.

[21] Appl. No.: 10,660

[22] Filed: Feb. 9, 1979

[51] Int. Cl.² .................. G06F 15/46; F24J 3/02; G05D 1/12
[52] U.S. Cl. .................. 364/516; 126/424; 318/567; 364/107; 364/420
[58] Field of Search .......... 364/107, 420, 516, 518, 364/900; 318/575, 582, 567; 136/89 PC; 126/424, 425

[56] References Cited

U.S. PATENT DOCUMENTS

| | | | |
|---|---|---|---|
| 2,492,148 | 12/1949 | Herbold | 318/582 |
| 3,007,097 | 10/1961 | Shelley et al. | 318/575 |
| 3,571,567 | 3/1971 | Eckerman | 364/460 |
| 4,031,385 | 6/1977 | Zerlaut et al. | 126/425 |
| 4,034,194 | 7/1977 | Thomas et al. | 364/900 |
| 4,111,184 | 9/1978 | Perkins | 126/425 |
| 4,135,489 | 1/1979 | Jarvinen | 126/425 |
| 4,137,897 | 2/1979 | Moore | 126/425 |
| 4,147,414 | 4/1979 | Raser | 126/425 |

FOREIGN PATENT DOCUMENTS 2340576  9/1977  France ................ 126/425

OTHER PUBLICATIONS

WALRAVEN: Calculating the Position of the Sun Solar Energy, vol. 20, pp. 393-397, Pergamon Press, 1978.
CARDEN: Steering a Field of Mirrors Using a Shared Computer Based Controller, Solar Energy, vol. 20, pp. 343-355, 1978.
EDWARDS: Computer Based Sun Following System, Solar Energy, vol. 21, pp. 491-496, 1978.
SEIM: Numerical Interpolation for Microprocessor-Based Systems.

*Primary Examiner*—Felix D. Gruber
*Attorney, Agent, or Firm*—Ralph G. Hohenfeldt

[57] ABSTRACT

An open loop servo controller for controlling motors which drive a solar energy utilizing device about its azimuth and altitude axis to track the sun. The controller has a central processor and elements for inputting data corresponding with the present day of the year, the hour of the day, the minute of the hour and with the latitude and longitude of the device installation. Memories store program data, and tables of data corresponding with the declination of the sun on any day and of other mathematical functions. The processor uses the data to calculate the azimuth and altitude angles of the sun itself within every minute of the day and causes signals to be produced which result in motor controllers causing the motors to turn the device through azimuth and altitude axes angles corresponding with the calculated angles.

16 Claims, 29 Drawing Figures

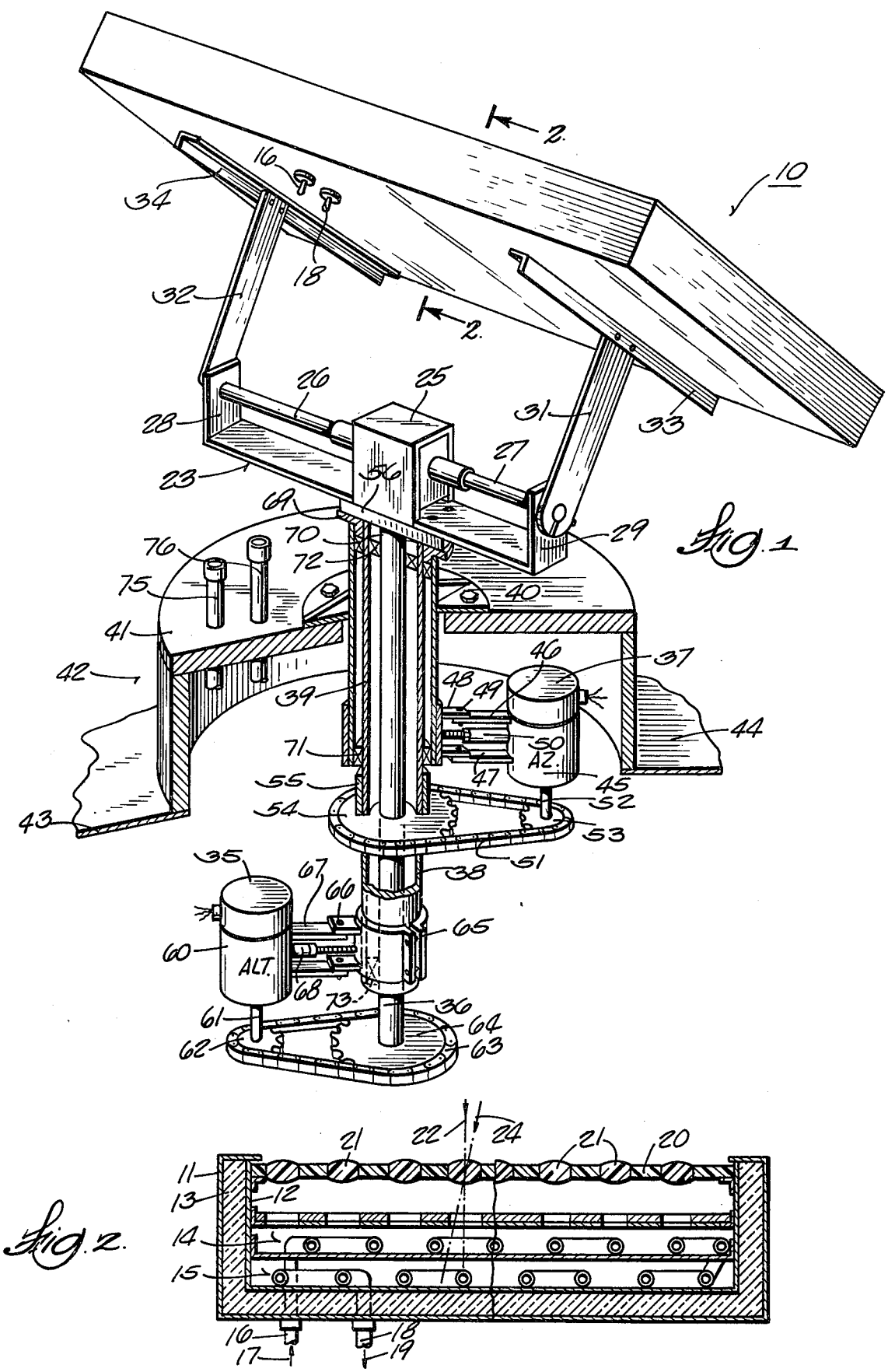

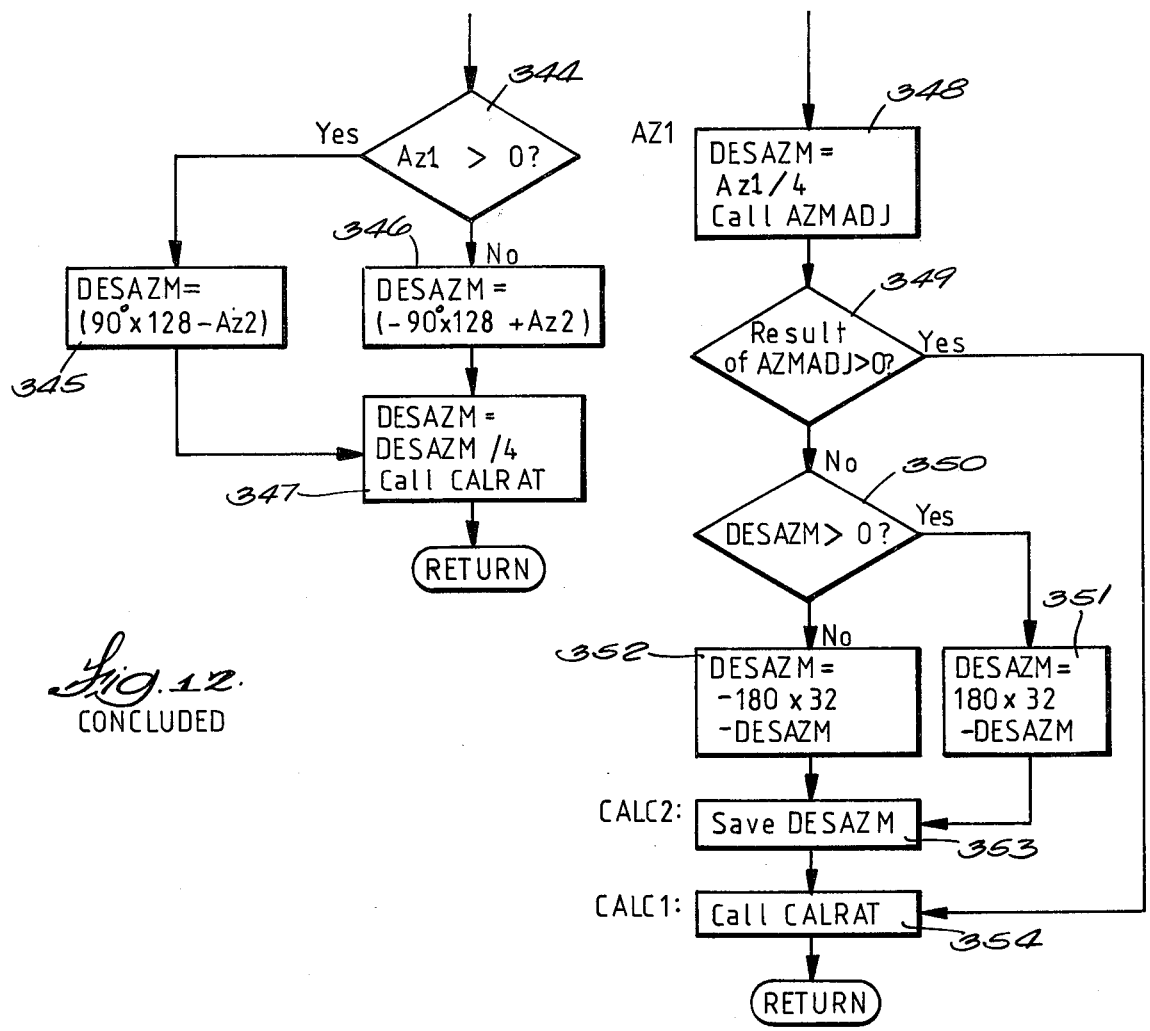
Fig. 12. CONCLUDED

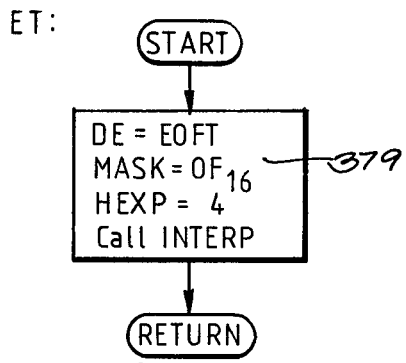
Fig. 20
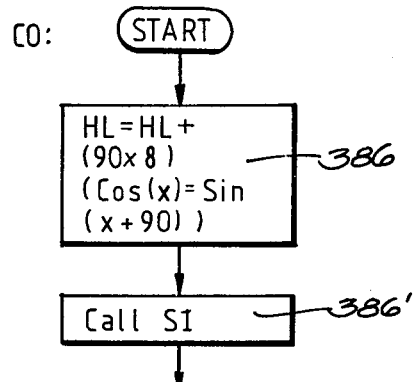
Fig. 22.
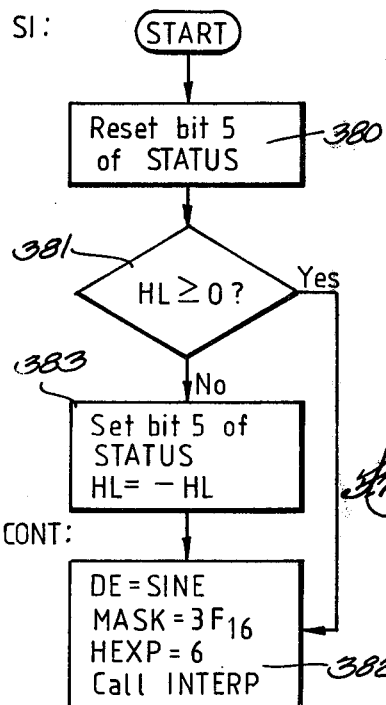
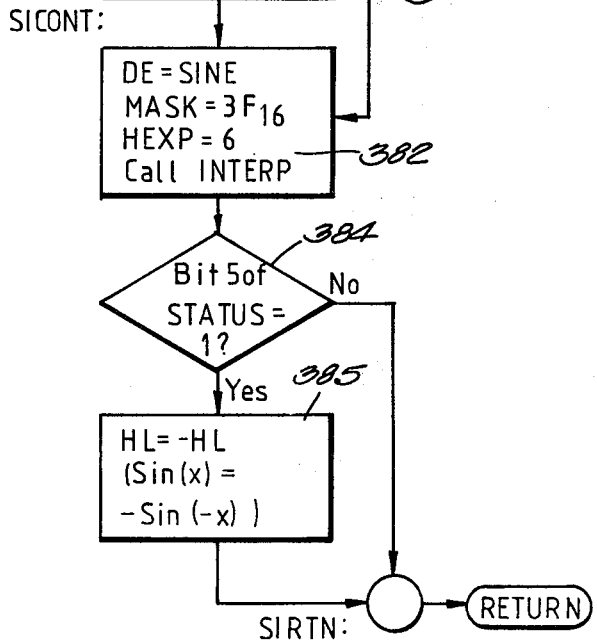
Fig. 21
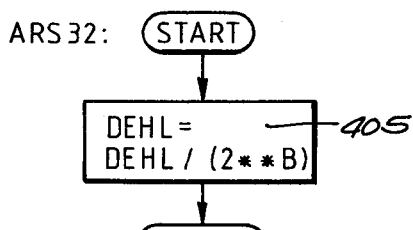
Fig. 26
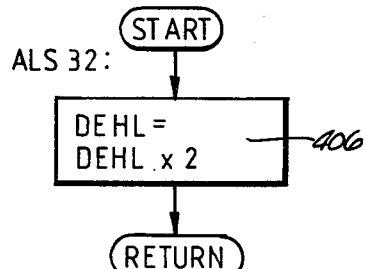
Fig. 27

SOLAR TRACKER

This invention relates to a controller for causing a solar energy collector such as a concentrator, a flat plate collector or a photovoltaic converter to track the sun and maintain an optimum angle of incidence between the rays of the sun and the collector.

Solar energy collectors perform most efficiently when the incident rays of the sun are perpendicular to the absorbing surface. Since the position of the sun is constantly changing, it is necessary to reposition the absorbing surface continually to maintain perpendicularity. Various collector drive mechanism and controls have been used for tracking the sun. One known type of solar tracking system uses a mechanical or a synchronous motor clock to turn the collector for maintaining the proper altitude (the angle between horizontal and the sun) and azimuth (the angle between the meridian and the sun). During the winter months the earth is nearest to the sun and moves faster than it does during the summer months when it is farther from the sun. The sun's ecliptic is angular to the celestial equator so the sun's transit time is nonuniform, that is, it is longer when it is nearer the solstices and moving more parallel to the equator and shorter when it is near the equinoxes and moving at a greater angle to the celestial equator.

"Mean time" was adopted to achieve better uniformity. Mean time is based on the average time that it takes the sun to execute its diurnal movement over the course of a year. When the "mean sun" crosses the local celestial meridian it is reckoned as local mean time noon or the twelfth hour of local mean time. The difference between apparent solar time and mean solar time is the equation of time (E). The two times agree only four times per year. The equation of time is mentioned here because it has some significance to the new method of tracking disclosed herein as will be evident later in the discussion.

Another type of solar tracker which is now used most frequently employs optical sensors to determine the instantaneous position of the sun. Deviations from true alignment with the sun cause the sensors to produce differential error signals that are fed into a closed loop servo system which, through a feedback circuit, controls a motor to drive the collector until the deviation or error signal is nulled.

Optical feedback systems avoid the problem of having to compensate for variations in the sun's transit path and transit speed but they have other disadvantages. One is that during the night the collector must be repositioned eastward by some means other than the optical tracking device. Another is that when the sky is overcast the sensors have nothing to use as a reference and tracking stops. On some occasions, such as under partly cloudy conditions, the sensors may see a cloud that is highly illuminated by diffusion in which case they may go to it as a reference point and use it as a basis for tracking. When the sky clears, an optical tracking circuit may not be able to lock onto the sun again, especially if a substantial deviation has occurred while the sun was occluded. Also, if an altitude-azimuth mount is used, the shortest path tracking that an optical feedback circuit would generate may cause the collector to flip upside down at about noon. Some solar tracking devices, such as in U.S. Pat. No. 4,031,385 combine optical sensing and a clock drive. When the sun is not in view, the photosensor circuitry is inactivated or nulled and the clock takes over the driving function. The clock is inactivated when the sun reappears.

It is especially important to track the sun accurately when solar energy concentrators are used. A concentrator uses a lens or lenses to focus a concentrated image of the sun on a heat exchange surface such as conduit or tubing through which a fluid which is to be heated flows. The image will only be properly focused and aligned when the optical axes of the lenses are parallel with the central ray of the sun. Even a relatively minor angular error between the optical axis and the sun will result in the focal spot being shifted to a point where heat transfer rate is diminished. An error of plus or minus a half degree would be acceptable. However, known clock driven trackers and optical trackers of which applicant is aware are incapable of providing this accuracy. It might be possible to compensate a clock drive system for conforming to the irregularities of the sun's motion and to its changing transit path but only with very complex means. Moreover, each tracker would have to have its own clock drive since it is not easy to develop a clock drive system which will produce adequate torque for driving one or more relatively heavy concentrators with a single controller.

Clock based tracking systems lack the ability to correct themselves for operating at different latitudes and longitudes. Even if some means for correcting is used, it is usually for one location of the concentrator and substantial modifications must be made for installations at other latitudes and longitudes.

Known optical trackers function best at latitudes more remote from the equator. In such cases the upper end of the concentrator or other converter is inclined northwardly from the vertical axis and there is not much change in the altitude angle as the concentrator is swung from horizon to horizon. When a concentrator is located at a latitude within 23.5° of the equator or near the equator where the sun rises almost due east and sets almost due west the concentrator must have its absorbing surface presented substantially vertically and due east or north of east in the morning, for instance. Under these circumstances the lower end of the concentrator should be trailing or oriented easterly and its upper end should be leading or west. When the sun reaches the zenith or zero meridian the lower end of the concentrator is still on the east side and the upper end is still on the west side. However, as the sun nears the meridian around noon the concentrator should rotate about the azimuth axis so that as the concentrator aims toward the west following noon its lower end will be toward the west and its upper end toward the east so that between noon and sunset, when the concentrator moves toward vertical again, its lower end will be down as should be the case with a device through which fluid is pumped. Known optical and clock driven trackers are incapable of performing this maneuver. Optical solar trackers may even start to hunt at noon and correct in the wrong direction, thus causing a perpendicularity error which is in excess of its usual error and far greater than a tolerable error of no more than one-half degree for a concentrator which uses optics.

SUMMARY OF THE INVENTION

An object of the present invention is to overcome the aforementioned and other disadvantages of clock and optically controlled trackers.

Another object is to provide a tracker controller which does not depend on the sun to be in view for tracking, nor depend on an ordinary civil time clock drive for tracking, nor require any closed loop servo system, but instead employs an open loop microprocessor controlled system which simply requires five input parameters, namely, the longitude and latitude of the concentrator, the day of the year, the hour of the day and minute of the hour for calculating and signalling the altitude and azimuth angles which the concentrator should be at to keep it perpendicular to the sun day after day and year after year unless the system is shut down for some reason in which case it is a further object to reset it automatically.

Another object is to enable accurate maintenance of the altitude and azimuth angles of a multiplicity of solar concentrators or collectors with a single controller. A correlative of this object is to provide for the possibility of having a single controller located at a central station for controlling azimuth and altitude drive motors on remotely located solar energy devices by transmitting control signals over telephone lines or radio links.

Another object of the invention is to provide a controller which will maintain a solar energy collector to within $\pm\frac{1}{4}$ of a degree or less from perpendicularity with the sun's rays at all times during the day and regardless of the latitude and longitude of the installation.

Another object is to provide a novel solar collector mounting and drive system for keeping a collector aimed directly at the sun in response to signals from the new controller.

Another object is to provide a controller that will prevent a fluid conducting solar energy collector from being misoriented upside-down.

In accordance with the invention, a single controller may be used for causing one or more remotely located solar energy collectors to track the sun and to maintain an optimum angle of incidence, that is, substantial perpendicularity, between the rays of the sun and the collector surfaces. The controller includes a central processing unit (CPU) which may be based on a microprocessor. The controller is provided with means for entering data representative of (1) the latitude, (2) the longitude of the solar collector installation, (3) the Julian calendar day of the year, (4) the hour of the day on a 24-hour standard time basis, and (5) the minute in the hour. The computer uses this input data in algorithms that result in the output of signals to the azimuth and altitude drive motors which cause the collector to be aimed at the sun at all times between sunrise and sunset. When the controller is first started and after sunset each day the controller goes into a reset routine which causes the azimuth drive motor to drive the collector from whatever position it is in to an easternmost or azimuth-home position such as plus 120° east of the local meridian where the drive stops. During reset the altitude motor also drives until the altitude reaches 0°, that is, the concentrator is vertical or in altitude-home position. Limit switches are used in the illustrated embodiment to stop driving when the concentrator is home and to provide a known point for initialization. The controller, by virtue of its program, then causes the azimuth and altitude motors to drive the concentrator or collector until it is oriented to the sun. From that time on, the controller maintains tracking until sunset without any feedback from any sensors of the sun being required.

A further feature of the invention is that if there is a power failure to the motor drive circuit, system timing and other logic is maintained under battery power but the collector stops at that time wherever it is. When power is restored, all collectors which are controlled by the controller, automatically go to their calculated azimuth and altitude angles which results in the collector or collectors being aligned with the sun again.

How the foregoing objects and other specific objects are achieved will appear in the detailed description of an illustrative embodiment of the invention which will now be set forth in reference to the drawings.

DESCRIPTION OF THE DRAWINGS

FIG. 1 shows a solar collector of the concentrator type together with its azimuth and altitude drive systems which are controllable with the new solar tracker controller;

FIG. 2 is a vertical section through the concentrator taken on the line 2—2 in FIG. 1;

FIGS. 14-29 are flow charts for various subroutines used in the preceding flow charts; they appear and are correspondingly identified in various places in the appended program listing.

DESCRIPTION OF A PREFERRED EMBODIMENT

Solar Collector and Drive Mechanism

Figure 3:
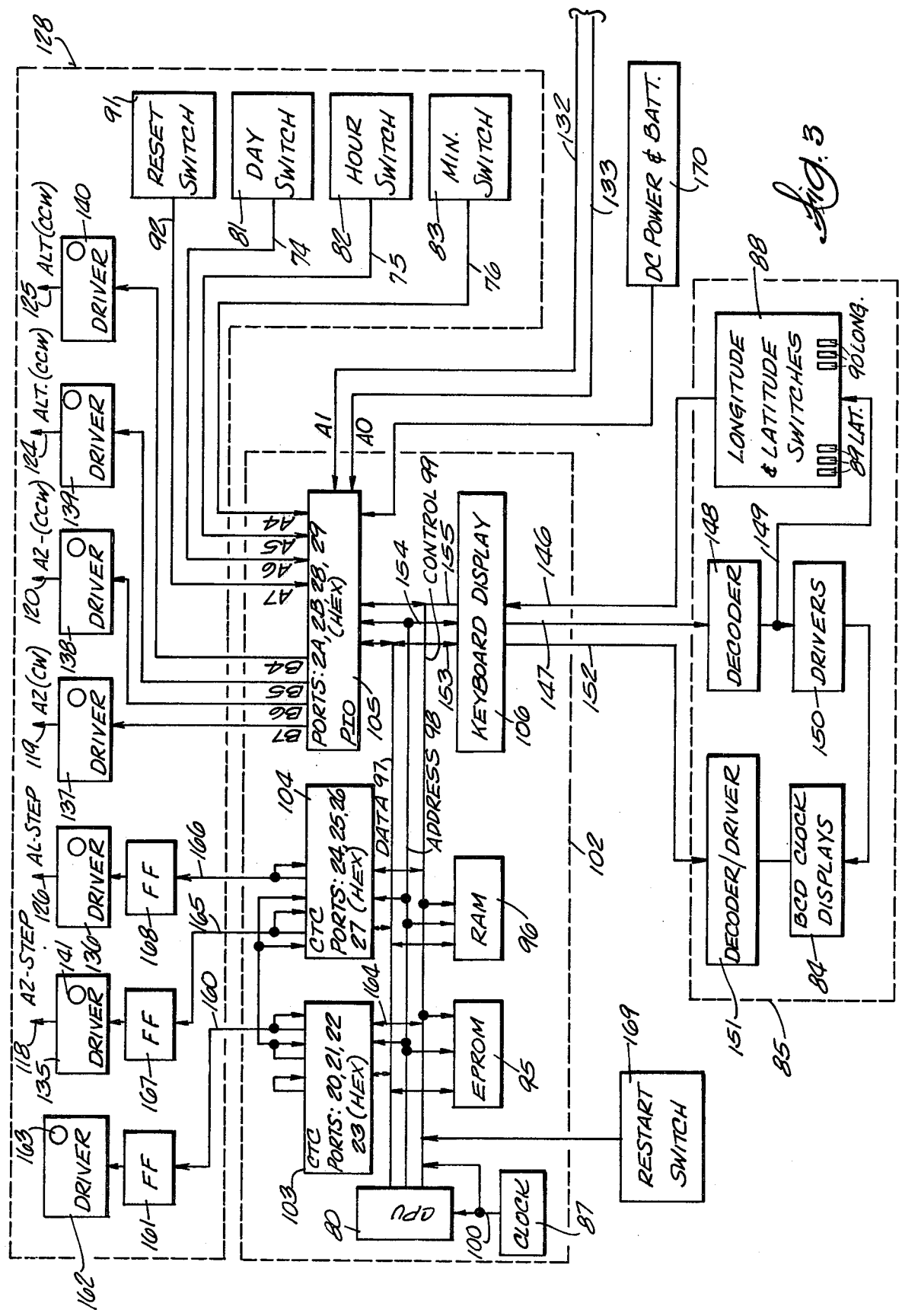
FIG. 3 is a block diagram of the solar tracker controller.

FIG. 1 shows a solar energy concentrator and a drive mechanism for causing the concentrator to track the sun and remain perpendicular to its central ray. The concentrator is marked 10 in FIG. 1. A vertical section through the concentrator is shown in FIG. 2. A typical concentrator with which the new drive mechanism and tracking controller have been used is shown in U.S. patent application Ser. No. 812,944, filed July 5, 1977, now U.S. Pat. No. 4,137,899. This concentrator is incorporated by reference for providing an example of one type of solar energy collector with which the new controller may be used. However, it should be understood that the new drive mechanism and new controller may be used with any collector that uses lenses or other optical elements to focus the sun and it may be used with flat plate or other types of solar collectors as well.

A section through the illustrative concentrator unit is shown in FIG. 2. It comprises a sheet material housing 11 and a liner 12 with insulation 13 between the housing and liner. Two stages of series connected coils, 14 and 15 are shown disposed one above the other within the unit. Fluid which is to be heated enters the inlet 16 of one of the coils in a flow direction indicated by the arrow 17 and fluid which has been heated in the coils flows from an outlet 18 in the direction indicated by the arrow 19. Mounted in the top of the collector is a transparent plastic sheet 20 in which an array of lenses such as 21 are embedded. The lenses are distributed over the area of the sheet so their focal spots will be formed periodically on the surfaces of the tubing which comprises the coils. The optical axis for one of the lenses is indicated by a dashed line 22. The new controller and drive mechanism function to maintain the optical axes of all the lenses coincident with the central ray of the sun. If the concentrator were not driven substantially continuously, the incoming rays of the sun would be at an angle with respect to the optical axis as indicated for one position by the dotted line 24. An extension of this ray or line 24 shows that the lens will not focus the sun properly on the coils in which case heating efficiency is reduced.

In FIG. 1, the concentrator and its support and drive mechanisms are shown somewhat schematically. Concentrator 10 is mounted for rotation in a horizontal plane about a vertical axis which is the azimuth axis and is mounted for pivoting about a horizontal axis which is the altitude axis. Concentrator 10 is mounted on a cross arm 23. The altitude axis is the axis of a cross shaft comprised of two parts, 26 and 27 which extend out of a gear box 25. Shafts 26 and 27 are journaled in upstanding ends 28 and 29 of the cross arm 23. Concentrator 10 is coupled to the cross shafts 26 and 27 with a pair of clamping arm members 31 and 32 which are fastened to angle members 33 and 34 which, in turn, are fastened to concentrator 10.

A stepping motor 35 drives a vertical shaft 36 which, when rotated, turns the concentrator about its horizontal or altitude axis which coincides with the axis of shafts 26 and 27. Another stepping motor 37 drives a vertical tubular shaft 38 which, when rotated, turns the concentrator on its vertical or azimuth axis.

The main support for the concentrator and its drive mechanism is a member 39 which is stationary and concentric with both altitude drive shaft 36 and azimuth drive shaft 38. Tubular member 39 in this particular design, has a mounting flange 40 welded to it. Flange 40 is supported on the top 41 of a curb box which is generally designated by the numeral 42. The curb box is used for mounting in cases where the concentrators are located on the roof of a building, for example, but other types of mountings may be used for roof or ground level installations. The outside roof surface is indicated in FIG. 1 by lines 43 and 44.

The drive system for the azimuth or vertical axis of the solar tracker will now be considered in detail. As previously indicated, the azimuth drive uses a stepping motor 37. The stepping motor is coupled with a speed reducer 45. The speed reducer has support arms 46 and 47 extending from it. These arms are, in this example, bolted to a bracket 48 by means of bolts such as the one marked 49 which pass through elongated holes to permit adjustment. Bracket 48 is fixed to stationary outside tubular member 39. A turnbuckle or jack bolt 50 extends between bracket 48 and speed reducer 45. Jack bolt 50 is used for forcing the azimuth motor and reducer assembly outwardly from fixed bracket 48 to establish the proper tension on a drive chain 51 before bracket bolts 49 are tightened. Output shaft 52 of speed reducer 45 has a small sprocket 53 fastened to it to drive chain 51. The chain engages with a large sprocket 54 which is fastened to tubular azimuth shaft 39 by means of a clamp 55 which is fastened to sprocket 54. The upper end of a tubular azimuth shaft 38 is fastened to a member 56 which is, in turn, fastened to cross arm 23 so that when the azimuth shaft turns, the cross arm 23 will swing in a horizontal plane about the vertical azimuth axis. The range of azimuth axis movement is desirably from an angle which is 120° east of south or from the meridian and is reckoned as a positive 120°, to an angle of about 120° west of south which is reckoned as a negative or minus 120° for the purpose of calculations which will be discussed later. Allowing for driving more than 90° on each side of the meridian or due south allows the solar tracker to be used at any latitude on the earth even where the sun rises and sets north of due east and due west, respectively. As will be explained later, when the azimuth axis is driven east through a positive angle of near 120°, a limit switch, used in this embodiment, is encountered and when it opens the azimuth drive is established in home position. Home position could also be determined by having the CPU keep track of the number of drive motor steps in either direction from a reference point. Home position provides a reference point for use in azimuth and altitude angle calculations. The altitude angle, that is, the angle between the horizontal and the direction in which the sunlight input side of the concentrator is pointed must be changed slightly each day to account for the change in the sun's path relative to horizontal from day to day.

The altitude drive motor 35 also has a speed reducer 60. The reduction ratio of altitude motor speed reducer 60 may or may not be the same as the ratio of the azimuth motor speed reducer 45 but this can be accounted for in the computer program as will be evident later. The altitude motor speed reducer output shaft 61 has a small sprocket 62 that drives a chain 63 which is engaged with a large sprocket 64. Sprocket 64 is fastened to altitude drive shaft 36 which is concentric with azimuth shaft 38. The altitude motor 35 and its speed reducer 60 are mounted directly on azimuth shaft 38 so the altitude motor will swing in a horizontal plane as the azimuth shaft turns. Altitude axis shaft 36 extends into gear box 25 where, as with appropriate gears, not shown, rotation of altitude shaft 36 about a vertical axis is converted to rotation about a horizontal axis coincident with cross shafts 26 and 27. Thus, when altitude shaft 36 is driven rotationally, cross shafts 26 and 27 rotate and cause the concentrator 10 to be driven to the altitude angle which is dictated by command signals that are given to the altitude drive motor 35.

A split clamp 65 is used to mount the altitude drive motor to azimuth shaft 38. Clamp 65 has a pair of arms 66 extending from it which are bolted to a corresponding pair of arms such as the one marked 67 which are fastened to speed reducer 60. As in the case of the azimuth motor, a jack bolt 68 is used to adjust the position of the altitude motor for obtaining proper tension in drive chain 63.

Having the altitude drive motor 35 carried by the azimuth shaft 38 is an important feature of the tracker drive system. This can be appreciated if one considers what happens when the azimuth and altitude motors are each on their own stationary mountings. In such case, when the altitude motor drives, a reactive force is transmitted to the azimuth drive which tends to turn the concentrator on its azimuth axis and, in any event, puts a stress on the azimuth drive system.

The weight of the cross arm 23 assembly and the concentrator 10 which it supports is imposed on a thrust bearing 69 which transmits the thrust to stationary outer tubular member 39. A pair of sleeve bearings 70 and 71 maintain azimuth shaft 38 concentric with stationary tubular member 39. An upper sleeve bearing 72 and a lower one 73 maintain altitude shaft 36 concentric with azimuth shaft 38. Lower sleeve bearing 73 is depicted near the lower end of the azimuth shaft 38 at a level within altitude motor support clamp 65.

Home position for the altitude axis means that the concentrator 10 is oriented with its front face vertical. Thus, when the concentrator is reset to home position its azimuth is at +120° east of south or the meridian and its elevation is vertical or at an angle of 0° with respect to vertical. The altitude axis is also provided with a limit switch which provides a reference point for computer calculations of altitude as will be explained.

A pair of pipes 75 and 76 are shown extending through the top of curb box 42. These pipes are coupled by means of hoses, not shown, to the fluid inlet and outlet fittings 16 and 18 on the underside of concentrator 10 to provide for fluid circulation through the series connected coils 14 and 15 of the concentrator.

Controller Circuitry

The circuit diagram for the new controller which keeps one or more solar concentrators perpendicular to the sun is shown in FIG. 3. This controller uses a central processing unit (CPU) containing a microprocessor, designated generally by the reference numeral 80 which calculates the azimuth and altitude angular position the concentrators should be at and which ultimately causes the drive signals for the azimuth motor 37 and the altitude motor 35 to be produced for driving the concentrators to that position. As indicated earlier, the controller is an open loop system. It uses five input parameters which are introduced by the operator. These parameters, in the preferred embodiment, are the day of the year, hour of the day, minute of the hour and the latitude and longitude at which the solar collector is located. The time is introduced in terms of standard time. The longitude parameter could be represented in terms of time, if the program presented later were suitably modified, since longitude is, in a sense, time reckoned from the zero or Greenwich meridian. The algorithm used by the CPU, which includes microprocessor 80, to calculate the proper altitude and azimuth angles of the controller will be discussed later.

Although various brands of CPUs could be used to implement the controller, by way of example and not limitation, a CPU similar to the one designated as the Z-80 by Zilog, Inc. was used. More specifically, the CPU was obtained from Mostek Corp. which designates it as Part No. MK3880. The complete instruction set for software and the timing diagrams for hardware are set forth in "Mostek Z-80 Technical Manual" for the "MK3880 Central Processing Unit," dated August, 1976.

Assume now that one or more solar collectors or concentrators are installed and ready for operation by one of the new programmed, open loop tracker controllers. The first thing an operator would do to condition the controller for driving the azimuth and altitude motors would be to introduce the standard time parameters for the time zone in which the concentrators are installed. In the upper right portion of FIG. 3 there are a day setting switch 81, an hour setting switch 82 and a minute setting switch 83. These parameters are inputted to the CPU by pressing and holding the switches and watching the displays change step-by-step. The day, hour and minute are displayed in a binary coded decimal (BCD) clock display which is symbolized in the lower portion of FIG. 3 by a block marked 84. The display board is indicated by a dashed line rectangle 85.

The operator gets visual feedback from the displays as the day, hour and minute switches are operated. The operator knows the number of the calendar day of the year in the series of 0–366. He presses day switch 81 until the present day number appears in the clock display 84. The day of the year is one of the parameters used by the CPU in making its azimuth and altitude motor drive calculations. As the day switch is pressed the days are incremented every half second, which is about the right speed for the operator to view the day in the display comfortably, but the increment rate could be different if desired.

The hour parameter in terms of 24-hour time is similarly inputted by pressing hour switch 82. The hour of the day can be obtained from any ordinary clock which provides standard time.

The minute of the day is inputted by pressing minute switch 83 until the present minute, as determined from an accurate clock or radio time signal, appears in display 84. Minute switch 83 is preferably a three-way switch which allows the minute to be incremented or decremented so that only one step may have to be taken if, after the clock runs for a month or so, it is found necessary to correct the minute by only one step. In an actual embodiment, the day, hour and minute switches increment their 7-segment BCD clock displays at a stepping rate of one per half-second during the setting operation.

The day, hour and minute switches 81, 82 and 83 have output lines 74, 75 and 76, respectively. These lines may ordinarily have a high logic voltage state and when they are depressed, they may switch to a low logic or logic 0 level which is sensed by the circuitry and results in the time parameters being indexed and stored.

Time is kept and the system is synchronized with a crystal time base or clock indicated by the block 87 adjacent microprocessor CPU 80. In this illustrative embodiment, clock 87 has a pulse rate of 1 mHz. Of course, any clock frequency with which the other integrated circuits in the controller are compatible could be used. Crystal clocks may have an error on the order of about one minute per month so it might be necessary on occasion to correct the minute which is displayed and, hence, the time that the CPU uses to calculate the azimuth and altitude angles for the concentrator. This correction can be made easily by referring to an accurate clock or getting a radio time signal and operating minute switch 83 as required to make the correction.

Other input parameters for setting up the solar tracker controller are the longitude and latitude of the place where one or more solar concentrators are installed. The longitude and latitude parameters are introduced in this illustrative embodiment by operating some manual switches which are in a switch matrix represented by the block marked 88 in the lower portion of FIG. 3. It will be understood that the longitude and latitude parameter input switches are the type which produce BCD data which is time multiplexed, in this example, to the controller. The longitude and latitude switches used, for example, are Part No. 2100 series strip switches obtainable from the EECO Switch Products Company, division of Electronic Engineering Company. The operator ordinarily determines the longitude and latitude of the installation from accurate maps which are obtainable from the U.S. Government and other sources. The latitude of the solar concentrator installation is inputted by means of a group of three thumbwheel switches 89. Two switches allow setting the tens and units of the latitude number and the third switch allows setting the tenths of a degree. For example, latitude of 89.9° can be set. The longitude of the concentrator installation is set by means of a group of three thumbwheel switches 90. The range of longitudes settable is −9.9° to +9.0° east or west, respectively, of the standard time meridian of the installation. The settings for longitude and latitude can be read directly off of the switch scales.

Figure 4:
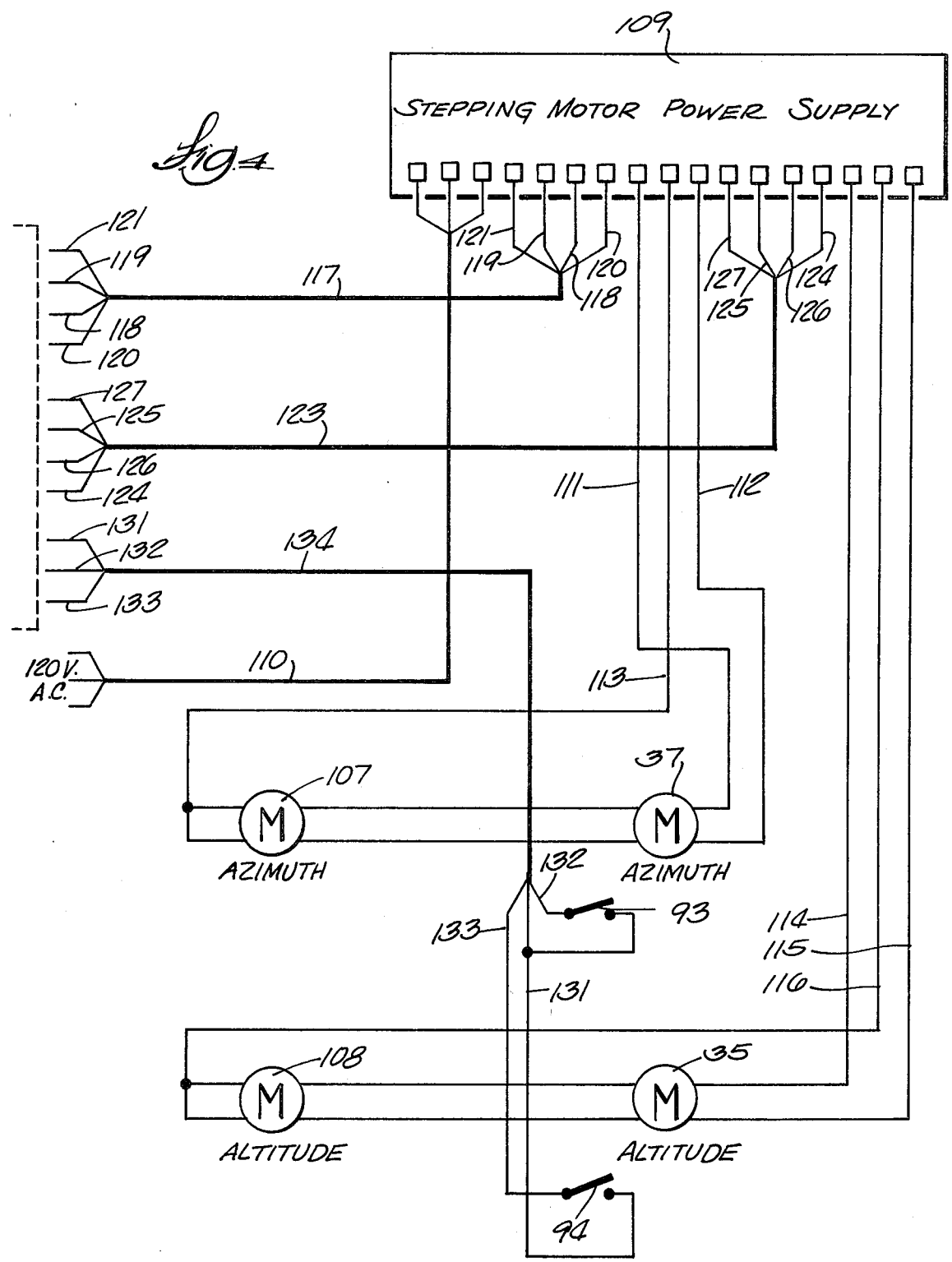
FIG. 4 is a circuit diagram which interconnects with FIG. 3 and which shows the stepping type azimuth and altitude drive motors, the stepping motor control and the altitude and azimuth axis home position limit switches.

Besides inputting the day, hour, minute, longitude and latitude parameters to set up the controller, it is also necessary at start-up and on some other occasions to reset or drive the concentrator to its easternmost azimuth angle, such as 120° east of the meridian and to its vertical or 0° altitude angle which are the limits or azimuth and altitude home positions. The CPU needs this limit data as a reference point for performing its calculations. A reset switch 91, shown in FIG. 3 near the day, hour and minute switches 81, 82 and 83, is provided for this purpose. The operator presses the reset switch and drives the concentrator to home position at the time of initial setup or at such other times as may be required following complete deactivation of the tracker drive. Automatic reset to home position also occurs at the end of each day as will be discussed later. The reset switch 91 has an output line 92 which goes to a low logic state in this example when the switch 91 is closed. This low logic state is sensed and causes the CPU 80 to direct that the azimuth and altitude motors 37 and 35 run long enough to return the concentrator to home position at which time azimuth and altitude axis motions are interrupted by azimuth limit switch 93 and altitude limit switch 94 which are shown in FIG. 4.

It will be understood that the longitude and latitude setting switch matrix 88, including switch groups 90 and 89 and the reset, day, hour and minute setting switches 91, 81, 82 and 83 may be situated remotely from the solar concentrator location. The concentrator or several concentrators which are controllable by a single one of the new controllers may be on the roof of a building and the controller electronics may be at ground level where the operator cannot directly observe operation of the azimuth and elevation drives neither under normal operation nor reset operation conditions. Hence, as will be explained later, signal lights are provided at the control station to indicate to the operator that the azimuth and altitude motors are functioning during normal tracking and during reset. The displays 84 for the day, hour and minute are, of course, also in the remote controller where the operator can see them.

Although it is essential to input the longitude and latitude of a collector installation, it does not necessarily need to be done with a set of switches 89 and 90. For example, these parameters could be coded in during manufacture for use at known site or a jumper network, not shown, could replace the switches and the jumpers could be selectively cut so the longitude and latitude of the installation would be inputted permanently thereafter. As indicated earlier, longitude could be expressed in terms of time also.

After the operator introduces the day, hour, minute, longitude and latitude parameters, tracking becomes automatic under the control of a properly programmed microprocessor based CPU which includes the microprocessor, an erasable and programmable read-only memory (EPROM) 95 and a random-acess memory (RAM) 96. In a commercial model of the controller, the EPROM used was the Intel Part No. 2758. A 256×8 bit RAM, obtainable from the Fairchild Semiconductor Products Group of Fairchild Camera and the Instrument Corp., under Part No. 3539 was used. Previously mentioned time base clock 87 is also part of the CPU.

The CPU is coupled to a bidirectional data bus 97 which, in this particular embodiment, is an 8-conductor bus. Also coupled to the microprocessor as a part of the CPU is an address bus 98 which, in this example, is a 16-conductor bus. A control bus 99 is also coupled to the microprocessor. It may be an 8-conductor bus as, in this embodiment, seven control lines and one clock line are required. Clock 87 is shown as having an output line 100 to the CPU 80 and another branch output line 101 which goes into control bus 99.

Other integrated circuit devices on the controller board, which is indicated by the dashed line rectangle 102, are a pair of programmable counter-timer chips (CTC) 103 and 104 which are identified by Zilog, Inc. as Z-80 CTCs. Another device 105 is the parallel input/output (I/O) chip called a Z-80 PIO obtainable from Mostek under its Part No. MK3881. Another device 106 is an Intel Part No. 8279 programmable keyboard/display interface. Functional features of the devices on board 102 will be discussed later as occasion arises.

Before undertaking a detailed description of the controller in FIG. 3, the stepping type azimuth motor 37 and altitude motor 35 power supply and controls will be described in reference to FIG. 4. The stepping motors used were Sigma Instruments, Inc. Part No. 20-3424 D200-F1.8 which can deliver 110 ounce inches of torque. The gear reduction used, by way of example and not limitation, is 1200:1 between both the azimuth motor 37 and azimuth shaft 38 and altitude motor 35 and altitude axis shaft 36. Drive reducers 45 and 60 provide a 200:1 reduction and the sprockets 62 and 64, a 6:1 reduction. Each motor step is 1.8° of rotation which corresponds with 0.0015° of axis movement per step.

As stated earlier, several concentrators, collectors or other devices which require celestial body tracking may be driven at the same location with a single controller. Thus, in FIG. 4, pairs of altitude and azimuth drive motors are shown. For one concentrator there would be a pair of motors comprised of azimuth motor 37 and altitude motor 35 and for another concentrator there would be a pair comprised of azimuth motor 107 and altitude motor 108. They are shown connected in series but other connection modes are foreseeable. On the order of dozens of motor pairs for as many concentrators can be driven with one controller having adequate capacity. A single controller at a central station can provide signals for driving motors for all the collectors in an entire geographical area in which case the collectors at each site can be provided with signal receivers, not shown, for receiving control signals over telephone lines, for example, or through space by way of modulated radio frequency waves.

The azimuth and altitude stepping motors require a power supply which is symbolized by the block marked 109. This power supply is well-known and available from several manufactures. By way of illustration, the power supply, or driver as it is called, incorporated a Sigma Instruments, Inc. Part No. 29A-22 driver card. It has a 15 volt, 5 amp output capability. The power supply has a three-wire 120 volt AC input power lines in FIG. 4. As is known but not shown, power supply 109 contains a step-down transformer and a full wave bridge rectifier for producing low voltage DC for supplying the azimuth and altitude motors. Typically there are two motor current lines 111 and 112 leading from the power supply to the azimuth motors 37 and 107 and a common return line 113 coming back and anoher two lines 114 and 115 leading to the altitude motors and a return line 116. The motors are two-phase motors which reverse direction in response to a phase shift in the pulse trains that are supplied to them over lines 111 and 112 and 114 and 115. The stepping motor power supply, in response to a signal for clockwise stepping of the motors, will produce two pulse trains which are in quadrature, that is, one will lead the other by 90°. The pulses in line 111 may lead the pulses in line 112 to obtain clockwise (cw) rotation of azimuth motors 37 and 107, for example. When the stepping motors are signaled to drive counterclockwise (ccw) the pulse train in line 112 is caused to lead the pulse train in line 111 and operation of the motor in the reversed direction results. The altitude motors are controlled in the same way except that lines 114 and 115 have the phase of the pulse trains shifted for reversing these motors.

A 4-conductor cable 117 provides the control signals for the azimuth stepping motors. Stepping occurs on the negative going edges of the step command pulses which are delivered over line 118 from the interface board 128 in FIG. 3. CW stepping occurs in response to line 119 being switched to a low logic state. CCW stepping occurs when line 120 is switched to a low logic state. Thus, one or the other of lines 119 and 120 must be low and pulses corresponding with the number of motor steps desired over line 118 must be provided simultaneously for the motors to drive in one direction or the other. Line 121 is a common or return line.

The altitude motors 35 and 108 are similarly controlled by providing command signals over a 4-conductor cable 123 which leads into stepping motor power supply 109. When line 124 goes low, the altitude motors step cw and when line 125 goes to a low logic state, the altitude motors step ccw. The pulses corresponding with the number of motor steps desired are provided over line 126 and line 127 is a return line. Four-conductor cables 117 and 123 for the altitude and azimuth motor controls lead from the interface board in FIG. 3 which is indicated by the dashed line 128.

FIG. 4 also shows limit switches 93 and 94 which are opened mechanically when the solar concentrator is driven to its home position. One limit switch 93 opens and stops the azimuth motor when it has driven the concentrator home or 120° east-northeast of the local meridian. The other limit switch 94 opens when the altitude motor has driven the concentrator home on its altitude axis; home position for the altitude axis being when the concentrator is vertical, that is, 0° from vertical.

Altitude limit switch 94 is in a switch circuit loop comprised of lines 133 and 131 which is a common line. The azimuth limit switch is in loop including line 132 and common line 131. These lines are in a 3-conductor cable 134 in FIG. 4 that leads to PIO 105 in FIG. 3 which couples the limit switch status signals to the microprocessor 80 when the signals are called for.

The main output signals from the controller shown in FIG. 3 are the signals which are fed to power supply 109 in FIG. 4 to control the number of steps and direction of the azimuth and altitude motors 37 and 35 and any others. The outputs are all shown at the top of the drawing in FIG. 3 where they have the same reference numerals used for corresponding lines in FIG. 4.

The azimuth and altitude stepping motors 37 and 35 in this illustrative example are stepped at a maximum rate of about 125 steps per second but any stepping rate which the motors are capable of following may be used. As stated previously, each 1.8° motor step results in 0.0015° of azimuth or altitude shaft rotation. Each of the stepping motor control lines 118, 126, 119, 120, 124 and 125 are coupled to the controller in FIG. 3 through drivers 135-140, respectively, which convert signals from the controller to TTL logic levels. Thus, the azimuth step pulse supply line has a driver symbolized by the block marked 135. It also includes a light emitting diode (LED) 141 or other indicator lamp which indicates to the operator during setup or at any other time whether stepping signals are being supplied to the stepping motor power supply 109 at that time. Altitude step pulse supply line 126 also has a driver and LED indicator combination symbolized by the block 136. Similarly, the lines 119, 120, 124 and 125 which go low selectively to determine azimuth and altitude motor rotational directions have driver and LED combinations 137-140, respectively. Thus far, the input and output signals from the controller have been discussed in general terms. The manner in which the signals are inputted and outputted relative to the CPU and the CPU peripheral circuits will now be discussed.

Besides the EPROM 95, RAM 96 and clock 87 the CPU has additional integrated circuit devices associated with it on controller board 102 for exchanging data, addresses and control signals between the inside and outside world. A first counter timer chip (CTC) 103 and a second CTC 104 were identified earlier. In this embodiment, the CTCs are presettable as divide-by-8 counters or timers which provide time delays needed by the circuitry. Another previously identified device is a parallel interface circuit or parallel input/output device (PIO) marked 105. It provides two 8-bit parallel ports and is programmable. Another previously identified device is the keyboard/display 106 which has one large scale integrated circuit in one package. It has two ports, one for data and one for command information. It is an input/output device which is used in this example to provide multiplexing for digital displays, to take care of timing and data storage for display information and also timing for BCD switches. The functions performed by the various peripheral devices CTC 103, CTC 104, PIO 105, keyboard/display 106, RAM 96 and EPROM 95 will be described later as occasion arises. In FIG. 3, the devices represented by blocks 103-106 include numbers within their boundaries. These are hexadecimal numbers which identify certain ports of the devices and correspond with the hexadecimal numbers which are referred to in the description of the computer flow charts (FIGS. 5-29) and in the appended computer program printout.

Consider keyboard/display device 106. One of its input ports is a 4-line cable 146. Longitude and latitude BCD data, as set by groups 89 and 90 of three thumbwheel switches in switch matrix 88, is time multiplexed into device 106 from longitude and latitude setting switch unit 88. The latitude setting has a resolution of three digits with an accuracy to one-tenth of a degree (00.0° to 99.9°). Similarly, the longitude setting has a resolution of two digits with an accuracy of one-tenth of a degree. A correction of ±9.9° longitude from the standard time meridian is permissible in the illustrated design. Normally, the correction, that is, addition or subtraction from the standard time meridian will be within ±7.5° on either side of the standard time meridian. The standard time meridian in terms of 15° intervals from the Greenwich 0 meridian need not be inputted since this information is available for use in the azimuth and altitude angle calculating algorithm as a result of the exact standard time data having been inputted to the system. The longitude and latitude setting or inputting switches 90 and 89 produce binary coded data which is multiplexed into the presently used type 8279 keyboard/display 106. Keyboard/display 106 has on-board RAMs which store the longitude and latitude BCD values until they are changed by operating the corresponding switches in switch matrix 88. The CPU monitors the status of these RAMs at regular intervals, as will be explained, even though the values are not changed after initial installation, and uses this information in its azimuth and altitude angle calculations.

The CPU, of course, addresses the keyboard/display 106 at regular intervals over bus 98 and provides the proper control signals for obtaining the BCD data over bidirectional data bus 97.

Keyboard/display 106 has a 3-conductor cable 147 leading out from it to a 3-to-8 line decoder 148. The lines 147 contain binary information in time multiplex format. The 3-to-8 line decoder, among other things, provides a set of signals to the longitude and latitude switches for time multiplexing the longitude and latitude data to the keyboard/display and CPU. The longitude and latitude switch devices 89 and 90 are decoded by a branch decode signal line 149. The eight output signals from the 3-to-8 line decoder are also fed into eight drivers which are collectively designated by the block 150. These drivers energize the individual 7-segment displays for the day, hour and minute displays in display block 84 in sequence as dictated by the system clock. The 7-segment displays are driven with a 7-segment decoder driver 151 in proper time sequence by BCD information that is time multiplexed over a 4-line cable 152 which leads from the keyboard/display 106. There is also a RAM in the keyboard/display 106 which permits outputting the data to the 7-segment decoder driver 151 and to the 3-to-8 line decoder 148.

Attention is now invited to the PIO integrated circuit 105 on controller board 102. This device outputs data signals to the stepping motor power supply 109 in FIG. 4 by way of output lines $B_4$–$B_7$ which feed the drivers 137–140 and lead to lines 119, 120, 124 and 125 that deliver the cw and ccw logic low signals to the stepping motor power supply for determining rotational direction as described earlier. PIO 105 also has four data input lines $A_4$–$A_7$ for bits from the reset, day, hour and minute setting switches 91, 81, 82 and 83, respectively, whose functions were described earlier. PIO 105 also has data input pins $A_0$ and $A_1$ which are lines 132 and 133 from the azimuth and altitude home position indicating limit switches 93 and 94 which are shown in FIG. 4 and were discussed earlier. Line 131 is a common ground return. PIO 105 is coupled with bidirectional data bus 97, address bus 98 and control bus 99 by means of multi-line buses 153, 154 and 155 which also connect to keyboard/display 106.

Microprocessor based CPU 80 is programmed to check the status of the day, hour and minute switches 81, 82 and 83 once each half-second by sending a command to the PIO 105 to put this information on data bus 97. The microprocessor then goes through a subroutine which, if the day switch 81 is pressed, increments the day being displayed by one. When the microprocessor sends a command, the switch data is strobed into the PIO and latched in a one-level buffer latch in the PIO and then the data is transferred to the CPU. Ordinarily, the reset switch 91, day switch 81, hour switch 82 and minute switch 83 undergo a status check by the microprocessor every one-half second during normal operation even though these switches are usually static and no change in their settings has been made.

Reset switch 91, as indicated earlier, has an input to the $A_7$ pin of PIO 105. Pressing reset switch 91 makes the solar concentrator go back to home position as defined earlier. If reset switch 91 were pressed at noon, for example, the concentrator would go home and open both limit switches 93 and 94. By way of illustration, in this particular design, it takes about ten minutes for the stepping motors to drive the concentrator until the home limits are reached, assuming the reset switch were pressed before noon, and the concentrator arrived home at noon. The CPU, by virtue of its program which will be discussed, would have calculated that it is noon and that the solar concentrator should be at an azimuth equivalent to due south and at whatever altitude angle is required for being aimed at the sun on the prevailing day of the year. Then, in this design, within ten minutes the drive system would step the concentrator back to its noon position plus an angle which makes up for the reset time.

The time that it takes for the concentrator to go to home position and return to its proper azimuth and elevation angles depends on the time of the day at which reset is commanded. If the azimuth angle corresponds with the concentrator position at before noon, less time will be taken to go home and return to the proper position than is the case if, such as near sunset, when the concentrator is at an azimuth appropriate for pointing it in a more westerly direction. In the winter, when the sun's ecliptic is shorter, less time will be required for making the loop between the azimuth position at which reset is commanded and the time of return to the proper azimuth and elevation.

One of the features of the new controller is that when the altitude is negative as it is at night the controller drives the concentrator back to azimuth and altitude home positions.

EPROM 95 performs the usual function of storing the program and tables for the CPU to use for control and calculation purposes. RAM 96 performs the usual functions in a CPU system of storing data and permitting access to data as required.

As indicated earlier, the counter-timer chips (CTCs) integrated circuits 103 and 104 are presettable divide-by-8 counters that can be daisy chained to obtain various time delays so it is not necessary to use software for this purpose. Each CTC 103 and 104 contains four counters. The first CTC 103 generates one microsecond duration clock timing pulses using 1 Mhz system timing clock 87 as a basis. One of the counter stages in CTC 103 has an output line 160 which yields one microsecond pulses at a 0.5 Hz repetition rate. It drives a flip-flop 161 which is marked FF as are other flip-flops in the circuit. Flip-flop 161 divides the input pulses by two and outputs pulses at a repetition rate of one Hz. The one Hz pulses are fed to a driver 162 for an LED that, consequently, blinks at a one Hz or one per second rate which is slow enough for eyes to perceive. This lets the operator know that the system clock is running. Otherwise the operator might have to wait for a change in the minute value displayed on display 84 to ascertain if the system clock is running.

Another counter stage and output port in CTC 103 generates an interrupt signal pulse for the CPU at half-second intervals. For each interrupt the CPU goes to a program subroutine which causes the microprocessor to check the status of the day, hour, minute and reset switches 81, 82, 83 and 91, respectively, every half second. On the control bus 99, in this example, there are seven controls and one clock signal. Every time the particular line goes low for an interrupt, it is sensed by the CPU which then services the interrupt.

The fourth counter stage of the first CTC 103 is divided by 120 which means its output is one pulse per minute. Its purpose is to cause updating of the clock time as displayed and as required.

The third and fourth stages in the first CTC 103 are programmed to allow interrupts when the counters count to zero. Hence, one line 164 leading out of the CTC 103 to control bus 99 will see interrupts generated twice per second by the third counter stage and once per minute by the fourth state. Even though it is the same interrupt line to the CPU, it causes servicing of two separate subroutines. In this case, when the system is initialized, an interrupt vector is loaded into the CTC 103 and logic in the CTC and the CPU forms a unique pointer to a table which is stored in EPROM 95. So the third stage interrupt points to a given memory location and the fourth stage interrupt points to another location. Hence, there is now a unique starting point and the CPU will jump to a subroutine.

The second CTC 104 also has four timer or counting stages. Its main purpose is to produce output pulses on lines 165 and 166 which establish the proper stepping rate for the azimuth and altitude motors 37, 107 and 35, 108, respectively. The motors should be driven at a rate that is within their capability for reacting to step signals. The CPU is programmed to produce the necessary control, address and data signals for causing CTC 104 to issue azimuth and altitude motor step signals. Output lines 165 and 166 provide their microsecond duration pulse signals to flip-flops 167 and 168 which cause dividing by two and outputting of longer duration pulses. These azimuth and altitude motor stepping pulses are fed to drivers 135 and 136 in which there are LEDs that indicate the step pulses are being sent to the azimuth and altitude motor power supply 109.

The 16-conductor address bus 98 is used for selecting several functions of the various integrated circuit devices. Addresses are selected for EPROM 95 from which instructions are fetched as is conventional. RAM 96 storage locations are addressed when RAM operations are in progress. The address lines form addresses of input-output ports of devices which are selected for an output by the CPU. For instance, keyboard/display device 106 has two ports, one for data and another for command information. Commands come over the data bus 97, but typically, the address line codes open up the gates to the various devices. As a further example, if PIO 105 is addressed, information on the data bus would go to the PIO 105.

Control bus 9 has eight lines in this example; as indicated, seven lines are for control bits and one is for a clock signal. One is a write enable line which is active when low. Another is a read enable line which is also active when low. Another is an input/output request line which indicates information on the bus is for an input or output port. Another is a memory request line which indicates that the data on the bus is for a memory location. Another is a reset signal which, during power-up synchronizes all circuits. There is a line designated M1 in the above-cited technical manual which provides a continuously recurring sync pulse that occurs once per CPU machine cycle. There is a clock input control signal which is required because the integrated circuits in this example, such as the PIO 105, are pseudo-dynamic chips and need clock pulses to keep them alive. Any synchronization of the system takes place because of the M1 pulse.

The system has a restart switch symbolized by the block 169. It serves the typical purpose in digital logic circuits of clearing everything coincident with power-on.

The system is provided with a standby battery power supply which is symbolized by the block 170. It will provide logic level DC power for keeping the system alive in the event of interruption of service on the AC power mains. Thus, the clock will continue to run but the CPU will not calculate and store the data for positioning the azimuth and altitude motors until power is restored. When the main power is restored, the controller then causes the azimuth and altitude motors to drive the concentrator to the proper azimuth and altitude angles for the time of the day prevailing when power is restored. Thus, the concentrator is automatically correctly positioned after power failure in contrast with prior art clock drive trackers where manual resetting and resynchronizing is required and with optical tracking systems where the sensors may start hunting for the sun after the concentrator, collector or other celestial body tracker has not driven for a substantial interval.

Algorithms for Calculating Azimuth and Altitude Angles

Now to be discussed is the manner in which the CPU performs calculations which result in motor control signals being generated which cause the azimuth and altitude motors to drive a solar collector of any type so it will track the sun and in the case of a solar concentrator, so the optical axes of its lenses will always be directed toward the sun between sunrise and sunset.

Solar concentrators and flat plate collectors have fluid flowing through them so they must be oriented at all times with their upper end up and their lower end down. When prior art altitude-azimuth mounts are used for the concentrator and where an optical feedback is used, the shortest path tracking that an optical feedback circuit would generate may cause the collector to flip upside down at about noon. This is most likely to occur at latitudes that correspond with those in the southern part of the United States around June 21. The reason is that around that date the concentrator is nearly vertical and presented in a nearly due east direction at sunrise, especially at low latitudes. As time proceeds toward noon it will begin to change its orientation from vertical to horizontal with its upper end leading to the west. When the concentrator reaches the meridian, however, its upper end should no longer lead but should then be trailing from the east and the lower end should be on the west side. A unique feature of the new controller described herein is that it is programmed to turn the concentrator through 180° in the vicinity of solar noon or when the concentrator reaches the meridian so its formerly leading end will become the trailing end and so its upper end will be on top when the concentrator reaches vertical again at sunset.

As indicated earlier, in accordance with the invention, the solar concentration position is based on calculations which use the latitude and longitude of the solar collector installation, the day of the year, the hour of the day, and the minute of the hour input parameters. The declination of the sun and the equation of time are calculated and used in azimuth and altitude angle calculations.

The microprocessor in the CPU is programmed to evaluate the following equations once every minute:

$$\sin(B) = \cos(L) \times \cos(D) \times \cos(H) + \sin(L) \times \sin(D) \quad \text{Equation (1)}$$

$$\sin(\phi) = \cos(D) \times \sin(H)/\cos(B) \quad \text{Equation (2)}$$

$$\cos(\phi) = [\sin(B) \times \sin(L) - \sin(D)]/[\cos(B) \times \cos(L)] \quad \text{Equation (3)}$$

Where:
B is the Altitude angle from horizontal.
$\phi$ is the Azimuth angle from the South.
L is the Latitude of the installation.
D is the Declination of the sun for a particular day.
H is the Hour angle (minutes from noon/4).
And H is given by:

$$H = 180 - LONG - E - (15 \times HR) - (MIN/4) \quad \text{Equation (4)}$$

Where:
180 is the degree equivalent of 1200 hours.
LONG is the location of the collector installation measured in degrees Longitude from the Standard Time Meridian ($-7.5°$ to $+7.5°$)
E is from the Equation of Time (in degrees) for a particular day of the year.
HR is the hour of the day in Standard Time.
MIN is the minute of the hour.
The Declination is often approximated by:

$$D = 23.45 \times \sin[360 \times (284 + N)/365] \quad \text{Equation (5)}$$

Where:
N is the day of the year.

Equations (1)–(3) are based on spherical coordinates and are accurate. Other equations for yielding the altitude and azimuth angles are known and are not shown but could be used.

After analyzing data from several sources, it was discovered that use of equation (5) for calculating declination, D, leads to a significant error which would result in not attaining the $\pm\frac{1}{4}°$ tracking accuracy which is desired for maximizing efficiency of solar energy conversion by the concentrator. When using the generally accepted equation (5), the calculated declination, that is, the angle between the sun and the polar axis of the earth, may be 0.4° from true declination. Declination data is obtainable in the Sight Reduction Tables for Air Navigation which is Publication No. 249, Vol. II of the United States Department of Defense. A 0.4° error would result in a 2° azimuth error for early morning and late afternoon concentrator positions. As will appear, because of this error, the program used herein for calculating azimuth and altitude angles obtains the accurate declination, D, and equation of time, E, by interpolation of data which has been taken from the tables in the publication just cited.

Before discussing the CPU program in detail, some of the basic functions of the circuitry shown in FIGS. 3 and 4 will be recapitulated for making it easier to relate the program steps to system operation. As indicated earlier, one CTC 103 is programmed to generate an interrupt once every 0.5 seconds. The service routine for this interrupt checks the status of the reset and time setting switches 91, 81, 82 and 83. If one of the clock advance switches are set, the appropriate digit of the day, hour or minute is incremented. If the reset switch 91 is set, the concentrator or collectors are moved to home position for a reference point and then to the position as determined by the day of the year, time of the day, latitude and longitude parameters prevailing at the time. A sufficient number of azimuth and altitude motor commands are generated by the controller to cause the concentrators to return to and go past the home position, but a limit switch for each axis of the concentrator will stop its movement when it reaches home position. This brings all collectors to a known position. A similar action occurs at sunset.

A second interrupt signal which is generated once each minute causes the processor to calculate the altitude and azimuth to which the concentrators should move during the next minute when normal tracking is in progress. The direction and number of steps needed to bring the concentrator to this new position, from its present position, is also calculated and used to program the second CTC 104. This CTC generates the motor step commands with a minimum of software. For every 1/32° of concentrator altitude or azimuth axis movement an interrupt is generated in this illustrative embodiment. The routines which service these interrupts increment or decrement the concentrator position as is appropriate.

General Comments on the Calculations

Brief comments on the nature of the calculations will be set forth before the flow charts are discussed. Referring back to equations (1)–(3), equations (1) and (2) are fundamental. Equation (1) yields the sine of B whose arcsine is the altitude angle from horizontal at which the collector should be to be aimed at the sun at the moment. Equation (2) provides the azimuth angle from the meridian or from due south in terms of sin $\theta$ whose arcsine is computed to get the result in degrees. East of the meridian is a plus angle and west is minus. Equation (3) is the equivalent cosine function of equation (2). When the sine of the azimuth angle is near 90° and when the cosine of the azimuth angle is near 0° the function is changing slowly and is, therefore, inaccurate to work with if only 16-bit resolution is used as in this example. Hence, to obtain better accuracy for the calculated azimuth angle, at the break point of 58° the program switches from using the sine and uses the cosine function as shown in equation (3).

Calculation of the hour angle H as in equation (4) is straightforward. The equation of time term E in this equation is recalculated once each minute by interpolation of a table for E which is stored in EPROM 95. E, as is known, is the difference in degrees between apparent solar time and mean solar time.

Declination, D, is different for every day. To obtain better accuracy than equation (5) allows, the declination angles are obtained from tables stored in EPROM subject to a second-order interpolation as will be evident later in the flow chart discussion. The theory on which the second-order interpolation routine is based is derived from an article, Thomas A. Seim, "Numerical Interpolation for Microprocessor-Based Systems," *Computer Design*, February, 1978, pp. 111–116. The same basic interpolation routine is used for interpolating the other trigonometric functions and E which are stored in EPROM. Calculation of equations (1)–(3) to enable producing the step-rate factors for the azimuth and altitude drive motors takes about 1/16th of a second in the present design so there is adequate time for the CPU to recalculate declination every minute, or at a rate of 1440 times per day which may result in greater accuracy than is actually required.

The sine and cosine functions are customarily calculated with an algorithm based on a Taylor series expansion, for example, but this is a slow process because it requires the arithmetic unit in the CPU to perform division. In the present controller, the natural trigonometric functions for sine and cosine are stored in EPROM and are subjected to second-order interpolation for greater accuracy.

For interpolation, three points in a EPROM table are used. As taught by the Seim article, the first derivative is taken for pairs of points and then the second derivative is taken. Hence, accuracy of two or three more digits is obtainable than would be obtainable with conventional first-order interpolation.

The hour angle H, as in equation (4), is calculated every minute. The hour angle, H, is needed in equations (1) and (2) but not equation (3). H can be calculated accurately since the longitude and latitude are settable to a resolution within 0.1 of a degree with the aid of good navigational maps or maps obtainable from the U.S. Department of Commerce.

Every minute the CPU calculates the azimuth and altitude angles at which the concentrator should be at the end of the next minute. The program has been accumulating, in RAM, the change in concentrator position since the beginning of the day, so the present azimuth and altitude angles are in RAM. The CPU then calculates how many motor steps or pulses are required to get from present azimuth and altitude to desired azimuth and altitude in the next 60 seconds. To exemplify what happens with real numbers, take for example, the illustrative embodiment wherein there is a 1200 to 1 gear reduction between the motors and their main driven azimuth and altitude axes shafts and each motor step is 1.8° of motor revolution. For each motor step, an azimuth or altitude axis shaft will turn 0.0015°. This amounts to 666.6 motor steps per degree of shaft rotation.

Taking the azimuth shaft axis as an example, assume the CPU calculates that this shaft angle should increase by 0.25° in the next minute for the concentrator to be on the sun at that time. In the next minute 0.25×666.6 or 166.65 motor pulses or steps would be required and this amounts to 2.7775 pulses or motor steps per second. Also one must take into account that there must be a maximum permissible step rate of the azimuth and altitude motors. In the present example, the limit is about 125 pulses or steps per second. This cannot be exceeded in the worse case such as during reset when maximum rate of return to home position is desired.

So rather than determining the number of steps required during the next minute and issuing them as fast as possible to the motors, a calculated angle change value to time value conversion is made. Resolution of 1/32° will be considered satisfactory. The motor stepping rate is determined with CTC 104.

CTC 104 is programmed to divide the 1 Mhz clock down to 250 Hz. Dividing 1/32° by 0.0015 degrees of azimuth axis rotation yields, rounded off, 21 motor steps per 1/32 of a degree of axis rotation. Because the azimuth motor pulses are delivered through a flip-flop 167 which divides by 2 and extends the one microsecond timing pulses, there will be 42 pulses generated by the 250 Hz timer per 1/32 of a degree of azimuth axis rotation. The result of dividing the number of steps needed by the number of pulses per step is called the pulse rate factor.

Continuing with the example, for 0.25° of azimuth angle change, 166 pulses or motor steps are required in the next minute. When the microprocessor addresses the CTC to cause gating of the pulses, 42 pulses are issued for 1/32° (0.03125°) of azimuth shaft movement and an interrupt signal to the CPU occurs every 1/32° or 42 pulses. The CPU acknowledges the interrupt and goes into a routine for incrementing the present azimuth stored in RAM by 1. It does this for every interrupt until the calculated required number of motor pulses or 1/32° steps equals the equivalent of 0.25° in this example which would amount to eight interrupts and increments. Hence, it should be evident that the azimuth motor drives continually during the day even though the azimuth angle is calculated once per minute. Within a minute the linear movement closely approximates that of the sun. Any overshoot or undershoot will be corrected in the next minute. The azimuth and altitude will always be within 1/32 of a degree of the calculated value which is ±0.25 of actual position in this embodiment.

The altitude angle is set in a manner similar to the foregoing example except that altitude data is used. In either case, the values accumulated in RAM will be incremented or decremented every 1/32 of a degree as dictated by the calculation of the difference between the present axis angle and the angle desired in the next minute.

It is especially noticeable at low latitude installations that the altitude axis changes more rapidly than the azimuth in the morning and afternoon but for an interval of about one hour before and after noon the azimuth axis changes very rapidly. This is because the sun follows an arc which is almost directly overhead or slightly to the north of the zenith at low latitudes. At low latitudes, the altitude will rise to about 90° at noon, solar time. As noon is approached, the azimuth will go from due east or +90° to a −90° position shortly after noon. At noon the altitude of the concentrator is moving very little and, to an observer it looks like the concentrator is just rotating about its azimuth axis. Equations (1)–(3), force the azimuth and altitude to move this way which is very desirable since it changes the top end of the concentrator from leading position to lagging position and, hence, prevents tipping of the concentrator in the wrong direction. During the afternoon the lower end of the concentrator will properly be leading and it will arrive at the bottom when the elevation angle of the concentrator is near 90° and the concentrator is nearly vertical as it is at lower latitudes near sunset.

Program Flow Charts

The program flow charts will now be discussed. They are broken down into two modules. The first module, shown in FIGS. 5–11, contains initialization routines and controls the flow of data into and out of the microprocessor unit. The second module, shown in FIGS. 12–29 performs all mathematical computations. An important subroutine in the latter module is one labeled INTERP for interpolation. It is a 16-bit second-order interpolation algorithm used to calculate the declination D, equation of time ET and the sine, cosine, arcsine and secant functions.

The step-by-step program on which the flow charts are based is included as an appendix hereto. This program is presented in its unassembled form, that is, before it has been operated on by an assembler.

For convenience, a list of program variables and their associated labels are presented next.

| | | RAM Useage for Solar Tracker | |
|---|---|---|---|
| Absolute Address | Relative Address | Variable Name | Remarks |
| 3000 | 0000 | STATUS | bit 0 = 1, first request of RESET |
| | | | bit 1 = 1, RESET is requested |
| | | | bit 2 = 1, 120V AC power is OFF |
| | | | bit 3 = 1, altitude axis is at HOME |
| | | | bit 4 = 1, azimuth axis is at HOME |
| | | | bit 5 = 1, sine or arcsine data is negative |
| | | | bit 6 = 1, longitude is negative |
| | | | bit 7 = 1, calculate DESALT and DESAZM (Power is ON and RESET is not in progress.) |
| 3001 | 0001 | PREALT | present altitude of the collector |
| 3003 | 0003 | PREAZM | present azimuth of the collector |
| 3005 | 0005 | DESALT | desired altitude |
| 3007 | 0007 | DESAZM | desired azimuth |
| 3009 | 0009 | ALTRAT | step rate factor for altitude motor |
| 300A | 000A | AZMRAT | step rate factor for azimuth motor |
| 300B | 000B | MIN | minute of the hour (BCD) |
| 300C | 000C | HR | hour of the day (BCD) |
| 300D | 000D | DAY | day of the year (BCD) |
| 300F | 000F | DIRECT | motor direction signals |
| | | | bit 7 = 1, azimuth CW (East) |
| | | | bit 6 = 1, azimuth CCW (West) |
| | | | bit 5 = 1, altitude CW (Up) |
| | | | bit 4 — 1, altitude CCW (Down) |
| 3010 | 0010 | X | value to be interpolated |
| 3012 | 0012 | FX | result of interpolation |
| 3014 | 0014 | DL0 | first difference F(1) - F(0) |
| 3016 | 0016 | DL1 | first difference F(2) - F(1) |
| 3018 | 0018 | DL20 | second difference DL1 - DL0 |
| 301A | 001A | MULT1 | thirty two bit multiplier |
| 301C | 001C | MULT2 | thirty two bit multiplier |
| 301E | 001E | ADD1 | thirty two bit partial sum |
| 3020 | 0020 | ADD2 | thirty two bit partial sum |
| 3022 | 0022 | HEXP | exponent of abcissa spacing |
| 3023 | 0023 | MASK | used to truncate low order bits |
| 3024 | 0024 | LONG | degrees of longitude from standard time meridian (BCD) |
| 3026 | 0026 | LAT | degrees latitude (BCD) |
| 3028 | 0028 | DEC | declination |
| 302A | 002A | HRANG | hour angle |
| 302C | 002C | DAYBN | day of the year |
| 302E | 002E | LATBN | degrees latitude |

Figure 5:
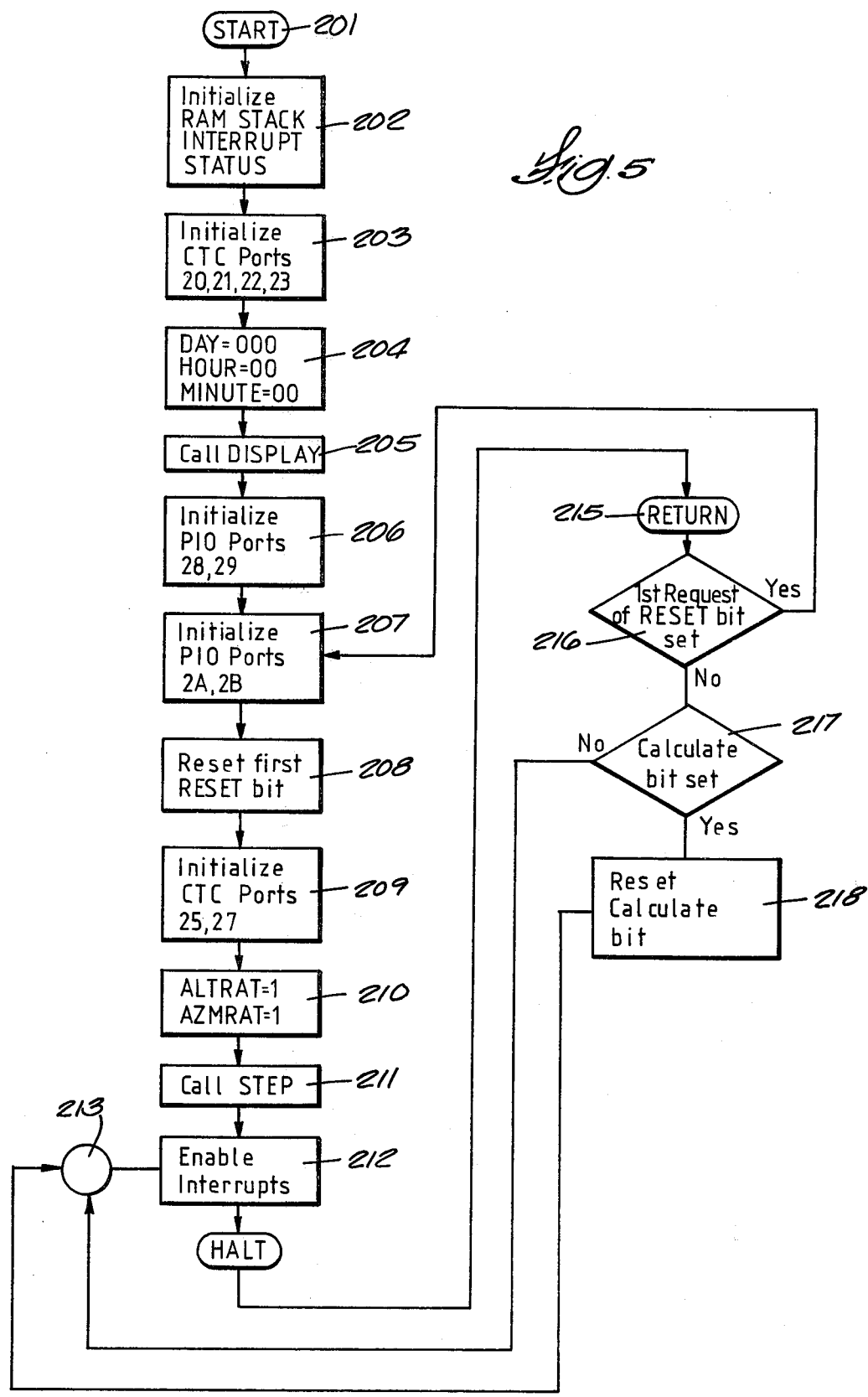
FIGS. 5-11 are flow charts for the initialization routines in the program for the CPU; they correspond with Part I of the unassembled computer program listing of the appendix hereto.

In FIG. 5, initialization begins with four process blocks 201-206 which may be considered collectively and are largely self-evident from the legends in the blocks. The numbers in the blocks 203 and 206, relating to the CTC ports, are their hexadecimal codes and correspond with the port markings on blocks 103-106 in FIG. 3. Next to be initialized are PIO ports coded 2A and 2B as in block 207 at a point where a part of the program which has the label RESET is defined. The ports in 207 also handle azimuth and altitude motor direction signals. The port is programmed so the azimuth angle increases, that is, the azimuth is going to be reset or driven to plus 120° (ENE) of the celestial meridian or home position. Altitude is going to decrease as the collector is driven to its vertical home position for reset.

Now bit 0 of the STATUS bits 0-7 just listed is cleared as in process block 208 because a reset is being processed.

Next in block 209, CTC ports designated by hexadecimal numbers 25 and 27 are initialized. These ports are used in producing the appropriate number of steps of concentrator movement. As explained earlier, the program is set up to position the concentrator to 1/32° so the internal 250 Hz clock of this port must be divided by 42, in this example, to get one pulse per 1/32° of concentrator movement. Ports 25 and 27 provide this divide-by-42 function for altitude and azimuth.

Process block 210 is involved with initializing the rate at which the stepping motors are going to drive the one or more concentrators toward home simultaneously during reset. The smaller the number, the faster all of the concentrators are going to move. It is desirable to go to home position as fast as possible. Altitude and azimuth rate, ALTRAT and AZMRAT, are initialized to a value of 1. This provides maximum motor speed which, in this particular design, is about 100 steps per second, by way of example.

The next process block 211 calls the subroutine labeled STEP. This routine takes the altitude rate and azimuth rate information and begins setup of the CTC peripheral chip 104 to generate square wave pulses which go to motor drive circuits and eventually cause the motors to start stepping toward home.

At this juncture, all of the hardware has been initialized. In process block 212, the interrupts are now enabled.

A HALT statement is then executed as indicated and the CPU just waits and keeps itself alive; that is, it generates timing pulses as required but does not execute any instructions. As previously mentioned, an interrupt is generated every ½ second during which time the status of the reset, day of the year, hour and minute switches are checked. Another interrupt is generated every one minute for updating the clock minute and for possibly calculating azimuth and altitude angles after the concentrator gets to home position.

Upon return from interrupt as in block 215, at least two actions are possible. It is possible that during an interrupt, while the status of the switches was being checked, a rest may have been requested. If so, an appropriate bit would have been set. A check is made to see if this is the first request for a reset. If it is, the program reverts back to the reset part of the program as indicated by the decision block 216 yielding a "yes." This starts the motors stepping toward home position. If a reset was not requested, a check is made as to whether conditions are right to begin azimuth and altitude angle calculations as indicated by decision block 217. If conditions are not right, the program reverts back to the HALT state again. If conditions are right, a routine named INPUT is called and it initiates azimuth and altitude angle calculations. Calculations cannot be requested if the processor is in the RESET mode. The conditions that must exist for calculations to occur will be evident later. The call INPUT block is marked 218.

Figure 6:
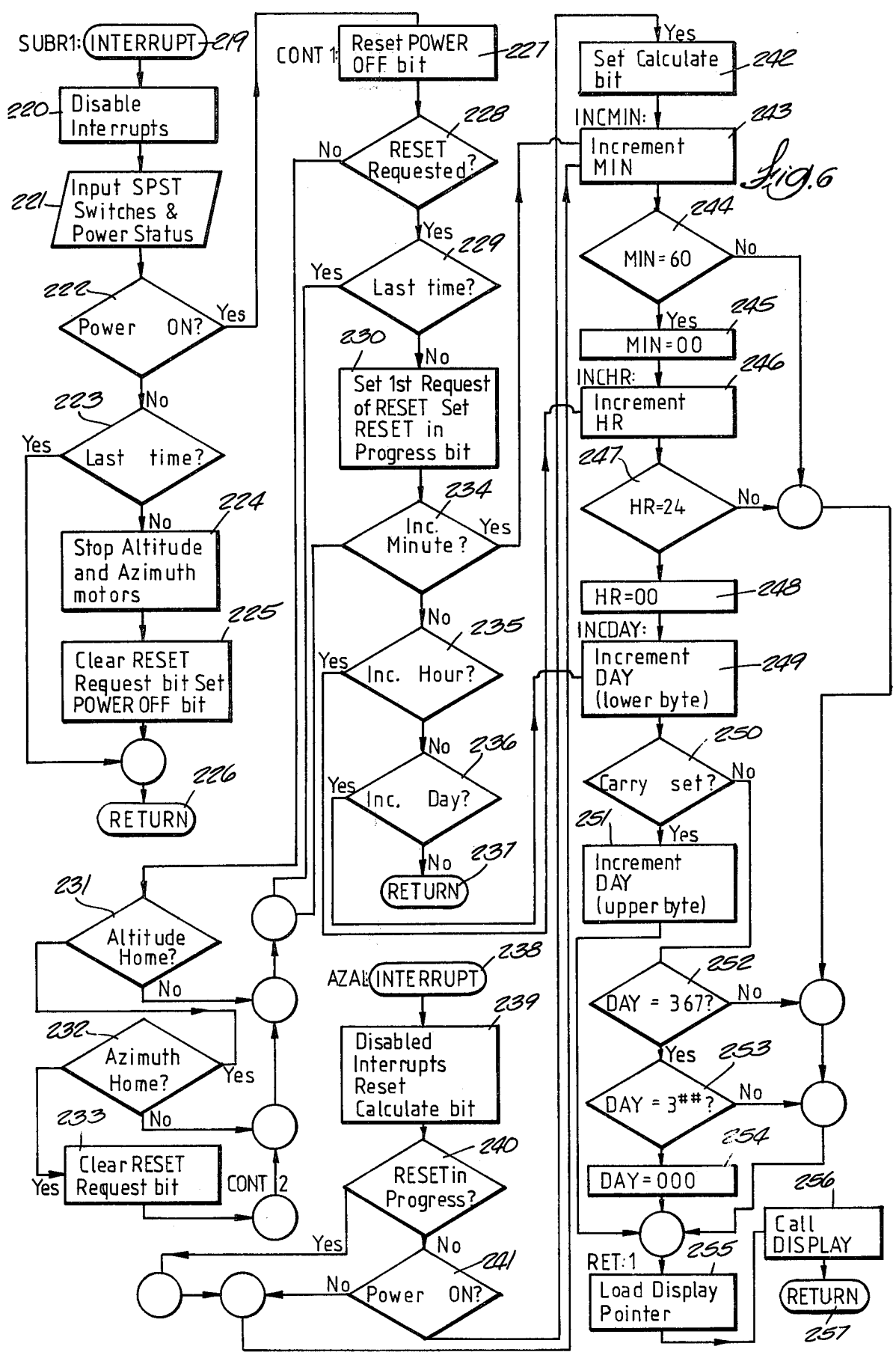

In FIG. 6 there is a routine labeled SUBR1. This subroutine executes every ½ second upon an interrupt. During normal operation, none of the switch statuses will have changed within checking time. Process block 220 disables the interrupts immediately so no other interrupts can disrupt the program. This time is reserved for checking the switches and doing what has to be done for getting back to the HALT condition quickly.

As in data input block 221, the first thing done is to input the switch and power mains status. If, yes, 120 V power is on, its sense line is high. If no, the line is low. As indicated by decision block 222, if the power is on, the subroutine continues. If the power is off, a check is made to see if it was off the last time as indicated by decision block 223. If the decision is, yes, the power was off, the system is already shut down. The azimuth and altitude drive motors cannot be activated under this condition. However, if the power was not off last time, it means this is the first power off detected in which case the altitude and azimuth motors should be disabled as indicated by process block 224 and any reset that may be in progress must be cleared as indicated by process block 225. The latter also specifies that a bit in a STATUS register is set to indicate that the power is off. This bit is used later to inhibit any calculations. The power off routine terminates in a RETURN indicated by the block 226.

Normally, the power is going to be on so the yes path will be followed out of decision block 222. This results in resetting power off bit as in block 227. In the event power was off last time, that bit must be cleared to indicate that the power is now back on. A check is also made as in block 228 to determine if a reset has been requested. If, yes, it was requested last time, nothing has to be done because last time appropriate changes would have been made to the system and the yes path is followed out of decision block 229. If reset was not requested last time, the no path is followed out of decision block 229 which means that this is a first request for a reset and a bit is set as in block 230 that indicates that this is the first time a reset has been requested. Another bit set at this time, as in block 230, is one that indicates that a reset is in progress, that is, the motors are driving toward azimuth and altitude home positions. As stated earlier, this condition inhibits calculations of the altitude and azimuth angles.

Now revert back in the chart to block 228 where a determination was made as to whether a reset was requested. If not, the no path is followed out of this block to blocks 231 and 232 which are indications that a determination is made as to whether the altitude and azimuth motors have driven to home, that is, until their limit switches 94 and 93 opened. If both are home, the reset request bit is cleared as indicated by block 223. If a reset has been in progress, both azimuth and altitude axes would now be home so clearing the reset condition would be in order. This is one of the conditions which will now enable azimuth and altitude angle and motor step calculations if they are requested. The circles labeled CONT2 (continue 2) is a label for five paths in the program through which the program can get to CONT2. It is a decision point where the CPU looks at the increment minute switch as indicated by decision block 234. If, yes, the minute increment switch is set, then a routine is executed for incrementing the time and display by one minute.

If the minute switch is not set, the status of the hour switch is checked as indicated by the decision block 235. If, yes, it is set, the CPU goes into a routine that increments the hour. If it is not set, the status of the day switch is set as indicated by the decision block 236. If this switch is set, the CPU will go into a routine that will increment the day.

The program is presently set up so that only one time switch can be responded to at a time. If both the increment hour and increment minute switches were activated at the same time, the increment hour would be ignored temporarily and the increment minute switch would have priority. If none of the minute, hour and day increment switches are set, the decision sequence terminates in a return 237.

If incrementing the minute as in block 234, or the hours as in 235, or the day as in 236, is called for, the yes paths are followed out of these blocks to ensuing decision blocks to which these yes lines are directed. The decision to increment the minute is processed in block 243. Since the minute only goes to 60 and then returns to 0, it is necessary to check if the minute equals 60 as indicated by the decision block 244. If it does equal 60, the minute is reset to 0 as indicated by the process block 245.

If decision block 235 calls for the hour to be incremented, this is carried out in increment process block 246. The hours are limited to the 24 hours in a day. It is therefore necessary to check to see if the hour equals 24 as is done in decision block 247. If the hour has reached 24, it is reset to 0 as indicated by process block 248.

Incrementing the day will be discussed soon hereafter. The labels for the subroutines for incrementing minute, hour and day are shown on FIG. 6 as labels INCMIN, INCHR and INCDAY, respectively.

Going back in the flow chart, there is another entry point labeled interrupt 238 which is the beginning of a subroutine labeled AZAL. This entry point occurs on the one-minute interrupts in which case two things are done. One is to advance the clock. This must be done regardless of what conditions exist. Also since a one-minute interrupt has occurred, it may be time to calculate the altitude and azimuth if conditions are met. At this time the interrupts have been disabled and the calculation request bit has been cleared as indicated by process block 239. A check is first made to see if a reset is in progress as indicated by decision block 240. If reset is not in progress, a power-on check is made as in block 241. If the power is on, it is then permissible to enable or set the calculation request bit as in block 242, and, later when the microprocessor returns from its interrupt it may then go on to calculate altitude and azimuth. If there is a reset request or power is not on, of course, calculation would be inhibited. When the routine indicated between blocks 238 and 242 is completed, the clock's setting or incrementing routine may be resumed.

Incrementing of the minute and hour has been discussed. Incrementing the day will now be considered. The day incrementing process is in process block 249. When the day gets to 367, it is reset to 0 for the 0 day of the year. 367 was selected because, during leap year the count could go to 366. Hence, it is only necessary for the operator to check the clock on every first day of January to see that it is set to 0 and to zero it if necessary. The day is incremented using two bytes. The lower byte is processed in block 245. A test is made in 250 to check if a carry is set. If it is, the upper byte is incremented as in block 251. If no carry is set further tests are made in decision blocks 252 and 253 and, under proper circumstances 367 will have been reached and the day will be set to 0 as indicated by process block 254.

As indicated in FIG. 6, after the clock has been updated, a display pointer is loaded as in block 255. This pointer points to clock information in RAM. Then block 256 calls a subroutine labeled DISP which will move the information out of RAM and output it to the type 8279 keyboard/display 106 which then controls the digital displays.

Figure 7:
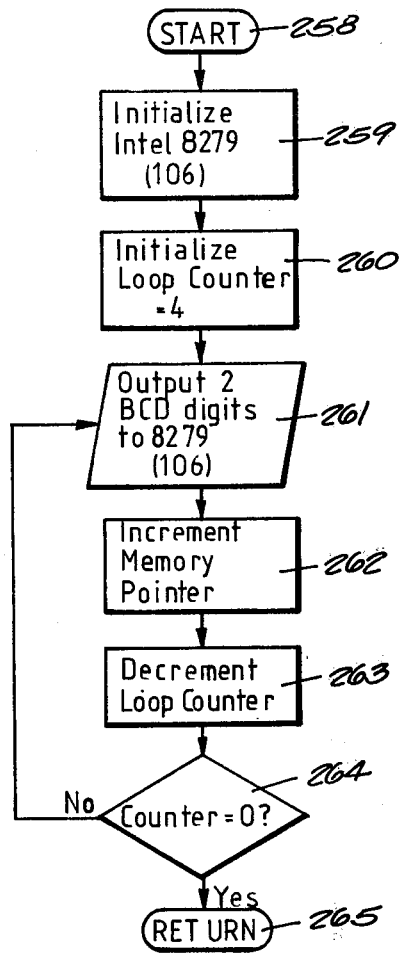

The display routine is flow charted as in FIG. 7 where it is labeled DISP. This routine is called at several points in the program. The fact that it is a called program is indicated by the label START 258 rather than with an interrupt label. The type 8279 keyboard/display 106 must be initialized. It has several modes of operation. For present purposes, it is being set up for operating in an eight-character display mode. Reference may be made to the display routine, DISP, which shows the statements that are necessary to initialize this device. In the flow chart, initialization is indicated in the process block 259.

Next, in process block 260, a loop counter is initialized to the count of four. Then a short algorithm is executed for taking information from main RAM 96 and putting it into the internal RAM of keyboard/display 106 device. This involves initializing the loop counter as in block 260 and outputting two BCD digits to the device 106 as indicated by input data block 261 in the flow chart. As in block 262, a memory pointer is incremented and the loop counter is decremented and a check is made to see if the counter equals 0. If it does not, the loop repeats and two more BCD digits are outputted, the memory pointer is incremented and the loop counter is decremented as in block 263 and it continues on until the counter reaches 0 as indicated by decision block 264.

At this time, the type 8279 keyboard/display device 106 is properly initialized. The device then, through its own internal sync and timing control, multiplexes the data from its own internal RAM and puts it out to the decoders, drivers and to the displays 84 shown in FIG. 3.

Figure 8:
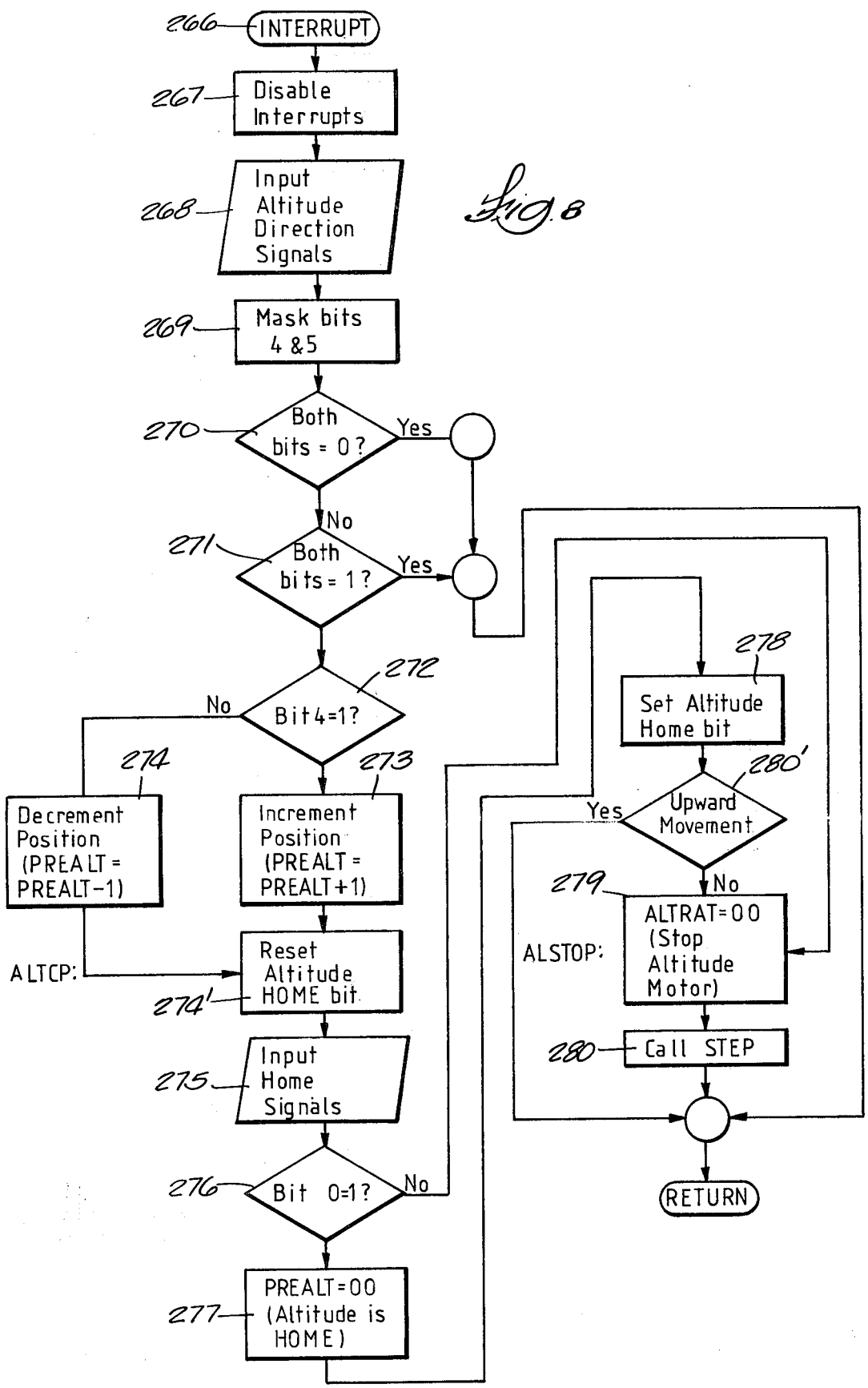

The next subroutine labeled ALT shown in FIG. 8 keeps track of the position of the altitude. Box 266 indicates that an interrupt is generated by CTC 104 for every 1/32° of collector altitude movement. Recall that a port of CTC 104 is programmed to divide by 42, in this example, to provide one pulse out for every 1/32° of collector movement. Box 267 indicates that all other interrupts are disabled at this moment. The altitude direction signals must be inputted as in input block 268. The altitude input signals are signals which were originally fed to the PIO 105 and go to the motor drive circuit. As in block 269, bits 4 and 5 of the altitude direction signal are checked because one or the other of those bits has to be high or a logic 1 for the altitude motor to move. If both bits are 0 as in decision block 270, the routine is exited and goes to a RETURN as indicated by the block which has that label. If both bits 4 and 5 are logic 1 as in decision block 271, the routine is exited again, for this indicates an error condition. Then a check is made as to whether bit 4 is set or at logic 1 as in decision block 272. If the answer is yes, it means the altitude is being incremented. Every $1/=°$ of altitude movement is stored in RAM as a count of 1 so the numerical value in RAM is 32 times greater than the actual concentrator position. So, during movement, the present altitude, PREALT, is incremented by 1 as indicated in process block 273. If bit 4 was not set, it implies that bit 5 was set which means that the altitude position should be decremented, so 1 would be subtracted from the present position as indicated in process block 274.

The interrupt at the beginning of FIG. 8 may have occurred because of an orderly transition from one minute to the next as would be occurring during the day, or it may be the result of an interrupt generated by a reset condition. If it is a reset condition, the present altitude is unknown. However, a check is made as to whether the altitude is in the home position and the altitude home signal is inputted as indicated by block 275. This signal is from the altitude limit switch 94 and is switched directly through PIO 105.

Hence, if the ALT subroutine in FIG. 8 were entered because of a concentrator reset operation, the value contained in the present altitude is meaningless but, later in the program, the home or limit switch signals are inputted and a check is made to see if the bit corresponding to the altitude limit switch is set high or at logic 1 as in decision block 276. If it is at logic 1, the concentrator is home and the present altitude is equal to 0 so there is now a definite starting point. As in block 278, status bit 3 is set which indicates that the altitude is in home position. This indication is used in other portions of the program.

If the concentrator is moving toward home position during a reset, it must be stopped at home. An altitude rate, ALTRAT, of 0 is then loaded in as indicated by block 279 as per the subroutine labeled ALSTOP. This is later interpreted to mean that there is no altitude movement. A STEP subroutine as in block 280 is then called as will be discussed later in connection with FIG.

10. The STEP subroutine interprets the 0 altitude rate as an indication that the altitude motor must be stopped. If, however, subroutine ALT in FIG. 8 is entered by other than an interrupt generated during a reset, the concentrator may be moving upward from home position but the limit switch may still be open. Hence, a check is made as in decision block 280' as to whether the concentrator is moving away from home position. If, yes, it is, that is appropriate since the altitude has been redefined as being at 0. In such case the altitude motor is allowed to continue movement so a portion of the program where the altitude motor was turned off is bypassed.

Figure 9:
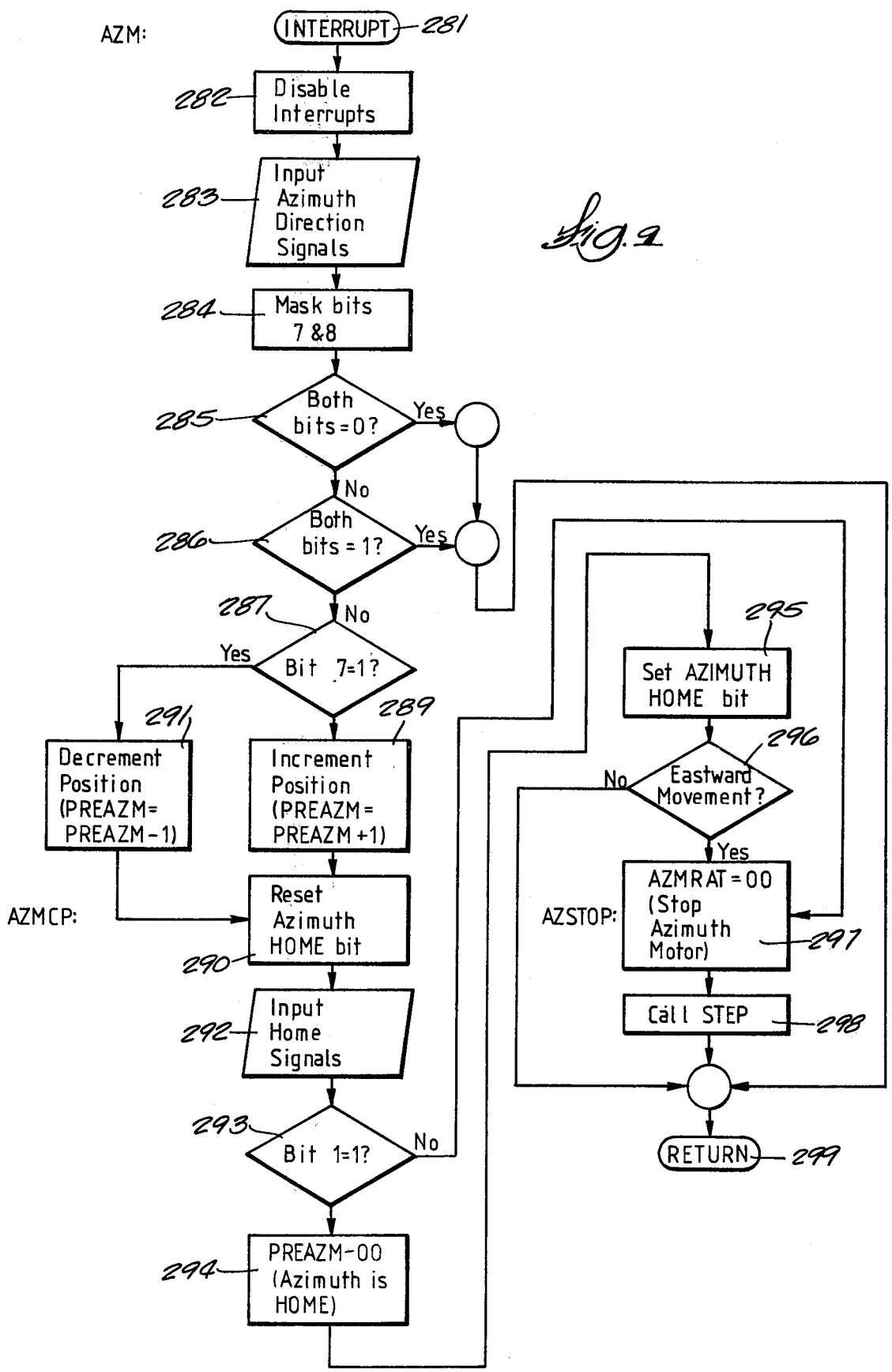

The routine of keeping track of the azimuth angle position is labeled AZM and charted in FIG. 9. This routine is essentially the same as the routine which was just discussed for keeping track of the altitude angle. Hence, in the interest of brevity, it will not be discussed in detail. It may be noted that in the AZM subroutine, bits 7 and 8 are checked to determine the direction of azimuth drive as in process block 284. As in blocks 289 and 291, the present azimuth, PREAZM, is either incremented or decremented as required. The home signals are also inputted as indicated by input block 292. Status bit 4 is set if the azimuth is home as indicated by block 295. A decision is then made as in block 296 as to whether the concentrator is moving east on its azimuth axis. If the answer is no, it must be moving west. If the answer is yes, block 297 sets the azimuth rate, AZMRAT, equal to 0 and the azimuth motor stops as in block 298.

Figure 10:
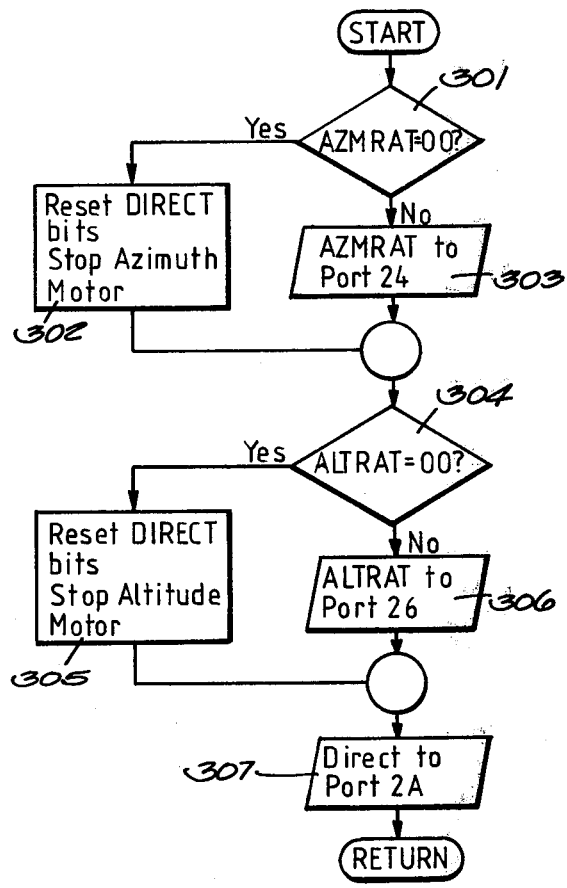

The STEP subroutine is flow charted in FIG. 10. Considering the azimuth motor drive first, a check is made as to whether the azimuth rate, AZMRAT, is equal to 0. If it is equal to 0, the direction bits must be reset to 0 as in block 302 since there will be no motor movement and the azimuth motors should be stopped. If AZMRAT is not equal to 0, as in block 303, the azimuth rate will be outputted to a port numbered 24 Hex in the CTC. By loading port 24 of the CTC with the azimuth rate value, the appropriate number of motor steps per second will be generated by CTC 104. Now a check is made to see if the altitude rate, ALTRAT, is equal to 0 as indicated by block 304. If it is, the direction bits must be reset as in block 305 since there will be no altitude motor movement. If the altitude rate is not 0, port 26 of the CTC will be loaded with the altitude rate, as indicated by block 306, which will result in the appropriate rate of altitude motor pulses being generated by the CTC 104. When this is done, the direction signals are outputted to a port called 2A Hex in PIO 104 as indicated by block 307.

Figure 11:
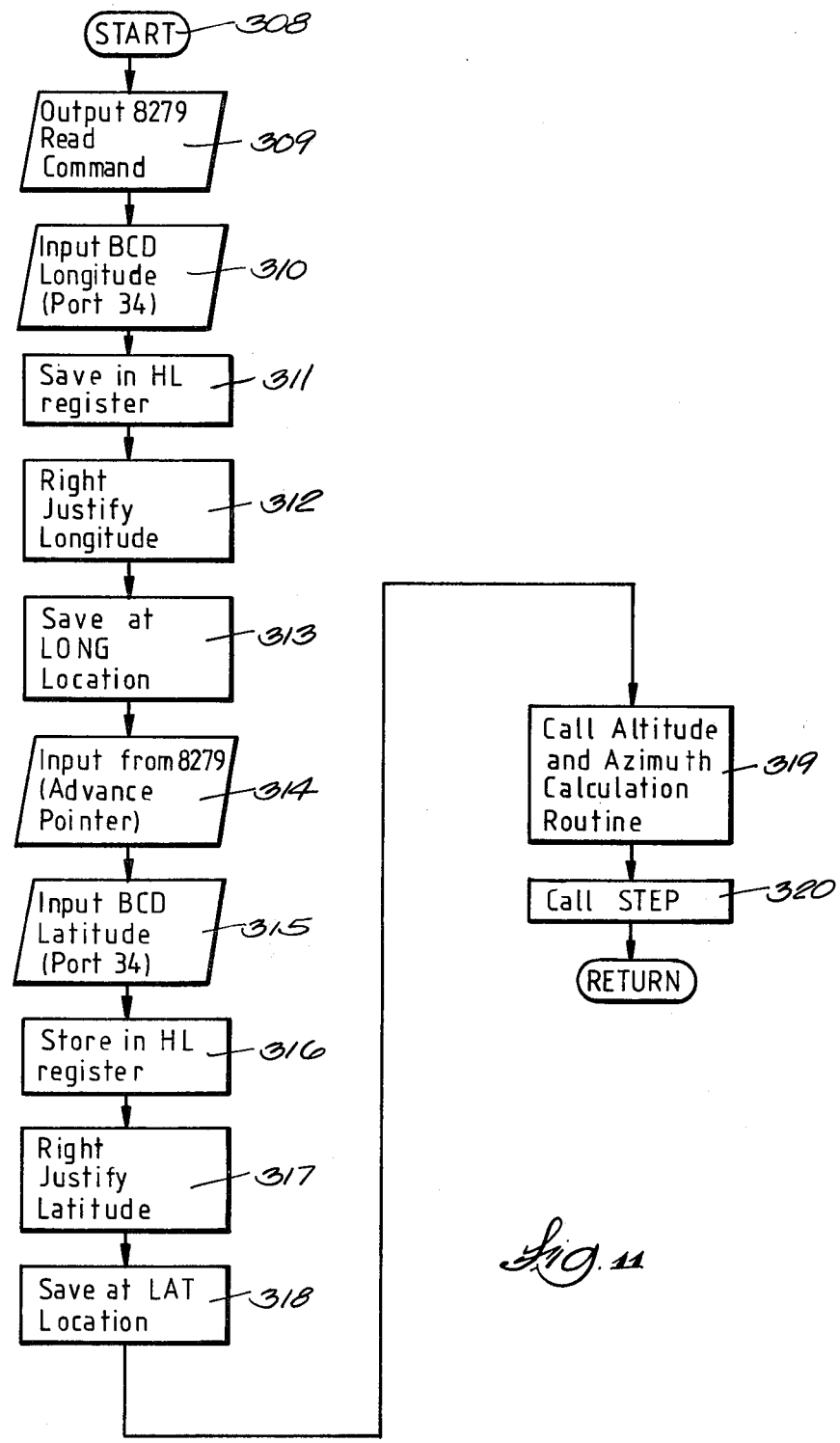

The input routine, labeled INP, is charted in FIG. 11. This routine is called when azimuth and altitude angles were to be calculated. The first thing to obtain the 55 latitude and longitude switch 89 and 90 BCD settings through the type 8279 keyboard/display 106. Some initialization is required. The first thing to be done is to output a read command as in block 309, to the keyboard/display device 106 in FIG. 3. This results in the longitude, in terms of BCD being inputted to a pair of registers which, if the Z-80 microprocessor is used, will be the H and L registers as indicated by block 311. In this particular case, the longitude data is right justified as indicated by block 312. Inspection of the appended unassembled program will reveal that the longitude is inputted in such a way that it becomes a three-digit number with a surplus 0 in the least significant position. Hence, it is shifted or right justified to make it a three-digit number with the zero removed. The longitude information is then stored in a RAM location labeled LONG as indicated by block 313.

In this particular design, the BCD longitude and latitude information are not adjacent each other in switch matrix 88 so it is necessary to advance an address pointer. This is done by reading out the keyboard/display device 106 several times to advance the point as indicated by block 314. If the data were adjacent, as it can easily be, advancing a pointer would not be necessary. Similarly, as indicated by input block 315, the latitude data is stored in the H and L register as in block 316, right justified as in block 317, and saved at a RAM location called LAT as indicated by block 318. Then, in accordance with block 319 the altitude and azimuth calculation routine is called. After the calculation is made, the azimuth and altitude motor STEP routine is called as in block 320. This routine takes the azimuth rate and altitude rates and issues the appropriate motor step commands. This ends the description of the initialization program in relation to flow chart FIGS. 5 to 11.

Figure 12:
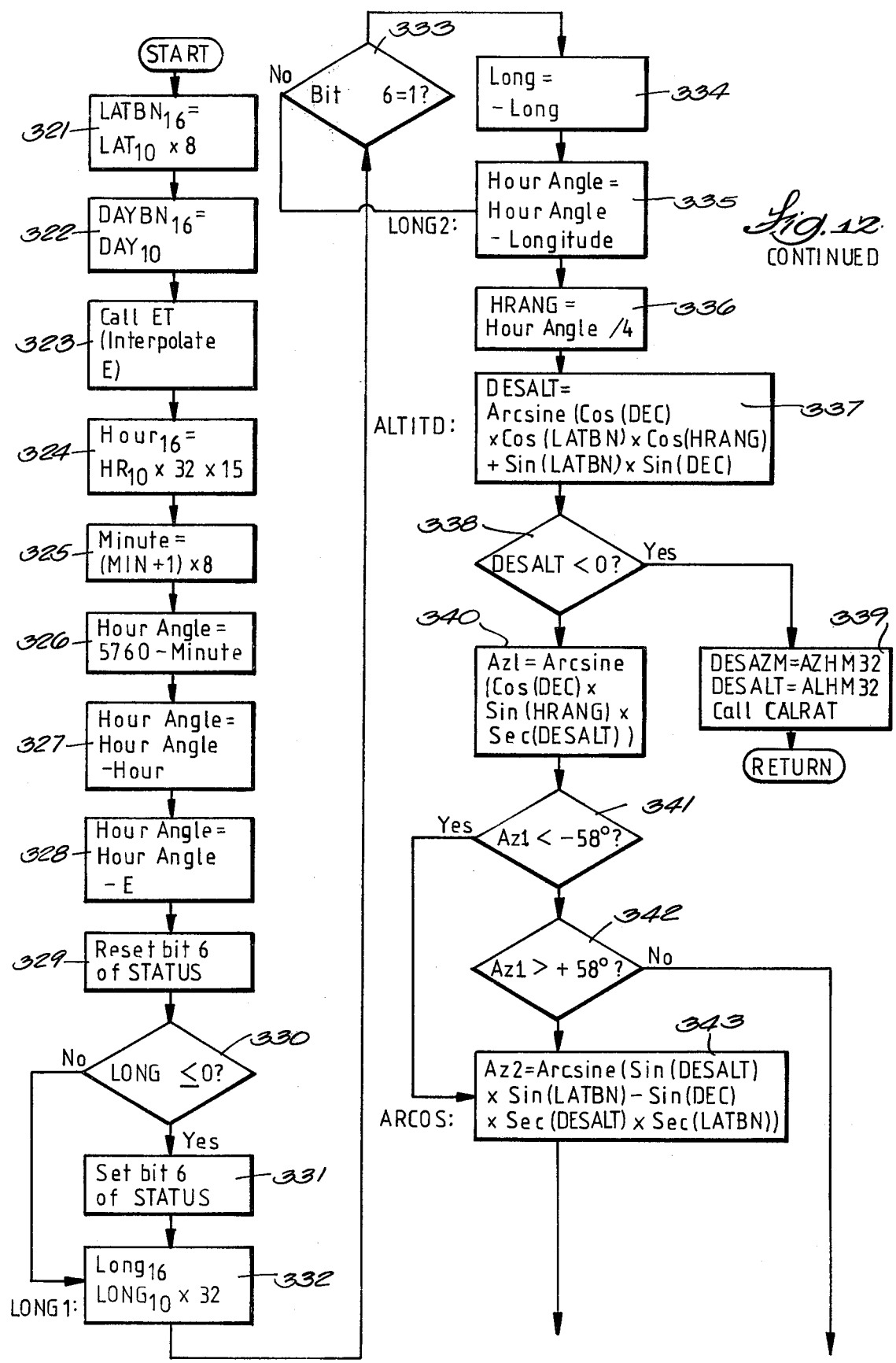
FIGS. 12 and 13 are flow charts for azimuth and altitude angle calculations in the program and are found in Part II of the appended unassembled computer program listing.

The detailed flow chart of the program for calculating the desired altitude and azimuth angles for keeping the concentrator pointed toward the sun will be described, beginning with FIG. 12 where the program is labeled CALC. The routines start with block 321 where the latitude, in BCD, is multiplied by eight and then converted to the hexadecimal number system. The conversion subroutine is conventional but it will be shown later in the flow charts. The latitude information is stored in a RAM location called LATBN as indicated by block 321. The day of the year is also converted to hexadecimal and stored in a RAM location called DAYBN as in block 322. Subroutine ET which is part of the interpolation routine for determining the equation of time, E, is then called as with block 323. Next, in block 324, the hour of the day is converted from BCD, base 10, to the hour in hexadecimal. The object is to obtain the hour angle, H, for use in equations (1) and (2) so it is necessary to multiply by 15 for the 15 degrees in an hour and to multiply by 32 because the resolution of the hour angle is 1/32°. Equation (4), given earlier, is the equation for obtaining H. Since it is necessary to know the azimuth and altitude positions which the concentrator will be at in the next minute, as indicated in block 325, one minute is added to the current minute reading and multiplied by eight which yields the same resolution and converts to the hour angle, H, format. The hour angle is partially determined in block 326. The hour angle turns out to be equal to 5760 which is 180° times 32 minus the minute or minutes from noon divided by four. Evaluation of equation (4) for H requires subtracting the minute as in block 326, subtracting the hour as in block 327 and substracting the E from the equation of time which was calculated earlier. This subtraction is specified in block 328. STATUS BIT 6 is then reset as in block 329. Bit 6 is used to determine if the longitude, LONG, was positive or negative. If the decision is made in block 330 that the longitude is not negative, the program jumps LONG1 and continues to block 332. If the decision is that the longitude is less than 0 or negative, STATUS BIT 6 is set to indicate that there is a negative longitude. Then in block 332, the longitude is treated as a positive number and the decimal number is converted to hexadecimal times 32 to provide the correct resolution. Then in block 333, a check is made to see if bit 6 is equal to one. If it is, it means that the longitude was negative originally so the result has to be converted to a negative number as in block 334. Therefore, a jump is made to LONG2 and then the hour angle calculation may proceed as in block 335 where the hour angle H is the previously accumulated terms minus the longitude.

The hour angle, designated by the location HRANG, is divided by 4, as in block 336, to get back to the resolution required for the rest of the program. The program needs the hour angle to the nearest $\frac{1}{8}°$ rather than 1/32°. Then the desired altitude, DESALT, is evaluated in accordance with equation (1) as in block 337. The calculation is shown in detail in the appended unassembled program. The desired altitude is the angle whose arcsine is equal to the terms on the right side of equation (1) which are also set forth in box 337. It will be evident that during the calculation, in conformity with equation (1), a number such as latitude, L, is called and the cosine routine is called. Then declination, D, is called and the cosine routine is called again followed by multiplication of the first terms. Then, H, is called and its cosine is taken. This is followed by taking the sine function of latitude, L, and the sine of declination, D, and multiplying these values together and adding them to the previously calculated values.

After equation (1) is evaluated as in block 337, a check is made to see if the desired altitude is less than 0. If it is, the sun is below the horizon and nighttime conditions prevail. When nighttime is reached, the desired azimuth, DESAZM, and desired altitude, DESALT axes should be in their home positions. Hence, at sunset, a routine named CALRAT is called as indicated by block 339. This routine calculates the rate which will send the concentrator home.

However, if the desired altitude, DESALT, is positive or not less than 0, it is appropriate to calculate the azimuth angle. This is done by evaluating equation (2) which is set forth in flow chart block 340. The procedure is similar to that discussed in connection with block 337. Note, however, in block 340 that, instead of dividing by the cosine of the desired altitude angle as required in equation (2), the reciprocal secant function is used and a multiplication is made rather than a division. This avoids slowing the computation down as would be the case if the CPU were required to make the slower and more complex division instead of a multiplication.

At this point, a determination is made, as in decision block 341, whether the desired azimuth angle, DESAZM, is greater than or less than 58°. If it is greater than 58°, equation (2) may not be sufficiently accurate when using only 16-bit arithmetic and alternate equation (3) should be used. Equation (3) is set forth in calculation or process block 343. Equation (3) deals with the arccosine of the azimuth. Box 343 specifies taking the arcsine, however. Since the sine and cosine are related to each other by a phase shift of 90° the conversion can be made. Because there is already an arcsine routine, it is used and an appropriate 90° phase shift is made to obtain the arccosine.

To adjust the angle to the proper quadrant, the desired azimuth as calculated by the arcsine equation is reexamined in block 344 and if it is greater than 0, the desired azimuth is actually 90° times 128 minus the azimuth as calculated using the arccosine formula as indicated in block 345. Then the second calculated azimuth is subtracted. The factor of 128 provides high resolution for 90×128=11520 parts. If the azimuth as calculated using the arcsine formula was negative, the result from the arccosine equation is then used and added to minus 90° times 128 plus the second calculated azimuth as indicated in block 346. When this calculation is made, the result is divided by four to get back to the proper resolution for execution of other portions of the program and the rate calculation routine, CALRAT, is called as indicated in block 347.

Going back to block 340, if the absolute value of the azimuth angle as originally calculated by the arcsine formula is less than 58° or, in other words, it is not greater than 58° as in decision block 342, the program proceeds to block 348. In this block the result is divided by four to get the desired resolution and a routine designated "azimuth adjust," AZMADJ is called. This routine will be described later. When the arccosine of a number is taken, it only yields a range of values between ±90° but does not indicate the quadrant. AZMADJ determines if the angle is in the second or third quadrant of the function. A check is made in decision block 349 as to whether the result is positive. If it is positive nothing more need be done and CALRAT can be called again as in block 354.

If, however, the result is negative, the desired azimuth has to be examined again. If it is positive, as indicated in decision block 350, the desired azimuth is equal to 180° times 32 minus the desired azimuth as in block 351. On the other hand, if the desired azimuth as originally calculated is less than 0, the desired azimuth is −180° times 32 minus the desired azimuth, DESAZM. The results are then saved as in block 353 followed by calling the rate circulation subroutine CALRAT as in block 354. The CALRAT subroutine provides the number of pulses which are required for driving the azimuth motor.

Figure 13:
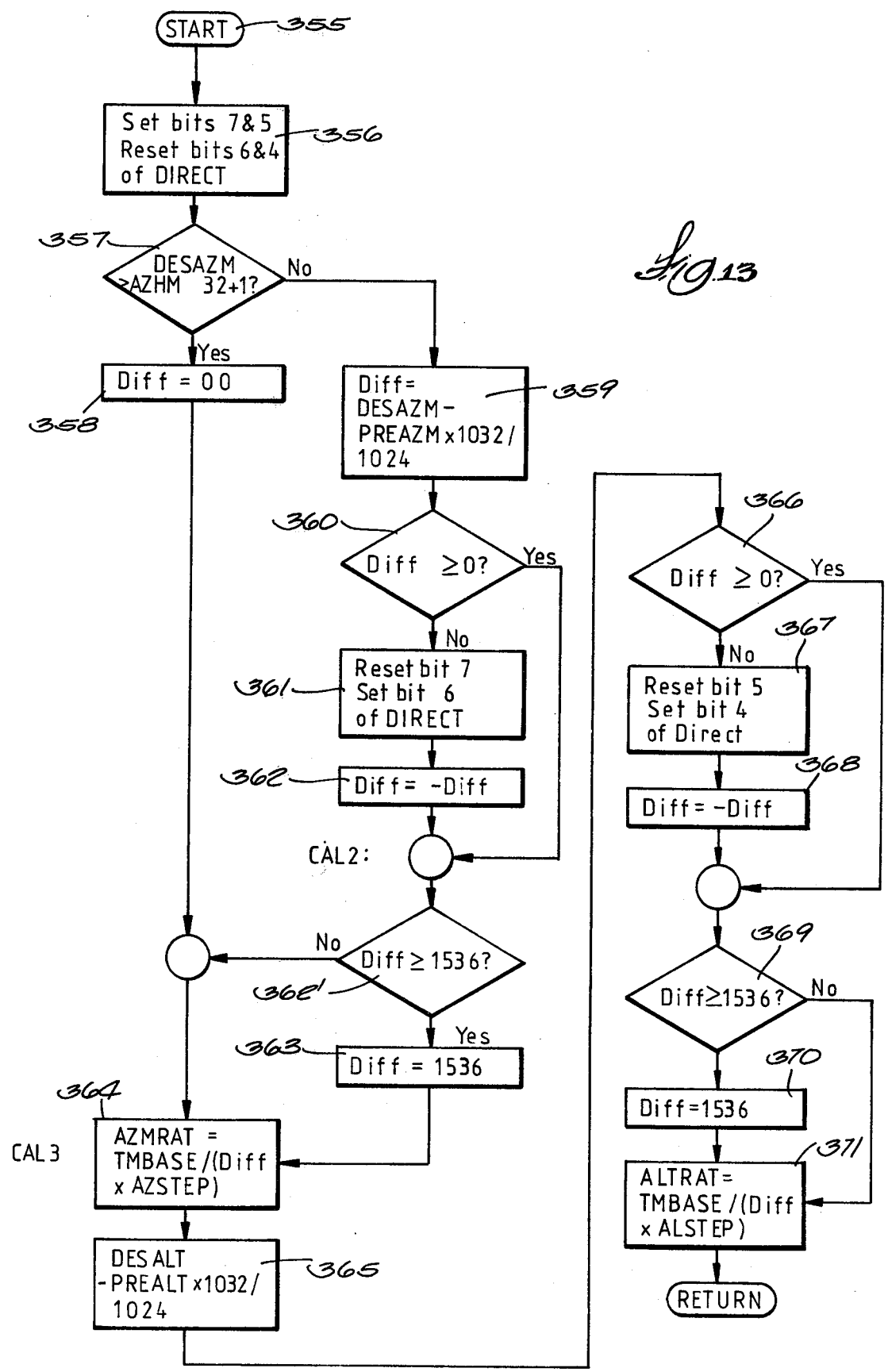

The CALRAT or calculate rate routine is set forth in FIG. 13 and starts with block 355. The first thing in the CALRAT subroutine is to set bit 7, reset bit 6, set bit 5 and reset bit 4 of the motor direction signals, DIRECT as identified in the RAM Useage table set forth earlier. These bits are in the general RAM 96 and they will be outputted to the PIO 105 which controls motor direction as in block 356. An assumption is made that azimuth movement is going to be eastward and altitude movement is going to be upward. Now it is necessary to check, as in block 357, whether the desired azimuth is greater than home position. It is undesirable to drive beyond home position. The present design is using 125° east of south as home position. It is possible in the northern latitudes to have the sun rise around 135°. Hence, a check is made to see if the desired azimuth is greater than home position as in block 357 and, if it is, the difference between the present azimuth and the desired azimuth is set to 0 as in block 358 so there will be no movement beyond home position. Generally, however, there will be no call for a movement past home position and it will be merely necessary to subtract the desired azimuth, DESAZM, from the present azimuth, PREAZM, as in block 359. But the present azimuth has to be multiplied by a factor of 1032 divided by 1024 in this example because of the particular gear ratio between the driving motors and the azimuth shaft. Since the present azimuth is accumulated in full counts, it is necessary to convert by this factor. This gets the gear positions synchronized with the actual pulse counts.

Performing the foregoing calculation reveals the difference between where the concentrator is and where it should be. Hence, in decision block 360, a check is made to see if that difference is positive. If it is, a portion of the flow chart and program is jumped as indicated by the path marked yes flowing from decision block 360. If, the difference is negative, it means the direction of the concentrator is not going to be eastward so it is necessary to reset bit 7 and set bit 6 as in block 361, to cause the concentrator to move in the westward direction. Since the negative characteristic has now been compensated, the difference is redefined as being positive as in block 362 so it can be handled easier in a division routine.

Next a determination is made as to whether the difference is greater than 1536. This number relates to the maximum number of bits per second or step rate that can be provided to the stepping motors for them to react without missing steps. If the difference exceeds 1536, an erroneous result will occur and in this example, using 16-bit data, an overflow in an ensuing division will occur. Normally, when the sun is being tracked if it is on track in the morning and continues all day, the difference will be far from 1536 in this example. The difference is more likely to be 10 or 20 1/32° increments at most. The most likely time for a difference of 1536 to exist would be at night.

If the difference is greater than 1536 as in block 362', the difference is set to 1536 as in block 363 so the maximum allowable collector rate is obtainable but the handling rate of the system is not exceeded.

The azimuth rate, AZMRAT, is then calculated as in block 364. It equals the time base, TMBASE, divided by the difference just mentioned times the number of steps per 1/32 of a degree. The time base is a number previously defined and relates to the number of clock pulses per second. This completes calculation of the azimuth step rate.

Then as in the subroutine designated CAL3 in FIG. 13, the altitude step rate is calculated. The same considerations as applied to the azimuth calculation apply to the altitude calculations which run from block 356 through block 371. Again, as in block 365, the difference is calculated for the altitude by subtracting the desired altitude, DESALT, from the quantity of the present altitude PREALT multiplied by 1032 divided by 1024 to correct for the gear ratio. If, as in block 366, the difference is greater than or equal to 0 a portion of the program including blocks 367 and 368 can be skipped. However if the difference is negative, it is necessary to change the direction in which the altitude is going to move. This is done by resetting bit 5 and setting bit 4 of the direction register, DIRECT, of RAM 96 and then converting the difference to a positive number as in block 368. Then a check is made to see if the altitude difference is greater than 1536 as in block 369. If it is, the difference is set equal to 1536 to avoid exceeding the permissble step rate. Then an equation is evaluated as in block 371. This equation states that the altitude rate, ALTRAT, is equal to the time base, TMBASE divided by the difference times the altitude step, ALSTEP, which is the number of steps per 1/32 of a degree. This is also the number of clock pulses per 1/32 of a degree and not the number of motor steps. Actually, the motors used in this example are responding at about 125 steps per second. If the processor had a larger number handling capacity it would not be necessary to be concerned about the 1536 maximum rate.

Figure 14:
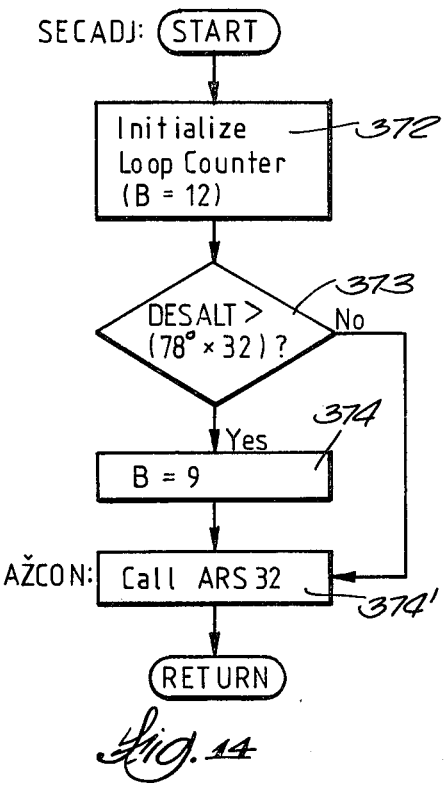

The remainder of the flow chart consists of several arithmetic subroutines that are used throughout the program. The first one in FIG. 14 is secant adjust, SECADJ. Its use was alluded to earlier. The interpolation subroutine, which is discussed later, defines the secant. It uses double precision data depending upon where in the table stored in EPROM the number which must be interpolated is located.

In regard to SECADJ, when there is a return from the interpolation routine to interpolate a secant function, it is necessary in the present program to shift the results to the right either 12 bits or 9 bits. If there is a 12-bit shift to the right, a loop counter as in block 372 is loaded with a 12. But if the desired altitude, DESALT, in this case of calculating the secant, is greater than 78° as in block 373, it is only necessary to shift 9 bits to the right so the loop counter is loaded with a 9 as in block 374 and the shifting routing, ARS32 is called as in block 374'. It takes 32-bit number and shifts it to the right B times, which if B equals 9, is 9 bits and if B equals 12, is 12 bits. AZCON is a label indicating this block of the program.

Figure 15:
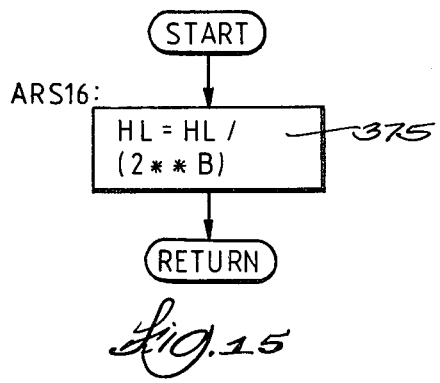

The next subroutine as in FIG. 15 is labeled ARS16. It just shifts a 16-bit number B bits to the right which is essentially the same as dividing by $2^B$ as indicated in block 375.

Figure 16:
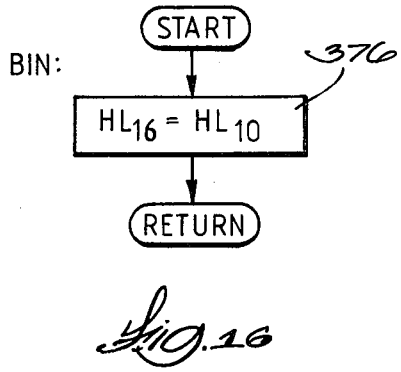

The next subroutine as in FIG. 16 is labeled BIN. As indicated in block 376, it is the subroutine that takes the content of the H and L registers in BCD format and converts it to hexadecimal and puts the results in the H and L register.

Figure 17:
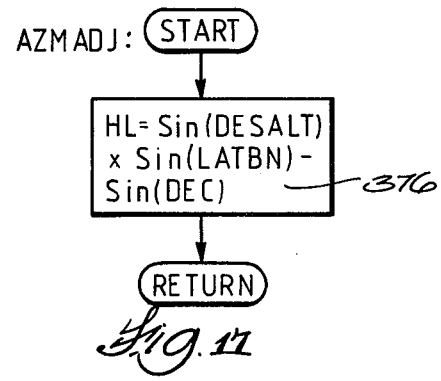

The next subroutine as in FIG. 17 is labeled AZMADJ. It is a subroutine that calculates the azimuth when the acccosine equation (3) is used. It is also used by the arcsine equation (2) to determine which quadrant the azimuth falls. As indicated earlier, the sign of the result of block 376 determines the quadrant.

Figure 18:
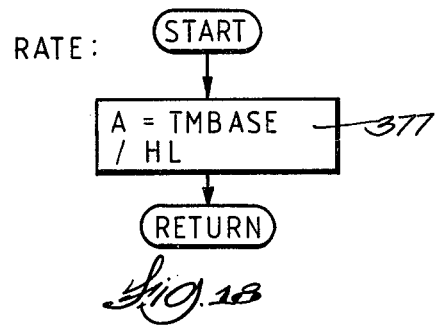

The next subroutine as in FIG. 18 is simply a divide routine and is labeled RATE. It takes the time base, TMBASE, and divides it by the contents of the H and L register. It takes a 16-bit number and divides it by an 8-bit number and comes up with an 8-bit results as in block 377.

Figure 19:
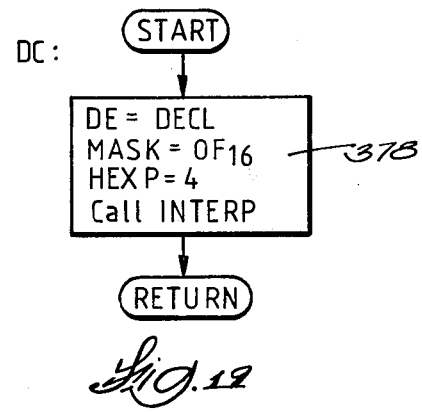

The interpolation routine in FIG. 19 will be considered next. There are several entry points to this routine. The first is for calculating declination and is labeled DC. The registers and functions involved are indicated in blocks 378. A pointer register DE has to be intialized to interpolate declination. Register DE is loaded with declination, DECL, which is a pointer to the data for declination. A mask register is also loaded with 0F hexadecimal or 16 decimal. It is used in the interpolation routine to indicate that the specific data points in the table are spaced 16 apart. HEXP, the exponent would be 4, consistent with mask of 16 because the exponent of 16 is 4. The tables are, of course, stored in the EPROM 95.

The next interpolation subroutine as in FIG. 20 is labeled ET and is for calculating the equation of time, E. To calculate ET for the equation of time, register DE is loaded with a pointer to the data EOFT for the equation of time. Again the mask is 0F and the exponent is 4. The equation of time is defined in one way as the difference between apparent solar time and solar mean time. It is a number that results from the travel of the earth around the sun being elliptical. It is difficult to calculate directly so it is interpolated from data. The routine appears in box 379. It involves initializing the three variables so when the interpolation routine is called, it will interpolate. The result is E. The equation of time is obtained from published data and is stored in EPROM for every 16-day interval in a year. Sufficient accuracy is obtainable by calculating E once per day by interpolating.

The next subroutine as in FIG. 21 is labeled SI. It is used to interpolate the sine function. The sine table is EPROM 95. The first thing to do is reset status bit 5 which is uses as indication of whether the function is positive or negative. The content of the H and L register in the microprocessor is the number of which the sine is being taken. If the number is positive, as in decision block 381, nothing needs to be done and the program continues to process block 382. If it is not positive, bit 5 is set and the negative of the value in the H and L register is taken as in block 383 which results in conversion of the value to a positive number. Then the three parameters are initialized again, that is, the DE register is caused to point to the sine table, the mask is now 3F hexadecimal, which corresponds to an exponent of 6. Then the interpolation routine is called which returns with the sine of the value that was in the H and L register. Then bit 5 is examined as in decision block 384 to see if it is set to 1. If it is 1, it is known that the initial data was negative so that has to be taken into account by taking the negative of the result as in block 385 which indicates the trigonometric identity that the sine of x is equal to −sine of −x. Of course, when bit 5 was checked in block 384 it was not set, a positive number is indicated to start with and an exit is made directly to RETURN.

The next subroutine as in FIG. 22 is labeled CO for cosine. This is the subroutine that shifts the cosine 90° from the sine. This is done by taking the sine data, adding 90° times a factor of 8 to get the correct resolution as in block 386 and then the sine routine is called as in block 386'. The sine routine then calculates the sine but because of the 90° phase shift the cosine results.

Figure 23:
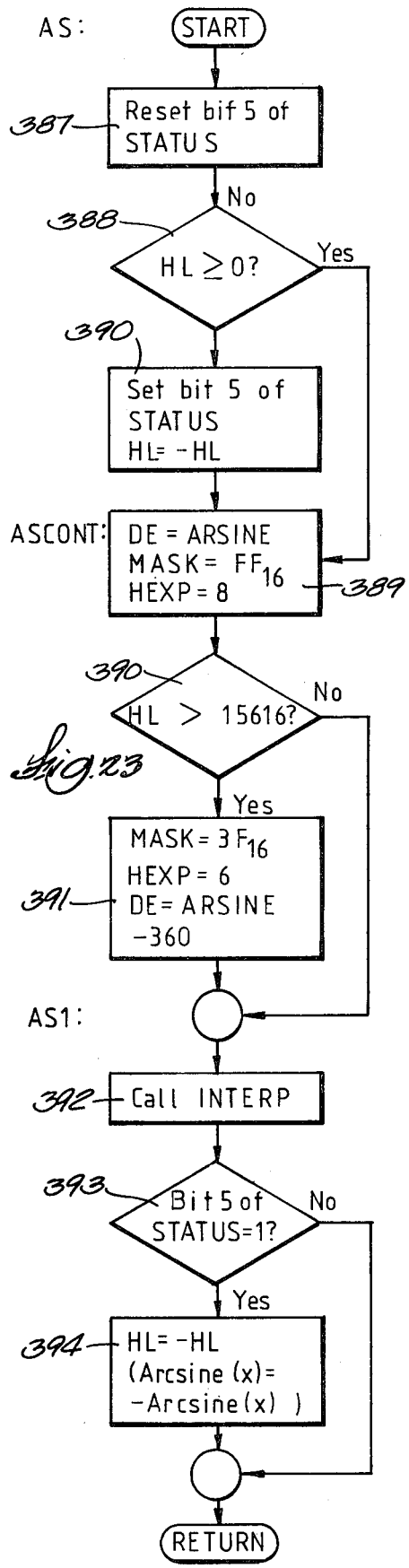

The next routine as in FIG. 23 is labeled AS and is the arcsine routine. First status bit 5 is reset as in block 387 which indicates whether the data is positive or negative. If it is positive, the program continues from decision block 388 to process block 389 where the three variables of interest are again initialized. If the data is not positive but is negative, status bit 5 is set as in block 390 to convert the negative data to positive data. When block 389 is reached through either path from decision block 388, the table pointer DE is loaded with the location of the arcsine, ARSINE, the mask is set to equal FF or hexadecimal 16 which corresponds with an exponent, HEXP of 8. The arcsine is then calculated.

A check is now made in decision block 390 as to whether the data in the HL register is greater than 15616. If it is, we are in a position in the arcsine table where the space between each data point is different than for the original setup. Therefore, a mask is equal to 3F, hexadecimal, and the exponent is equal to 6 to be consistent with the 3F. The table pointer DE has to be shifted by a count of 360 to take into account the different spacing of the data as indicated in process block 391. If the data was less than 15616, the program can continue and the interpolation routine can be called as in block 392 and then a check is made as in decision block 393 as to whether status bit 5 is set or equal to 1 which is indicative that the arcsine data is negative. If bit 5 was set, the negative number which it indicates has to be converted as in block 394 to a position number.

Figure 24:
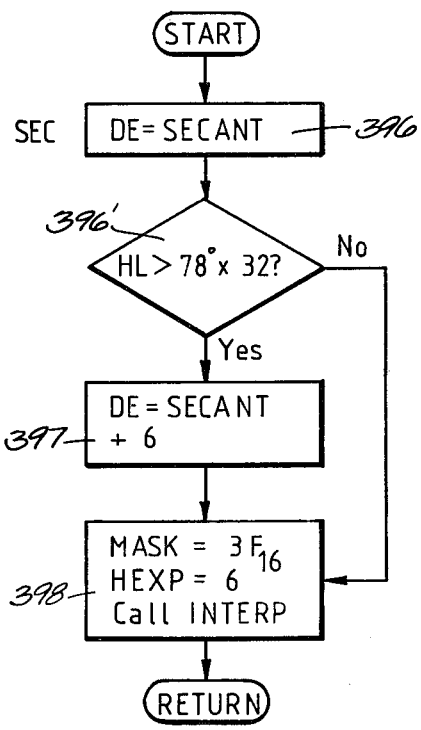

The next routine in FIG. 24 is the secant routine labeled SEC. As in block 395, the DE register is loaded to point to the secant table in the EPROM. Next a check is made as in block 396 as to whether the data is greater than 78° times 32. If it is greater, the table pointer is adjusted to a value of secant plus 6 as in block 397. After this, as in block 398, the mask is loaded with 3F, hexadecimal, and an exponent of 6 and the interpolation routine for secant is called. If the data in the HL register is not greater than 78° times 32, the program continues directly from decision block 396 to process block 398 where the processes just described are performed and the interpolation routine is called.

Figure 25:
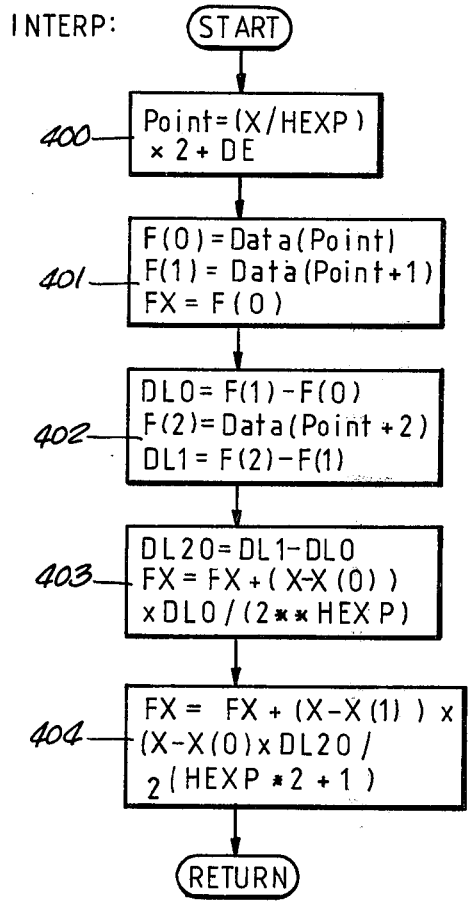

The interpolation routine, labeled INTERP, is set forth in FIG. 25. This second-order interpolation routine is analogous to the routine described in the article by T. A. Seim in the February, 1978 issue of "Computer Design" magazine which was cited earlier. Of course, the program for the forward interpolation routine in the Seim article is expressed in the mnemonics or instruction code of a type 8080 microprocessor whereas, in the present program, the mnemonics and instruction code are for a type Z-80 microprocessor. Moreover, in the article, the program is given for interpolating data in one table but in the present case, a general interpolation routine is used for interpolating functions in a sine, cosine, arcsine, declination, equation of time and secant tables.

Because, in the present case, six different functions are being interpolated and there are six different tables, a table pointer register must be initialized for whatever function is going to be interpolated. The register in the microprocessor which will contain the table pointer is called the DE register in the case. The spacing of the data points may be different in the various tables. The spacing between data points is specified in two ways, by a mask and an exponent. The declination table has data points for every 16 days. The equation of time, E, table has data points for every 16 days. The sine function has data points at 8° intervals. The resolution of the sine of x is degrees times 8 and the resulting sine of x is expressed as sine of x times 16384. It is necessary to multiply by some number such as 16384 to obtain whole numbers since the microprocessor can only work with whole numbers. Multiplying by a large number provides reasonable resolution and accuracy. Since the cosine function is calculated using the sine function, the cosine has the same equivalent interval of 8° for data. Resolution is in terms of degrees times eight and the results is cosine of x times 16384. The arcsine table has data specified at intervals of 256, but the resolution is sine x times 16384 and the result is expressed in degrees times 128 as can be seen in the program listing. For the secant function, the resolution of the input data, x, is in terms of degrees times 32. The result is expressed in terms of secant of x times 4096. However if the angle x is greater than 78°, the result is expressed as secant times 1024. Greater resolutions must be obtained for secant functions as 90° is approached since secant tends toward infinity at 90°. The majority of the secant table yields secant times 4096. The last portion yields secant times 1024 to provide greater accuracy where the function changes rapidly for a small change in the angle.

The flow chart for the interpolation routine, INTERP, is shown in FIG. 25. When this routine is called, the first thing that has to be done is to set the table pointer register, DE, to its points to the table for the particular function which is to be interpolated. Setting of the pointer is indicated in block 400. The data x in the particular table is divided by HEXP. HEXP is a divisor constituting 2 raised to some exponent B. This is equivalent to shifting the multiple bit data number B bits to the right. The quantity in the parentheses in block 400 amounts to the data divided by the data spacing multiplied by 2 becauase each entry, in this case is in 2 bytes. This is the amount by which the original pointer DE for the particular table must be indexed to point to the proper place in the table.

Now, having the pointer, the first term F(0) may be calculated as in block 401. The first term is the data point, that is, a point in the table which is on one side of the give data that is to be interpolated. As an example, assume that a sine function were being interpolated. The table holds the sine functions for 8° intervals. Assume now that the function sought is the sine of 12° which is halfway between the sine of 8° and the sine of 16°. In real numbers, the sine of 8° is 0.13917 and of 16° is 0.27564. The table pointer in block 400, DE, refers to the first data in the table and it has been indexed to point to a position between the first and second data of interest. Actually the sine of 12° is obtained by interpolating between the second and third data points which, in this case would be 8° and 16°. Using normal single order interpolation methods, it is known that the spacing is 8° but the data corresponds with 12° which is halfway between 8° and 16°. So we want to take one-half of the difference between the sine of 8° and the sine of 16° and add this amount to the sine of 8° to make a first order approximation of the sine of 12°. Actually 12 is divided by 8 which yields 1.5 but is truncated to equal 1. The microprocessor only handles whole numbers. Essentially that is what box 400 in the INTERP routine does. It takes the incoming data x and divides it by the exponent and multiplies by 2 as is necessary because the microprocessor is dealing with 16-bit numbers and the RAM locations each contain an 8-bit byte of the 16 bits. The second data point is located by taking the address of the base pointer and adding a fixed number to it which, in this example, would be the address for the sine of 8°. So at this point we have F(0) as the data at the new pointer for the sine of 8° which is 0.13917.

The next pointer of interest, F(1) is the data at the pointer plus 2, because of 2 bytes, which points to the sine of 16° which is 0.27564. As a first approximation for the function of the sine of 12°, it is taken as the sine of 8° which is 0.13917. This is the first approximation of F(X). To continue the interpolation process as in box 402, F(1), the second data point has F(0) the first data point substracted from it as in box 402. The result of F(1) minus F(0) would be 0.27564 minus 0.13917 which equals 0.13647 which is DL0. Then F(2) is determined. F(2) is the third data point or 0.40673, the sine of 24°. In calculating DL0, the difference between 8° and 16° is determined but this is equivalent to the slope of the sine function between these two points. F(2) is, of course, the data point indexed by +2.

Now DL1 is calculated as the slope between 16° and 24°. In other words DL1 is equal to F(2), the sine of 24° minus F(1), the sine of 16°. In real numbers, this amounts to 0.40673−0.27564 which yields 0.13109. The slope is actually the first derivative.

The next box 403 has an expression for DL20 which is actually an indication of the second derivative. The second derivative is the rate of change of the first derivative. DL1 and DL0 are indications of the first derivative so if one is subtracted from the other an indication of the second derivative is obtained and, in this particular example, the value is 0.00538. So continuing with this example in relation to box 403, some of the terms of the function can be assembled. Hence FX is evaluated where FX equals FX plus (x−x(0))×DL0/(2\*\*HEXP). In the real number example, this means FX is equal to the previous value, which was an initial approximation of the sine of 8°, 0.13917, plus x, which is the data, minus x(0). This is equivalent to saying we have the sine of 12° minus the sine of 8° which would be 4° times the first derivative of the sine between 8° and 16° which was 0.13917, divided by 2 times the exponent which is 8 in this case because of the 8° intervals. This process is carried out in block 403. Actually this is the result of first-order interpolation. The first order interpolation yields 0.20741 for the sine of 12°.

Now more accuracy is obtained by continuing with a second-order interpolation which the second derivative is taken into account. This is done in block 403. Here x minus x(1), continuing with the example, would be 12° minus 16° which is equal to −4°, times x minus x(0) which is 12° minus 8°, times the second derivative or second difference which is 0.00538, divided by 2(HEXPx2+1), the interval, which is 128. In this example, this calculates FX as equal to 0.20741 minus 0.00067 which is equal to the more accurate 0.20808 for the sine of 12° which is actually 0.20791.

Remaining subroutines will now be discussed. The first as in FIG. 26 is labeled ARS 32 which is a right shift routine that takes a 32-bit number and shifts it to the right B places. As is well-known, this is equivalent to dividing a 32-bit or any other digital number by 2 to some power of B. In the particular microprocessor used, registers DEHL specified in block 405, are 8-bit registers but for this routine they are handled as a 32-bit register.

The next subroutine as in FIG. 27 is labeled ALS 32 and involves process block 406. This subroutine is for multiplying a number in the D, E, H and L registers by 2 where these 8-bit registers are used jointly to provide a 32-bit number. This multiplication shifts the number to the left 1 bit and amounts to multiplying the number by 2.

Figure 28:
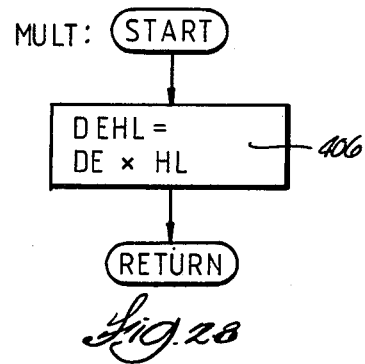

The next subroutine as in FIG. 28 is labeled MULT. As in block 407, it takes two 16-bit numbers and multiplies them and comes up with a 32-bit result.

Figure 29:
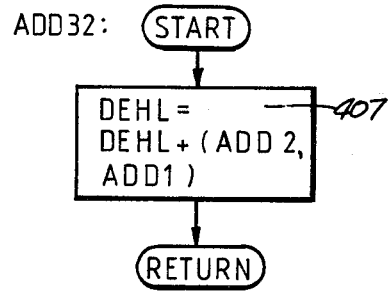

The last subroutine as in FIG. 29 is labeled ADD32. As in block 407, it takes two 32-bit numbers, adds them together and puts the result in registers D, E, H and L. One number is in the D, E, H and L registers to start with and the other is in four RAM locations represented by the variable names ADD1 and ADD2.

The microprocessor program listing is attached as an appendix to this specification and is comprised of Parts I and II which are initialization and calculation parts of the program. The listing is written in symbolic language or mnemonics provided in the cited technical manual for the Z-80 microprocessor.

In the preferred embodiment of the solar collector mounting and drive mechanism, which has been described in detail, the collector is driven on two axes, an azimuth axis which is vertical and an altitude axis which is orthogonal to the azimuth axis. Electric stepping type motors are used for driving the collector on these axes. It should be understood, however, that the concept of using a preprogrammed open loop controller is also applicable to alternative dual axes mountings and drive mechanisms. Equatorial mountings such as are used to support and move telescopes is one example of an alternative mounting.

An equatorial mounting is characterized by having one axis pointed at the pole start at an angle with respect to horizontal that corresponds with the latitude of the collector installation. The collector is also mounted for turning on an equatorial axis which is orthogonal to the polar axis. The collector is set to the proper altitude angle with respect to horizontal to set it onto the path of the sun and turned on the polar axis in which case it will track the path of the sun since the polar axis is the nominal center of rotation for the sun and the collector. With an equatorial mounting, it might be acceptable to change the equatorial axis only once per day and drive the polar axis at a constant speed. Of course, with an equatorial mounting, the equations used for calculating the position of the sun would be somewhat different than those set forth earlier herein, but those skilled in the art should be able to device suitable equations for any case where the collector turns on axis that are at a predetermined and fixed angle relative to each other.

The applicability of the new open loop controller system is not limited to using stepping type electric motors for driving a collector on each axis as in the illustrative embodiment. Other motor means such as hydraulic and pneumatic operators could be used too. The mechanical modifications required to use the signals resulting from the positional calculations by the processor should be easy to make by those skilled in the electronic and mechanical arts.

Finally, it should also be recognized that the time of the day and longitude information do not have to be inputted directly to the controller. If the controller has data corresponding with the declination of the sun for the day, the hour angle of the sun and the latitude of the installation, time and longitude are automatically taken care of since time and longitude are inherent in the declination and hour angle of the sun.

APPENDIX

PART I - INITIALIZE

```
; THIS PROGRAM RESIDES IN ROM FROM 0000H TO 0BFFH.
; RAM IS LOCATED AT 3000H TO 30FFH.
;
; AN APPROPRIATE NUMBER OF MOTOR STEP COMMANDS WILL BE ISSUED TO
; THE ALTITUDE AND AZIMUTH STEPPING MOTOR DRIVE CIRCUITS SO AS TO
; BRING THE SOLAR COLLECTOR INTO THE POSITION AS CALCULATED FROM
; THE DATE-TIME CLOCK, LATITUDE, AND LONGITUDE FROM STANDARD TIME
; MERIDIAN SETTINGS.
;
OFFSET:  EQU    -1000H      ; (-1000H) TO EXECUTE THE PROGRAM AT 0000H.
                            ; ( 0000H) TO EXECUTE THE PROGRAM IN STANDARD
                            ; CROMEMCO FORMAT.
RAM:     EQU    3000H       ; BOTTOM OF RAM
STACK:   EQU    30FFH       ; TOP OF STACK
ALSTEP:  EQU    42D         ; CTC PULSES PER 1/32 DEGREE OF MOVEMENT
AZSTEP:  EQU    42D         ; CTC PULSES PER 1/32 DEGREE OF MOVEMENT
MXSTEP:  EQU    1           ; =1/2*(1/100 STEP PER SEC/.002 SEC)
VECTOR:  EQU    03H         ; LOCATION OF INTERRUPT TABLE
VECTHI:  EQU    VECTOR*256  ; CONVERT TO ABSOLUTE VALUE OF HIGH BYTE
VECT20:  EQU    0F0H        ; INTERRUPT VECTOR FOR TIME BASE CTC.
VECT24:  EQU    0F8H        ; INTERRUPT VECTOR FOR MOTOR STEP CTC.
TIME1:   EQU    2           ; DIVIDE BY 1
TIME2:   EQU    125         ; DIVIDE BY 125
TIME3:   EQU    125         ; DIVIDE BY 250
TIME4:   EQU    120         ; DIVIDE BY 120
MODE1:   EQU    05H         ; TIMER MODE-NO INTERRUPT
MODE2:   EQU    45H         ; COUNTER MODE-NO INTERRUPT
MODE3:   EQU    0C5H        ; COUNTER MODE-WITH INTERRUPT
MODE4:   EQU    47H         ; COUNTER MODE-NO INTERRUPT-STOP COUNT
                            ; UNTIL CONSTANT IS LOADED
MODE5:   EQU    43H         ; COUNTER MODE-NO INTERRUPT-STOP COUNT-
                            ; TIME CONSTANT DOES NOT FOLLOW
AZHM:    EQU    3969D       ; PRESENT HOME POSITION = 125*1024/1032*32
                            ; THIS IS BECAUSE OF THE GEAR REDUCTION
                            ; OF THE MOTOR SHAFT OUTPUT.
ALHM:    EQU    00D
STATUS:  EQU    0           ; STATUS BYTE
PREALT:  EQU    1           ; PRESENT LOCATION OF ALTITUDE AXIS
PREAZM:  EQU    3           ; PRESENT LOCATION OF AZIMUTH AXIS
DESALT:  EQU    5           ; DESIRED LOCATION OF ALTITUDE AXIS
DESAZM:  EQU    7           ; DESIRED LOCATION OF AZIMUTH AXIS
ALTRAT:  EQU    9
AZMRAT:  EQU    0AH
MIN:     EQU    0BH         ; RAM LOCATION OF MINUTES
HR:      EQU    0CH         ; RAM LOCATION OF HOURS
DAY:     EQU    0DH         ; RAM LOCATION OF DAYS
DIRECT:  EQU    0FH
```

```
LONG:   EQU     24H
LAT:    EQU     26H
DEC:    EQU     28H
DAYEN:  EQU     2CH
ARS16:  EQU     062CH
;
; MAIN PROGRAM
;
START:  LD      IX,RAM          ; INITIALIZE RAM POINTER
        LD      SP,STACK        ; INITIALIZE STACK POINTER
        LD      A,VECTOR        ; INITIALIZE INTERRUPT
        LD      I,A             ; VECTOR TABLE POINTER
        LD      (IX+STATUS),00000011B    ; REQUEST RESET AND COLLECTOR NOT HOME
; INITIALIZE CTC PORT 20 (1 PULSE OUT PER 16 USEC.)
        LD      A,MODE1         ; LOAD TIMER MODE
        OUT     20H,A           ; FOR 1ST COUNTER OF CLOCK MODULE
        LD      A,TIME1         ; LOAD TIME CONSTANT
        OUT     20H,A           ; FOR 1ST COUNTER
; INITIALIZE CTC PORT 21 (1 PULSE OUT PER 2 MSEC.)
        LD      A,MODE2         ; LOAD COUNTER MODE-NO INTERRUPT
        OUT     21H,A           ; FOR 2ND COUNTER OF CLOCK MODULE
        LD      A,TIME2         ; LOAD TIME CONSTANT
        OUT     21H,A           ; FOR 2ND COUNTER
; INITIALIZE CTC PORT 22 (1 PULSE OUT PER 0.5 SEC.)
        LD      A,MODE3         ; LOAD COUNTER MODE WITH INTERRUPT
        OUT     22H,A           ; FOR 3RD COUNTER OF CLOCK MODULE
        LD      A,TIME3         ; LOAD TIME CONSTANT
        OUT     22H,A           ; FOR 3RD COUNTER
; INITIALIZE CTC PORT 23 (1 PULSE OUT PER 1 MIN.)
        LD      A,MODE3         ; LOAD COUNTER MODE WITH INTERRUPT
        OUT     23H,A           ; FOR 4TH COUNTER OF CLOCK MODULE
        LD      A,TIME4         ; LOAD TIME CONSTANT
        OUT     23H,A           ; FOR 4TH COUNTER
; LOAD INTERRUPT VECTOR FOR PORTS 20 (21,22,23)
        LD      A,VECT20        ; LOAD VECTOR
        OUT     20H,A           ; OUTPUT TO CTC
; INITIALIZE 8279-PORT 35=COMMAND, PORT 34=DATA
        LD      HL,RAM+MIN
        LD      (HL),00H        ; SET MINUTES TO 00
        INC     HL
        LD      (HL),00H        ; SET HOURS TO 00
        INC     HL
        LD      (HL),00H        ; SET DAYS TO 00
        INC     HL
        LD      (HL),0F0H       ; BLANK DIGIT 8, DIGIT 7=0
        LD      HL,RAM+MIN      ; SET BYTE POINTER
        LD      D,00H           ; LED'S OFF, CLOCK DATA
        CALL    DISP+OFFSET     ; INITIALIZE DISPLAY
; INITIALIZE PIO-PORT 28=DATA, PORT 29=COMMAND
        LD      A,0CFH          ; SET CONTROL MODE
        OUT     29H,A           ; OUT
        LD      A,11111111B     ; ALL BITS ARE INPUTS
        OUT     29H,A
        LD      A,00000111B     ; INTERRUPTS DISABLED
        OUT     29H,A
; INITIALIZE PIO-PORT 2AH=DATA, PORT 2BH=COMMAND
RESET:  LD      A,0CFH          ; CONTROL MODE
        OUT     2BH,A
        LD      A,00000000B     ; ALL BITS ARE OUTPUTS
        OUT     2BH,A
        LD      A,00000111B     ; INTERRUPT DISABLED
        OUT     2BH,A           ; AND MASK DOES NOT FOLLOW
        LD      (IX+DIRECT),10010000B   ; AZIMUTH POSITION TO INCREASE
        LD      A,(IX+DIRECT)   ; ALTITUDE POSITION TO DECREASE
        OUT     2AH,A
        RES     0,(IX+STATUS)   ; CLEAR FIRST REQUEST OF RESET
; INITIALIZE CTC PORT 25 (AZIMUTH STEPS PER SIXTEENTH OF A DEGREE)
        LD      A,MODE3         ; COUNTER MODE
        OUT     25H,A           ; INTERRUPT ENABLED
        LD      A,AZSTEP        ; STEP PER SIXTEENTH OF A DEGREE
        OUT     25H,A
```

```
; INITIALIZE CTC PORT 27 (ALTITUDE STEPS PER SIXTEENTH OF A DEGREE)
        LD      A,MODE3      ; COUNTER MODE
        OUT     27H,A        ; INTERRUPTS ENABLED
        LD      A,ALSTEP     ; STEPS PER SIXTEENTH OF A DEGRE
        OUT     27H,A
; INITIALIZE CTC PORT 24 CONSTANT AND PORT 26 CONSTANT
        LD      (IX+ALTRAT),MXSTEP
        LD      (IX+AZMRAT),MXSTEP
; LOAD INTERRUPT VECTOR FOR PORTS 24 (25,26,27)
        LD      A,VECT24     ; LOAD VECTOR
        OUT     24H,A        ; OUTPUT TO CTC
        CALL    STEP+OFFSET  ; MOTORS WILL STEP UNTIL HOME
                             ; LIMIT SWITCHES ARE ACTIVATED
; ENABLE INTERRUPTS AND WAIT
HALT:   IM      2            ; SET INTERRUPT MODE 2
        EI
        HALT
        BIT     0,(IX+STATUS) ; FIRST REQUEST OF RESET IF BIT 0=1
        JR      NZ,RESET     ; JUMP IF FIRST REQUEST OF RESET
        BIT     7,(IX+STATUS)
        CALL    NZ,INP+OFFSET ; CALCULATE AZIMUTH AND ALTITUDE
                             ; IF BIT 7 = 1 (CONDITIONS ARE MET)
        RES     7,(IX+STATUS) ; CALCULATIONS COMPLETED
        JR      HALT         ; JUMP AND WAIT
; SUBROUTINE TO CHECK INPUT SIGNALS
SUBR1:  DI
        IN      A,(28H)      ; INPUT SIGNALS
                             ; BIT 7 - RESET
                             ; BIT 6 - DAY ADVANCE
                             ; BIT 5 - HOUR ADVANCE
                             ; BIT 4 - MINUTE ADVANCE
                             ; BIT 3 - POWER ON
        LD      B,A          ; SAVE THE INPUT SIGNALS
        BIT     3,B          ; BIT 3=1, AC POWER IS ON
        JR      NZ,CONT1     ; JUMP IF POWER IS ON
        BIT     2,(IX+STATUS) ; WAS POWER OFF LAST TIME?
        JR      NZ,CONTA     ; YES, THEN JUMP
        LD      A,MODE5      ; STOP MOTOR STEPS
        OUT     24H,A        ; BECAUSE POWER IS OFF
        OUT     26H,A        ; AND
        LD      A,00H        ; NO MOTOR DIRECTION
        OUT     2AH,A
        RES     1,(IX+STATUS) ; CLEAR RESET REQUEST
        SET     2,(IX+STATUS) ;BIT 2 OF STATUS=1.
CONTA:  RETI
CONT1:  RES     2,(IX+STATUS) ; BIT 2=0, POWER IS ON
        BIT     7,B          ; IS RESET REQUESTED?
        JR      NZ,CONT4     ; NO, IF BIT 7=1
        BIT     1,(IX+STATUS) ; WAS RESET REQUESTED LAST TIME?
        JR      NZ,CONT2     ; YES, THEN JUMP
        SET     0,(IX+STATUS) ; BIT 0=1, FIRST TIME FOR RESET REQUEST
        SET     1,(IX+STATUS) ; RESET IS REQUESTED
        JR      CONT2
CONT4:  BIT     3,(IX+STATUS)
        JR      Z,CONT2      ; JUMP IF ALTITUDE IS NOT HOME
        BIT     4,(IX+STATUS)
        JR      Z,CONT2      ; JUMP IF AZIMUTH IS NOT HOME
        RES     1,(IX+STATUS) ; RESET COMPLETED
CONT2:  BIT     4,B          ; BIT 4=0
        JR      Z,INCMIN     ; JUMP TO INCREMENT MINUTE
        BIT     5,B          ; BIT 5=0
        JR      Z,INCHR      ; JUMP TO INCREMENT HOUR
        BIT     6,B          ; BIT 6=0
        JR      Z,INCDAY     ; JUMP TO INCREMENT DAY
        RETI
AZAL:   DI
        RES     7,(IX+STATUS) ; CLEAR CALCULATION REQUEST
        BIT     1,(IX+STATUS)
        JR      NZ,INCMIN    ; JUMP IF RESET IS IN PROGRESS
        BIT     2,(IX+STATUS)
        JR      NZ,INCMIN    ; JUMPT IF POWER IS OFF
```

```
                SET     7,(IX+STATUS)   ; ENABLE CALCULATION OF AZIMUTH
                                        ; AND  ALTITUDE
INCMIN:  LD     HL,RAM+MIN      ; SET MEMORY POINTER TO MINUTES
         LD     A,(HL)  ; LOAD MINUTES
         ADD    A,01H   ; ADD 1
         DAA
         CP     60H     ; MINUTES = 60?
         JR     NZ,RET1 ; NO - JUMP
         XOR    A       ; SET MINUTE = 0
         LD     (HL),A  ; SAVE MINUTES
INCHR:   LD     HL,RAM+HR       ; SET MEMORY POINTER TO HOUR
         LD     A,(HL)  ; LOAD HOURS
         ADD    A,01H   ; ADD 1
         DAA
         CP     24H     ; HOUR = 24?
         JR     NZ,RET1 ; NO - JUMP
         XOR    A       ; SET HOUR = 0
         LD     (HL),A  ; SAVE HOUR
INCDAY:  LD     HL,RAM+DAY      ; SET MEMORY POINTER TO DAY
         LD     A,(HL)  ; LOAD DAYS
         ADD    A,01H   ; ADD 1
         DAA
         JR     NC,RET2 ; NO CARRY, THEN JUMP
         LD     (HL),A  ; SAVE DAYS
         INC    HL      ; INCREMENT MEMEORY POINTER
         LD     A,(HL)  ; LOAD HUNDRED DAYS
         ADD    A,01H   ; ADD 1
         JR     RET1
RET2:    CP     67H     ; DAYS = 67?
         JR     NZ,RET1 ; NO - JUMP
         LD     (HL),A  ; SAVE DAYS
         INC    HL      ; INCREMENT MEMORY POINTER
         LD     A,(HL)  ; LOAD HUNDRED DAYS
         CP     0F3H    ; HUNDRED DAYS = 3?
         JR     NZ,RET1 ; NO - JUMP
         LD     A,0F0H  ; SET HUNDRED DAYS = 0
         LD     (HL),A  ; SAVE HUNDRED DAYS
         DEC    HL      ; RESTORE POINTER TO DAYS
         XOR    A       ; SET DAYS = 0
RET1:    LD     (HL),A  ; SAVE CONTENTS OF A
         LD     HL,RAM+MIN      ; SET POINTER FOR DISPLAY
         CALL   DISP+OFFSET
         RETI
; HL POINT TO THE MEMORY LOCATION OF THE
; FIRST BYTE TO BE OUTPUT TO THE DISPLAY
DISP:    LD     A,04H   ; SET FOR 8 CHARACTERS
         OUT    35H,A
         LD     A,34H   ; SCAN = CLOCK/20
         OUT    35H,A
         LD     A,0A0H  ; WRITE TO A & B NIBBLE
         OUT    35H,A   ; OF DISPLAY
         LD     A,90H   ; WRITE TO DISPLAY AT DIGIT
         OUT    35H,A   ; ZERO WITH AUTO INCREMENT
         LD     B,04H   ; SET LOOP COUNTER
         LD     A,00H   ; LED'S OFF
DISP1:   RRD            ; GET NIBBLE
         OUT    34H,A   ; OUTPUT TO DISPLAY
         RRD            ; GET NIBBLE
         OUT    34H,A   ; OUTPUT TO DISPLAY
         RRD            ; RESTORE BYTE
         INC    HL      ; POINT TO NEXT BYTE
         DEC    B       ; DECREMENT LOOP COUNTER
         JR     NZ,DISP1        ; LOOP FOR NEXT BYTE
         RET
; ALTITUDE POSITION CHANGE ROUTINE
; HL WILL CONTAIN PRESENT POSITION
ALT:     DI
         LD     HL,(RAM+PREALT) ; LOAD PRESENT ALTITUDE
         IN     A,(2AH) ; INPUT DIRECTION SIGNALS
         AND    00110000B       ; MASK BITS 5 AND 4
```

```
                JR      Z,ALSTOP        ; BITS=0, NO MOVEMENT IS POSSIBLE
                CP      00110000B       ; ARE BOTH BITS=1?
                JR      Z,ALSTOP        ; YES, THEN THERE IS AN ERROR
                CP      00010000B       ; BIT 4=1?
                JR      Z,ALTDEC        ; THEN INCREMENT POSITION
                INC     HL
                JR      ALTCP
ALTDEC:         DEC     HL
ALTCP:          LD      (RAM+PREALT),HL ; SAVE PRESENT POSITION
                RES     3,(IX+STATUS)
                IN      A,(28H)         ; INPUT HOME SIGNALS
                BIT     0,A
                JR      Z,ALTRET        ; JUMP IF AXIS IS NOT HOME
                LD      HL,ALHM
                LD      (RAM+PREALT),HL ; SAVE HOME POSITION
                SET     3,(IX+STATUS)   ; ALTITUDE IS HOME
                BIT     5,(IX+DIRECT)   ; BIT 5=1, UPWARD COLLECTOR MOVEMENT
                JR      NZ,ALTRET       ; JUMP IF ALTITUDE MOVEMENT IS POSITIVE
ALSTOP:         LD      (IX+ALTRAT),00H
                CALL    STEP+OFFSET
ALTRET:         RETI
; AZIMUTHE POSITION CHANGE
; HL WILL CONTAIN PRESENT POSITION
AZM:            DI
                LD      HL,(RAM+PREAZM) ; LOAD PRESENT POSITION OF AZIMUTH
                IN      A,(2AH)         ; INPUT DIRECTION SIGNALS
                AND     11000000B       ; MASK BITS 7 AND 6
                JR      Z,AZSTOP        ; BITS=0, NO MOVEMENT IS POSSSIBLE
                CP      11000000B       ; BOTH BITS=1?
                JR      Z,AZSTOP        ; YES, THEN THERE IS AN ERROR
                CP      10000000B       ; BIT 7=1?
                JR      Z,AZMINC        ; THEN DECREMENT THE POSITION
                DEC     HL
                JR      AZMCP
AZMINC:         INC     HL
AZMCP:          LD      (RAM+PREAZM),HL ; SAVE PRESENT AZIMUTH
                RES     4,(IX+STATUS)
                IN      A,(28H)         ; INPUT HOME SIGNALS
                BIT     1,A
                JR      Z,AZMRET        ; JUMP IF AXIS IS NOT HOME
                LD      HL,AZHM
                LD      (RAM+PREAZM),HL ; SAVE HOME POSITION
                SET     4,(IX+STATUS)
                BIT     6,(IX+DIRECT)
                JR      NZ,AZMRET       ; JUMP, AXIS IS MOVING AWAY FROM HOME
AZSTOP:         LD      (IX+AZMRAT),00H ; STOP AZIMUTH MOVEMENT
                CALL    STEP+OFFSET
AZMRET:         RETI
;
STEP:           LD      A,(RAM+AZMRAT)
                CP      A,00H
                JR      Z,STEP1         ; NO MOTOR STEP IF RATE = 0 (1/256)
                LD      B,A
                LD      A,MODE4
                OUT     24H,A           ; SET TIMER MODE
                LD      A,B
                OUT     24H,A           ; SET AZIMUTH STEP RATE
                JR      STEP2
STEP1:          RES     7,(IX+DIRECT)
                RES     6,(IX+DIRECT)
                LD      A,MODE5
                OUT     24H,A           ; STOP MOTOR STEP
STEP2:          LD      A,(RAM+ALTRAT)
                CP      A,00H
                JR      Z,STEP3         ; NO MOTOR STEP IF RATE = 0 (1/256)
                LD      B,A
                LD      A,MODE4
                OUT     26H,A
                LD      A,B
                OUT     26H,A           ; SET ALTITUDE STEP RATE
                JR      STEP4
```

```
STEP3:   RES     4,(IX+DIRECT)
         RES     5,(IX+DIRECT)
         LD      A,MODE5
         OUT     26H,A        ; STOP MOTOR STEPS
STEP4:   LD      A,(RAM+DIRECT)
         OUT     2AH,A        ; OUTPUT MOTOR DIRECTIONS
         RET
; INPUT LONGITUDE AND LATITUDE AND CALL CALCULATION ROUTINE
INP:     LD      A,0E0H
         OUT     35H,A        ; CLEAR INTERRUPTS
         LD      A,50H
         OUT     35H,A        ; READ SENSOR RAM AT 0
         IN      A,(34H)
         XOR     0FFH         ; COMPLIMENT EACH BIT
         LD      L,A
         IN      A,(34H)
         XOR     0FFH
         LD      H,A
         LD      B,4
         CALL    ARS16        ; CALL ARS16 OF CALCPROM
         LD      (RAM+LONG),HL  ; SAVE LONGITUDE
         IN      A,(34H)
         IN      A,(34H)      ; ADVANCE SENSOR RAM POINTER
         IN      A,(34H)
         XOR     0FFH
         LD      L,A
         IN      A,(34H)
         XOR     0FFH
         LD      H,A
         LD      B,4
         CALL    ARS16
         LD      (RAM+LAT),HL
         CALL    0400H        ; CALL CALCULATION ROUTINE
         CALL    STEP+OFFSET
         RET
         ORG     1300H+VECT20 ; CREATE INTERRUPT TABLE FOR CTC.
         DW      RESET+OFFSET, RESET+OFFSET, SUBR1+OFFSET, AZAL+OFFSET
         ORG     1300H+VECT24
         DW      RESET+OFFSET, AZM+OFFSET, RESET+OFFSET, ALT+OFFSET
         END     START
```

APPENDIX

PART II - CALCULATE

```
TYPE CALC718.Z80
; RELATIVE MEMORY LOCATION OF VARIABLES
STATUS:  EQU     00
PREALT:  EQU     01
PREAZM:  EQU     03
DESALT:  EQU     05
DESAZM:  EQU     07
ALTRAT:  EQU     09
AZMRAT:  EQU     0AH
MIN:     EQU     0BH
HR:      EQU     0CH
DAY:     EQU     0DH
DIRECT:  EQU     0FH
LONG:    EQU     24H
LAT:     EQU     26H
DEC:     EQU     28H
HRANG:   EQU     2AH
DAYEN:   EQU     2CH
LATEN:   EQU     2EH
; CONSTANTS
ALSTEP:  EQU     42D          ; CTC PULSES PER 1/32 DEGREE
AZSTEP:  EQU     42D          ; CTC PULSES PER 1/32 DEGREE
STAT2:   EQU     40H
ALHM32:  EQU     00D          ; 0 * 32 DESIRED HOME POSITION
AZHM32:  EQU     4000D        ; 125 * 32  DESIRED HOME POSITION
FACT:    EQU     1032D        ; ALT = PREALT*FACT/1024
TMBASE:  EQU     15000D       ; = 250 STEPS/SEC * 60 SEC/MIN
RAM:     EQU     3000H
OFFSET:  EQU     -0C00H       ; MODULE TO RUN IN PROM STARTING AT 0400H
;
```

```
; CALCULATE HOUR ANGLE
; HRANG = 5760 - LONG - E - (480*HR) - (MIN*8)
; HRANG WILL BE EXPRESSED IN 1/8 DEGREES
;
; CONVERT LATITUDE TO BINARY FORMAT
START:  LD      HL,(RAM+LAT)
        CALL    BIN+OFFSET
        LD      DE,51D          ; 8/10*64
        CALL    MULT+OFFSET
        LD      B,6
        CALL    ARS32+OFFSET    ; HL = LAT*8
        LD      (RAM+LATBN),HL
; CONVERT DAY TO BINARY FORMAT
HOUR:   LD      HL,(RAM+DAY)
        CALL    BIN+OFFSET
        LD      (RAM+DAYBN),HL
        CALL    ET+OFFSET       ; E  FROM EQUATION OF TIME
        PUSH    HL              ; E = HL/32
; CONVERT HR TO BINARY FORMAT
        LD      A,(RAM+HR)
        LD      L,A
        LD      H,00H
        CALL    BIN+OFFSET
        LD      DE,480D         ; 1/32 DEGREES PER HOUR
        CALL    MULT+OFFSET
        PUSH    HL
; CONVERT MIN TO BINARY FORMAT
        LD      A,(RAM+MIN)
        LD      L,A
        LD      H,00H
        CALL    BIN+OFFSET
        INC     L               ; ADD 1 FOR NEXT MINUTE
        ADD     HL,HL
        ADD     HL,HL
        ADD     HL,HL           ; MIN = MIN*8
        EX      DE,HL
        LD      HL,57600D       ; 1200HRS*32*15
        XOR     A
        SBC     HL,DE           ; - MIN
        POP     DE
        XOR     A
        SBC     HL,DE           ; - HOUR
        POP     DE
        XOR     A
        SBC     HL,DE           ; - E
; CONVERT LONGITUDE TO BINARY FORMAT
        RES     6,(IX+STATUS)   ; CLEAR LONGITUDE NEGATIVE BIT
        PUSH    HL              ; SAVE PARTIAL SUM
        LD      HL,(RAM+LONG)
        BIT     0,H
        JR      NZ,LONG1        ; JUMP IF LONGITUDE IS POSITIVE
        SET     6,(IX+STATUS)
LONG1:  LD      H,00H
        CALL    BIN+OFFSET
        LD      DE,51D          ; 8/10*64
        CALL    MULT+OFFSET
        LD      B,4
        CALL    ARS32+OFFSET    ; HL = LONGITUDE*32
        BIT     6,(IX+STATUS)
        JR      Z,LONG2         ; JUMP IF LONGITUDE WAS POSITIVE
        EX      DE,HL
        LD      HL,0000H
        XOR     A
        SBC     HL,DE           ; HL = -DE
LONG2:  EX      DE,HL
        POP     HL              ; RECALL PARTIAL SUM
; RESUME CALCULATION OF HOUR ANGLE
        XOR     A
        SBC     HL,DE           ; - LONG
        LD      B,2
```

```
            CALL    ARS16+OFFSET    ; DIVIDE BY 4
            LD      (RAM+HRANG),HL  ; SAVE HOUR ANGLE
; ALTITUDE = ARCSINE( COS(D)*COS(LAT)*COS(HR) + SIN(LAT)*SIN(D) )
ALTITD:     CALL    CO+OFFSET       ; COS(H)
            PUSH    HL
            LD      HL,(RAM+LATBN)
            CALL    CO+OFFSET       ; COS(L)
            PUSH    HL
            LD      HL,(RAM+DAYBN)
            CALL    DC+OFFSET
            LD      B,2
            CALL    ARS16+OFFSET    ; DIVIDE BY 4
            LD      (RAM+DEC),HL
            CALL    CO+OFFSET
            POP     DE
            CALL    MULT+OFFSET     ; COS(D)*COS(L)
            LD      B,14
            CALL    ARS32+OFFSET    ; ADJUST NUMBER
            POP     DE
            CALL    MULT+OFFSET     ; COS(D)*COS(L)*COS(H)
            LD      B,14
            CALL    ARS32+OFFSET
            PUSH    HL              ; SAVE FIRST TERM
            LD      HL,(RAM+DEC)
            CALL    SI+OFFSET       ; SIN(D)
            PUSH    HL
            LD      HL,(RAM+LATBN)
            CALL    SI+OFFSET
            POP     DE
            CALL    MULT+OFFSET     ; SIN(L)*SIN(D)
            LD      B,14
            CALL    ARS32+OFFSET    ; ADJUST POSITION
            POP     DE
            ADD     HL,DE           ; SIN(B)
            CALL    AS+OFFSET
            LD      B,2
            CALL    ARS16+OFFSET    ; HL=ALTITUDE*32
            BIT     7,H
            JR      Z,AL1           ; JUMP IF ALTITUDE IS POSITIVE
NIGHT:      LD      HL,AZHM32       ; NIGHT TIME ----
            LD      (RAM+DESAZM),HL ; COLLECTOR TO HOME POSITION
            LD      HL,ALHM32
            LD      (RAM+DESALT),HL
            CALL    CALRAT+OFFSET
            RET
AL1:        LD      (RAM+DESALT),HL ; SAVE ALTITUDE
; AZIMUTH = ARCSINE( COS(D)*SIN(HR)*SEC(ALT) )
            LD      HL,(RAM+DESALT)
            CALL    SEC+OFFSET
            PUSH    HL
            LD      HL,(RAM+HRANG)
            CALL    SI+OFFSET
            PUSH    HL              ; SAVE SIN(HR)
            LD      HL,(RAM+DEC)
            CALL    CO+OFFSET       ; COS(D)
            POP     DE
            CALL    MULT+OFFSET     ; COS(D)*SIN(HR)
            LD      B,14
            CALL    ARS32+OFFSET    ; ADJUST POSITION
            POP     DE
            CALL    MULT+OFFSET     ; COS(D)*SIN(HR)*SEC(ALT)
            CALL    SECADJ+OFFSET
            CALL    AS+OFFSET
            PUSH    HL
; USE ARCOSINE FORMULA FOR AZIMUTH IF [AZIMUTH] > 58 DEGREES
            LD      DE,58*128
            XOR     A
            ADC     HL,DE
            JP      M,ARCOS+OFFSET  ; JUMP IF AZIMUTH < -58
            POP     HL
            PUSH    HL
            LD      DE,-58*128
```

```
              XOR       A
              ADC       HL,DE
              JP        M,AZ1+OFFSET      ; JUMP IF AZIMUTH < 58
; AZIMUTH = ARCOS( (SIN(ALT)*SIN(LAT) - SIN(D))*SEC(ALT)*SEC(LAT) )
ARCOS:        CALL      AZMADJ+OFFSET
              PUSH      HL                ; SIN(ALT)*SIN(LAT) - SIN(D)
              LD        HL,(RAM+LATBN)
              ADD       HL,HL
              ADD       HL,HL             ; LAT*32 DEGREES
              CALL      SEC+OFFSET        ; SECANT(LAT)
              POP       DE
              CALL      MULT+OFFSET
              LD        B,12              ; VALID BECAUSE LATITUDE < 78 DEG.
              CALL      ARS32+OFFSET
              PUSH      HL
              LD        HL,(RAM+DESALT)
              CALL      SEC+OFFSET        ; SEC(ALT)
              POP       DE
              CALL      MULT+OFFSET
              CALL      SECADJ+OFFSET
              CALL      AS+OFFSET
; ADJUST AZIMUTH RESULT TO PROPER QUADRANT
              EX        DE,HL
              LD        HL, 90*128
              POP       BC                ; AZIMUTH CALCULATED WITH ARCSINE FORMULA
              BIT       7,B
              JR        Z,AZ3
              LD        HL, -90*128
              ADD       HL,DE
              JR        AZ2
AZ3:          XOR       A
              SBC       HL,DE
AZ2:          LD        B,2
              CALL      ARS16+OFFSET      ; HL=AZIMUTH*32
              LD        (RAM+DESAZM),HL   ; SAVE AZIMUTH
              CALL      CALRAT+OFFSET
              RET
AZ1:          POP       HL
              LD        B,2
              CALL      ARS16+OFFSET
              LD        (RAM+DESAZM),HL
; ADJUST AZIMUTH ANGLE QUADRANT
              CALL      AZMADJ+OFFSET
              JP        P,CALC1+OFFSET
              LD        DE,(RAM+DESAZM)
              BIT       7,D
              JR        Z,AZMPOS
              LD        HL,-180*32
              XOR       A
              SBC       HL,DE
              JR        CALC2
AZMPOS:       LD        HL, 180*32
              XOR       A
              SBC       HL,DE
CALC2:        LD        (RAM+DESAZM),HL
CALC1:        LD        HL,(RAM+DESAZM)
              CALL      CALRAT+OFFSET
              RET
; ROUTINE TO CALCULATE THE STEP RATE DIVIDE FACTOR
CALRAT:  LD        (IX+DIRECT), 10100000B
                        ; SET AZIMUTH TO INCREASE AND ALTITUDE TO INCREASE
; CALCULATE AZIMUTH STEP RATE
              LD        DE,AZHM32+1       ; AZIMUTH HOME POSITION
              LD        HL,(RAM+DESAZM)
              XOR       A
              SBC       HL,DE             ; COMPARE DESIRED AZIMUTH WITH HOME POSITION
              JP        M,CALZ+OFFSET     ; JUMP ON NEGATIVE RESULT
              LD        HL,0000H          ; OTHERWISE, NO AZIMUTH MOVEMENT
                                          ; IS ALLOWED
              JR        CAL3              ; JUMP TO STEP RATE CALCULATION
```

```
CAL7:   LD      DE,(RAM+PREAZM)
        LD      HL,FACT
        CALL    MULT+OFFSET
        LD      B,10
        CALL    ARS32+OFFSET    ; AZM = PREAZM*FACT/1024
        EX      DE,HL
        LD      HL,(RAM+DESAZM)
        XOR     A
        SBC     HL,DE           ; MOVEMENT DURING NEXT MINUTE - DEGREES*32
        JP      P,CAL2+OFFSET
        RES     7,(IX+DIRECT)
        SET     6,(IX+DIRECT)   ; AZIMUTH TO DECREASE
        EX      DE,HL
        LD      HL,0000H
        XOR     A
        SBC     HL,DE           ; HL = -DE
CAL2:   LD      A,H
        CP      06H             ; IF HL > 1536D, REDUCE THE NUMBER OF STEPS
        JP      M,CAL3+OFFSET
        LD      HL,0600H        ; THIS WILL GENERATE A MAXIMUM
                                ; NUMBER OF STEPS WITHOUT OVERFLOW ERROR
CAL3:   LD      DE,AZSTEP
        CALL    MULT+OFFSET     ; NUMBER OF STEPS DURING NEXT MINUTE
        CALL    RATE+OFFSET
        LD      (RAM+AZMRAT),A
; CALCULATE ALTITUDE STEP RATE
        LD      DE,(RAM+PREALT)
        LD      HL,FACT
        CALL    MULT+OFFSET
        LD      B,10
        CALL    ARS32+OFFSET    ; ALT = PREALT*FACT/1024
        EX      DE,HL
        LD      HL,(RAM+DESALT)
        XOR     A
        SBC     HL,DE           ; MOVEMENT DURING NEXT MINUTE - DEGREES*32
        JP      P,CAL1+OFFSET
        RES     5,(IX+DIRECT)
        SET     4,(IX+DIRECT)   ; ALTITUDE TO DECREASE
        EX      DE,HL
        LD      HL,0000H
        XOR     A
        SBC     HL,DE           ; HL = -DE
CAL1:   LD      A,H
        CP      06H             ; IF HL > 1536D, REDUCE THE CHANGE IN ALTITUDE
        JP      M,CAL6+OFFSET
        LD      HL,0600H        ; GENERATE A MAXIMUM NUMBER OF
                                ; STEPS WITHOUT OVERFLOW.
CAL6:   LD      DE,ALSTEP
        CALL    MULT+OFFSET     ; NUMBER OF STEPS DURING NEXT MINUTE
        CALL    RATE +OFFSET
        LD      (RAM+ALTRAT),A
        RET
; HL = HL / 2**B
ARS16:  SRA     H
        RR      L
        DJNZ    ARS16
        RET
; ADJUST RESULTS BASED ON POSITION OF DATA IN SECANT TABLE
SECADJ: PUSH    DE
        PUSH    HL
        LD      B,12
        LD      HL,(RAM+DESALT)
        LD      DE,78*32
        XOR     A
        SBC     HL,DE
        JP      M,AZCON+OFFSET
        LD      B,9
AZCON:  POP     HL
        POP     DE
        CALL    ARS32+OFFSET
        RET
; CALCULATE SIN(ALT)*SIN(LAT) - SIN(D)
```

```
AZMADJ:  LD      HL,(RAM+DESALT)
         LD      B,2
         CALL    ARS16+OFFSET
         CALL    SI+OFFSET
         PUSH    HL              ; SIN(ALT)
         LD      HL,(RAM+LATBN)
         CALL    SI+OFFSET       ; SIN(LAT)
         POP     DE
         CALL    MULT+OFFSET
         LD      B,14
         CALL    ARS32+OFFSET
         PUSH    HL
         LD      HL,(RAM+DEC)
         CALL    SI+OFFSET       ; SIN(D)
         EX      DE,HL
         POP     HL
         XOR     A
         SBC     HL,DE
         RET
; UNSIGNED BCD TO BINARY ROUTINE
; HL(HEX) = HL(BCD)
; LOWER 3 NIBBLES OF HL ARE CONVERTED
BIN:     LD      C,3             ; NUMBER OF NIBBLES
         LD      DE,0000H        ; CLEAR REGISTERS
BIN1:    LD      A,0FH
         AND     A,L             ; MASK LOWEST NIBBLE
         LD      E,A
         PUSH    DE              ; SAVE NIBBLE
         LD      B,4
         CALL    ARS16+OFFSET    ; RIGHT JUSTIFY DATA
         DEC     C
         JR      NZ,BIN1
         POP     DE
         LD      HL,100D
         CALL    MULT+OFFSET
         POP     DE              ; RECALL 2ND DIGIT
         PUSH    HL              ; SAVE PARTIAL SUM
         LD      HL,10
         CALL    MULT+OFFSET
         POP     BC              ; RECALL PARTIAL SUM
         ADD     HL,BC
         POP     DE              ; RECALL 1ST DIGIT
         ADD     HL,DE
         RET
; 16 BIT STEP RATE DIVIDE ROUTINE
; ON ENTRANCE, HL CONTAINS THE NUMBER OF MOTOR STEPS WHICH
; ARE TO OCCUR IN THE NEXT MINUTE.
; A = TMBASE / HL
RATE:    EX      DE,HL
         LD      HL,TMBASE       ; PULSE/MINUTE OF TIME BASE
         XOR     A
RATE1:   SBC     HL,DE
         INC     A
         RET     C               ; RETURN IF DIVISION BY SUBTRACTION IS COMPLETE
         RET     Z               ; RETURN IF RESULT > 255
         JR      RATE1
; COMPUTE NEWTON'S FORWARD INTERPOLATION
; F(X) = F(0) + (X-X(0))*DL0/H + (X-X(0))*(X-X(1))*DL20/(2*H**2)
; ENTER ---
;        DE      POINTER TO FUNCTION TABLE
;        HL      RIGHT JUSTIFIED DATA
; RETURN ---
;        HL      INTERPOLATED FUNCTION
; RELATIVE ADDRESS LOCATIONS
X:       EQU     10H
FX:      EQU     12H
DL0:     EQU     14H
DL1:     EQU     16H
DL20:    EQU     18H
MULT1:   EQU     1AH
MULT2:   EQU     1CH
```

```
ADD1:    EQU      1EH
ADD2:    EQU      20H
HEXP:    EQU      22H
MASK:    EQU      23H
; INITILIZATION ROUTINE FOR INTERPOLATION OF DECLINATION
; DATA IS SPECIFIED AT 16 DAY INTERVALS
; RESULT IS EXPRESSED IN DEGREES*32
DC:      LD       DE,DECL+OFFSET
         LD       (IX+MASK),0FH
         LD       (IX+HEXP),4
         CALL     INTERP+OFFSET
         RET
; INITILIZATION ROUTINE FOR INTERPOLATION OF E OF TIME
; DATA IS SPECIFIED AT 16 DAY INTERVALS
; RESULT IS EXPRESSED IN DEGREES*32
ET:      LD       DE,EOFT+OFFSET
         LD       (IX+MASK),0FH
         LD       (IX+HEXP),4
         CALL     INTERP+OFFSET
         RET
; INITILIZATION ROUTINE FOR INTERPOLATION OF SINE FUNCTION
; DATA IS SPECIDIED AT 8 DEGREE INTERVALS
; RESOLUTION OF X MUST BE DEGREES*8
; RESULT IS EXPRESSED IN SIN(X)*16,384
SI:      RES      5,(IX+STATUS)
         BIT      7,H
         JR       Z,SICONT         ; JUMP IF DATA IS POSITIVE
         SET      5,(IX+STATUS)    ; SET FLAG FOR NEGATIVE SINE
         EX       DE,HL
         LD       HL,0000H
         XOR      A
         SBC      HL,DE            ; CONVERT TO POSITIVE NUMBER
SICONT:  LD       DE,SINE+OFFSET
         LD       (IX+MASK),3FH
         LD       (IX+HEXP),6H
         CALL     INTERP+OFFSET
         BIT      5,(IX+STATUS)
         JR       Z,SIRTN          ; JUMP IF DATA WAS POSITIVE
         EX       DE,HL
         LD       HL,0000H
         XOR      A
         SBC      HL,DE            ; HL = -(RESULT)
SIRTN:   RET
; INITILIZATION ROUTINE FOR INTERPOLATION OF COSINE FUNCTION
CO:      LD       DE,720D          ; COS(X) = SIN(X+90*8)
         ADD      HL,DE
         CALL     SI+OFFSET
         RET
; INITILIZATION  ROUTINE FOR INTERPOLATION OF ARCSINE FUNCTION
; DATA IS SPECIFIED AT INTERVALS OF 256
; RESOLUTION OF X MUST BE SIN(X)*16,384
; RESULT IS EXPRESSED IN DEGREES*128
AS:      RES      5,(IX+STATUS)
         BIT      7,H
         JR       Z,ASCONT         ; JUMP IF DATA IS POSITIVE
         SET      5,(IX+STATUS)
         EX       DE,HL
         LD       HL,0000H
         XOR      A
         SBC      HL,DE            ; CONVERT TO A POSITIVE NUMBER
ASCONT:  LD       DE,ARSINE+OFFSET
         LD       (IX+MASK),0FFH
         LD       (IX+HEXP),8
; DATA SPACING OF 128 IF X > 9472
         LD       BC,15616D
         PUSH     HL
         XOR      A
         SBC      HL,BC
         BIT      7,H
         JR       NZ,AS1
         LD       (IX+MASK),3FH
         LD       (IX+HEXP),6
         LD       DE,ARSINE+OFFSET-360D    ; SHIFT TABLE POINTER
```

```
AS1:      POP       HL
          CALL      INTERP+OFFSET
          BIT       5,(IX+STATUS)
          JR        Z,ASRTN   ; JUMP IF DATA WAS POSITIVE
          EX        DE,HL
          LD        HL,0000H
          XOR       A
          SBC       HL,DE     ; HL = -(RESULT)
ASRTN:    RET
; INITILIZATION ROUTINE FOR INTERPOLATION OF SECANT FUNCTION
; DATA IS SPECIFIED AT 2 DEGREE INTERVALS
; RESOLUTION OF X MUST BE DEGREE*32
; RESULT IS EXPRESSED IN SECANT(X)*4096
; OR SECANT(X)*1024 IF X > 78 DEGREES
SEC:      LD        DE,78*32
          PUSH      HL
          XOR       A
          SBC       HL,DE
          LD        DE,SECANT+OFFSET
          JP        M,SECON+OFFSET
          LD        DE,SECANT+OFFSET+6
SECON:    POP       HL
          LD        (IX+MASK),3FH
          LD        (IX+HEXP),6H
          CALL      INTERP+OFFSET
          RET
; START OF INTERPOLATION
INTERP:   PUSH      DE                  ; SAVE TABLE BASE ADDRESS
          LD        (RAM+X),HL          ; SAVE DATA
; THE ABCISSA SPACING IS A POWER OF 2
; THE INTERVAL WHICH X FALLS IN CAN BE FOUND BY
; DIVIDING X BY THE ABCISSA SPACING.
          LD        B,(IX+HEXP)         ; USE MSB'S AS INDEX
          LD        DE,0
          CALL      ARS32+OFFSET
; INDEX IS MULTIPLIED BY 2 FOR ADDRESSING A
; DOUBLE PRECISION TABLE
          ADD       HL,HL               ; HL = HL*2
          POP       DE
; TABLE POINTER = TABLE BASE ADDRESS + INDEX
          ADD       HL,DE
; FIND F(0) AND F(1)
          LD        E,(HL)              ; GET F(0) - 2 CONSECUTIVE BYTES
          INC       HL                  ; DE REGISTER PAIR = F(0)
          LD        D,(HL)
          INC       HL
          LD        C,(HL)              ; GET F(1)
          INC       HL                  ; BC REGISTER PAIR = F(1)
          LD        B,(HL)
          INC       HL
; SAVE TABLE POINTER
          PUSH      HL
          EX        DE,HL
; OUTPUT RESULT IS INITIALIZED TO THE FIRST TERM OF FORMULA
          LD        (RAM+FX),HL         ; INITIALIZE RESULT=F(0)
; COMPUTE FIRST DIFFERENCES (DL0 AND DL1)
          EX        DE,HL     ; DE = F(0)
          LD        L,C       ; HL = F(1)
          XOR       A
          LD        H,B
          SBC       HL,DE     ; F(1) - F(0)
          LD        (RAM+DL0),HL        ; SAVE 1ST DIFFERENCE
; UNSTACK TABLE POINTER
          POP       HL
          LD        E,C
          LD        D,B       ; DE = F(1)
          LD        C,(HL)    ; HL = F(2)
          INC       HL
          LD        H,(HL)
          XOR       A
          LD        L,C
          SBC       HL,DE     ; HL=F(2) - F(1)
          LD        (RAM+DL1),HL        ; SAVE 1ST DIFFERENCE
```

```
; COMPUTE SECOND DIFFERENCE (DL1 - DL0)
        EX      DE,HL
        LD      HL,(RAM+DL0)
        EX      DE,HL           ; HL = DL1
        XOR     A
        SBC     HL,DE           ; DL1 - DL0
        LD      (RAM+DL20),HL   ; SAVE 2ND DIFFERENCE
; COMPUTE SECOND TERM OF FORMULA - (X-X(0))*DL0/(2**HEXP)
        LD      HL,(RAM+X)      ; GET X
        LD      A,L             ; X-X(0) IS CALCULATED BY STRIPPING THE
        AND     (IX+MASK)       ; MOST SIG BITS (VALID BECAUSE THE
        LD      E,A             ; ABCISSA SPACING IS A POWER OF 2)
        LD      D,0             ; DE = (X-X(0))
        LD      HL,(RAM+DL0)
        CALL    MULT+OFFSET     ; (X-X(0))*DL0
; DIVISION BY H IS DONE WITH RIGHT SHIFT
        LD      B,(IX+HEXP)
        CALL    ARS32+OFFSET    ; HL=(X-X(0))*DL0/(2**HEXP)
; FX = FX + SECOND TERM
        EX      DE,HL
        LD      HL,(RAM+FX)     ; ACCUMULATE TERMS
        ADD     HL,DE
        LD      (RAM+FX),HL
; COMPUTE THIRD TERM OF FORMULA
        LD      DE,(RAM+X)      ; LOAD DATA POINT
        LD      D,0FFH
        LD      A,(IX+MASK)
        CPL
        OR      E
        LD      E,A             ; DE = X - X(1)
        LD      HL,(RAM+X)
        LD      A,L
        AND     (IX+MASK)
        LD      L,A
        LD      H,0             ; HL = (X-X(0))
        CALL    MULT+OFFSET     ; HL = (X-X(0)*(X-X(1))
        LD      DE,(RAM+DL20)
        CALL    MULT+OFFSET     ; HL = (X-X(1))*(X-X(0))*DL20
        LD      B,(IX+HEXP)
        SLA     B
        INC     B               ; B=HEXP*2+1
        CALL    ARS32+OFFSET    ; HL = HL/(2*H**2)
        LD      DE,(RAM+FX)     ; ACCUMULATE LAST TERM
        ADD     HL,DE
        RET
; THIS ROUTINE WILL SHIFT A FOUR BYTE NUMBER TO THE RIGHT.
; ON ENTRANCE
;       DEHL CONTAINS THE NUMBER
;       B CONTAINS THE NUMBER OF SHIFT OPERATIONS TO BE PERFORMED.
; ON EXIT
;       DEHL CONTAINS THE SHIFTED NUMBER.
ARS32:  SRA     D
        RR      E
        RR      H
        RR      L
        DJNZ    ARS32           ; REPEAT IF MORE SHIFTS ARE TO BE DONE
        RET
; SIXTEEN BIT INTEGER MULTIPLY.
;       ON ENTRANCE: MULTIPLIER IN HL.
;                    MULTIPLICAND IN DE.
;       ON EXIT: RESULT IN DEHL.
MULT:   LD      B,32            ; NUMBER OF BITS
        LD      A,H
        LD      C,L             ; MOVE MULTIPLIER TO BC
        EX      DE,HL           ; MOVE MULTIPLICAND TO HL
        LD      DE,00           ; CLEAR UPPER BYTE OF MULTIPLICAND
        LD      (RAM+ADD1),DE
        LD      (RAM+ADD2),DE   ; CLEAR PARTIAL RESULT
        BIT     7,H
        JR      Z,MLOOP         ; JUMP IF MULTIPLICAND IS POSITIVE
        LD      DE,0FFFFH       ; MAKE UPPER BYTE OF MULTIPLICAND
                                ; NEGATIVE
```

```
MLOOP:  SRA     A
        RR      C               ; SHIFT MULTIPLIER RIGHT
        LD      (RAM+MULT1),DE
        LD      (RAM+MULT2),HL  ; SAVE MULTIPLICAND
        JR      NC,NOADD
        CALL    ADD32+OFFSET
        LD      (RAM+ADD1),HL
        LD      (RAM+ADD2),DE   ; SAVE PARTIAL RESULT
NOADD:  LD      DE,(RAM+MULT1)
        LD      HL,(RAM+MULT2)  ; RECALL MULTIPLICAND
        CALL    ALS32+OFFSET    ; SHIFT MULTIPLIER LEFT
        DJNZ    MLOOP
        LD      HL,(RAM+ADD1)
        LD      DE,(RAM+ADD2)   ; PUT RESULT IN DEHL
        RET
; THIS ROUTINE WILL SHIFT A FOUR BYTE NUMBER TO THE LEFT ONE BIT.
; DEHL = DEHL*2
ALS32:  ADD     HL,HL
        EX      DE,HL
        ADC     HL,HL
        EX      DE,HL
        RET
; THIS ROUTINE ADDS TWO FOUR BYTE NUMBERS.
; ON ENTRANCE   DEHL CONTAINS ONE NUMBER
;               ADD2 AND ADD1 CONTAIN THE OTHER NUMBER
; ON EXIT       DEHL CONTAINS THE SUM
ADD32:  PUSH    BC              ; SAVE BC
        LD      BC,(RAM+ADD1)   ; RETRIEVE LOWER TWO BYTES
        ADD     HL,BC
        EX      DE,HL           ; POSTION UPPER TWO BYTES
        LD      BC,(RAM+ADD2)   ; RETRIEVE UPPER TWO BYTES
        ADC     HL,BC
        EX      DE,HL           ; REPOSITION BYTES
        POP     BC
        RET
; DATA STORAGE FOR DECLINATION
; FIRST DATA IS FOR THE ZERO DAY OF THE YEAR (366TH DAY)
DECL:   DW      -740, -674, -553, -390, -201, 0, 199, 384
        DW      541, 661, 732, 749, 710, 619, 485, 318, 129
        DW      -69, -265, -445, -595, -700, -748, -732, -655
; DATA STORAGE FOR E OF TIME
; FIRST DATA IS FOR THE ZERO DAY OF THE YEAR (366TH DAY)
EOFT:   DW      -21, -76, -108, -113, -94, -60, -21, 11, 28
        DW      27, 8, -19, -43, -52, -41, -12, 30, 75, 112
        DW      131, 123, 87, 30, -34, -84
; DATA STORAGE FOR SINE FUNCTION FROM 0 TO 280 DEGREES.
SINE:   DW      0000, 2280, 4516, 6664, 8682, 10531
        DW      12175, 13582, 14726, 15582, 16135, 16374
        DW      16294, 15897, 15191, 14189, 12911, 11381
        DW      9630, 7692, 5604, 3406, 1143, -1143, -3406
        DW      -5604, -7692, -9630, -11381, -12911, -14189
        DW      -15191, -15897, -16294, -16374, -16135
; DATA STORAGE FOR ARCSINE FUNCTION FROM 0.0000 TO 1.0000
ARSINE: DW      0, 115, 229, 344, 459, 574, 689, 804, 919
        DW      1035, 1151, 1267, 1383, 1500, 1617, 1735, 1853
        DW      1972, 2091, 2211, 2331, 2452, 2574, 2696, 2819
        DW      2943, 3068, 3194, 3321, 3449, 3578, 3708, 3840
        DW      3973, 4108, 4244, 4381, 4521, 4662, 4806, 4951
        DW      5099, 5250, 5403, 5559, 5719, 5882, 6049, 6220
        DW      6395, 6576, 6763, 6956, 7156, 7365, 7584, 7814
        DW      8058, 8319, 8602, 8913, 9266, 9682, 10222
        DW      9266, 9362, 9463, 9570, 9682, 9801, 9929, 10069
        DW      10222, 10396, 10603, 10872, 11520, 12800, 12800
; DATA STORAGE FOR SECANT FUNCTION FROM 0.0 TO 90.0 DEGREES
SECANT: DW      4096, 4098, 4106, 4119, 4136, 4159, 4188, 4221
        DW      4261, 4307, 4359, 4418, 4484, 4557, 4639, 4730
        DW      4830, 4941, 5063, 5198, 5347, 5512, 5694, 5896
        DW      6121, 6372, 6653, 6969, 7325, 7729, 8192, 8725
        DW      9344, 10070, 10934, 11976, 13255, 14860, 16931
        DW      19701, 23588, 29431, 2463, 2948, 3679, 4898, 7340
        DW      14670, 32000, 32000
        END     START
```

We claim:

1. A controller for controlling the drive system of a solar energy utilizing device to keep said device directed at the sun as the sun traverses the sky, said drive system including motor means for turning said device about first and second axes, respectively, said controller comprising:

central processor means and means for storing a program for controlling the functions of said processor means, memory means for storing first positional data representative of the present angular positions of said device about said first and second axes, means for providing data representative of the day of the year, the time of said day and data corresponding to the latitude and longitude at which said device is used, said program controlling said processor means to use said data to produce second positional data representative of the required angular positions of said device about said first and second axes at the end of a predetermined interval for said device to be directed toward the sun, said program further controlling said processor to determine data representative of the amount of movement required for said solar energy utilizing device to move about said axes to said required angular positions, said program further controlling said processor to modify said first positional data to the new values resulting from movement of said device about said axes, and means responding to said data representative of said amount of movement by controlling said motor means to turn said device about said axes toward an angular position corresponding with said second positional data.

2. A controller for causing a solar energy utilizing device, which has motor means for angulating it about first and second axes, to be directed toward the sun as the sun moves across the sky, said controller comprising:

means for providing data representative of the time of the day, the day of the year and the latitude at which said device is used, processor means and means for storing a program for controlling the functions of said processor means, memory means for storing first positional data representative of the angular positions of said device about said first and second axes at the prevailing time, said processor means being controlled by said program to use said data to calculate second positional data representative of the angular positions to which said device is required to be angulated about said axes for said device to be directed toward the sun at the end of a predetermined interval beginning with the prevailing time, said program further controlling said processor to calculate data representative of the amount of movement required for said solar energy utilizing device to move about said axes to said required angular positions, said program further controlling said processor to modify said first positional data for it to represent the positional data resulting from movement of said device about said axes, and means responding to said data representative of said amount of movement by controlling said motor means to turn said device about said axes toward an angular position corresponding with said second positional data.

3. The controller as in any of claims 1 or 2 wherein said means for providing data representative of the time of the day provides the data in terms of the hour of the day and the minute of said hour.

4. A controller for causing a solar energy utilizing device, which has motor means for angulating it about its azimuth and altitude axes, to be directed toward the sun, said controller comprising:

processor means and memory means for storing a program for controlling the functions of said processor means means operative to produce time data representative of the present day of the year, the hour in said day and the minute in said hour, respectively, display means and means for controlling said display means to display the numbers for said day, hour and minute in correspondence with the time data, means for producing location data corresponding with the longitude and latitude, respectively, of the location where said solar energy device is used, memory means for storing first positional data representative of the present angular positions of said device about said azimuth and altitude axes, said processor means being programmed to use said time and location data to calculate repeatedly second positional data representative of the required angular positions of said device about said azimuth and altitude axes for said device to be directed at the sun at the end of a predetermined interval beginning with the prevailing time, said program further controlling said processor to determine data representative of the amount of movement required for said device to move about said altitude and azimuth axes to said required angular positions, said program further controlling said processor to modify said first positional data to the new instantaneous data values resulting from movement of said device about said axes, and means responding to said data representative of said amount of movement by controlling said motor means to turn said device about said axes toward an angular position corresponding with said second positional data.

5. A controller for use with a solar energy utilizing device which has means supporting it for turning about an altitude axis through a range of altitude angles and for turning about an azimuth axis which is orthogonal to said altitude axis through a range of azimuth angles to enable said device to be directed toward the sun as the sun moves across the sky, said device including reversible azimuth axis drive motor means and reversible altitude axis drive motor means, said controller being operative in an open loop mode and comprising:

central processor means including memory means for storing program data for controlling said processor means and for storing data, means for entering time data into said memory means representative of the present day of the year, the hour in said day, the minute in said hour and location data representative of the longitude and latitude at which said device is used, time base means for producing a continuous train of clock pulses, means responding to said clock pulses by repeatedly incrementing said time data to maintain it in correspondence with current day and time of the day, said program controlling said processor to use said time and location data to produce data representative of the azimuth and altitude angles at which said device should be disposed for it to be directed at the sun at the end of a predetermined interval beginning with the present time, said program further controlling said processor to determine data representative of the rate at which said device must turn about said altitude and azimuth axes for said device to be directed at the sun at the end of said predetermined interval, and control means responding to said rate represented by said determined data by controlling said motor means to run at a rate that will turn said solar energy utilizing device on its axes at a rate which will cause it to be directed at the sun during the interval.

6. A controller for controlling the drive system of a solar energy utilizing device to keep said device directed at the sun as the sun traverses the sky, said drive system including motor means for turning said device about first and second axes, respectively, said controller comprising:

central processor means and means for storing a program for controlling the functions of said processor means, memory means for storing first positional data representative of the present angular positions of said device about said first and second axes, means for providing data representative of the day of the year, the time of said day and data corresponding to the latitude and longitude at which said device is used, said program controlling said processor means to use said data to produce second positional data representative of the required angular positions of said device about said first and second axes at the end of a predetermined interval for said device to be directed toward the sun, said program further controlling said processor to determine data representative of the amount of movement required for said solar energy utilizing device to move about said axes to said required angular positions, said program further controlling said processor to modify said first positional data to the new instantaneous values resulting from movement of said device about said axes, and means responding to said data representative of said amount of movement by controlling said motor means to turn said device about said axes toward an angular position corresponding with said second positional data, manually operable reset switch means operable to cause said processor to produce data for causing said solar energy utilizing device to turn under the influence of said motor means on its azimuth and altitude axes until it reaches home position wherein the azimuth angle of said device is the maximum permissible angle in the easterly direction from the meridian and the altitude angle of said device is substantially 0° from the vertical, limit switch means operable in response to said device reaching its azimuth and altitude home positions, operation of said limit switch means being detected by said processor means to enable it to calculate the azimuth and altitude angles which said device should attain to be directed toward the sun at the prevailing time between sunrise and sunset.

7. A controller for controlling the drive system of a solar energy utilizing device to keep said device directed at the sun as the sun traverses the sky, said drive system including motor means for turning said device about first and second axes, respectively, said controller comprising:

central processor means and means for storing a program for controlling the functions of said processor means, memory means for storing first positional data representative of the present angular positions of said device about said first and second axes, means for providing data representative of the day of the year, the time of said day and data corresponding to the latitude and longitude at which said device is used, said program controlling said processor means to use said data to produce second positional data representative of the required angular positions of said device about said first and second axes at the end of a predetermined interval for said device to be directed toward the sun, said program further controlling said processor to determine data representative of the amount of movement required for said solar energy utilizing device to move about said axes to said required angular positions, said program further controlling said processor to modify said first positional data to the new values resulting from movement of said device about said axes, means responding to said data representative of said amount of movement by controlling said motor means to turn said device about said axes toward an angular position corresponding with said second positional data, said axes being azimuth and altitude axes, respectively, and said device being turnable about its azimuth and alitude axes to home position wherein the azimuth angle of said device is the maximum permissible angle in the easterly direction from the meridian and the altitude angle of said device is substantially 0° from vertical, said processor means being programmed to cause said motor means to drive said solar energy utilizing device to home position after sunset following said device having reached its westernmost azimuth angle from the meridian for the current day.

8. A controller for controlling the drive system of a solar energy utilizing device to keep said device directed at the sun as the sun traverses the sky, said drive system including motor means for turning said device about first and second axes, respectively, said controller comprising:

central processor means and means for storing a program for controlling the functions of said processor means, memory means for storing first positional data representative of the present angular positions of said device about said first and second axes, means for providing data representative of the day of the year, the time of said day and data corresponding to the latitude and longitude at which said device is used, said program controlling said processor means to use said data to produce second positional data representative of the required angular positions of said device about said first and second axes at the end of a predetermined interval for said device to be directed toward the sun, said program further controlling said processor to determined data representative of the amount of movement required for said solar energy utilizing device to move about said axes to said required angular positions, said program further controlling said processor to modify said first positional data to the new values resulting from movement of said device about said axes, means responding to said data representative of said amount of movement by controlling said motor means to turn said device about said axes toward an angular position corresponding with said second positional data, said controller being adapted for cooperating at relatively low latitude locations with a solar energy device that conducts fluid in conduit means which have upper and lower ends that must be maintained in relatively upper and lower positions with said lower end being trailing on the eastern side of said device and said upper end being leading on the western side of said device up to about solar noon and said ends being reversed after noon and the plane of said device being substantially horizontal around noon while its altitude angle is substantially 90° from horizontal, said axes being azimuth and altitude axes, respectively, said data produced by said processor which is representative of the angular positions of said device about said azimuth and altitude axes being such as to result in said device being turned mostly about its altitude axis before and after noon and almost exclusively about its azimuth axis in the vicinity of noon to result in said ends being reversed.

9. A controller for use with a solar energy utilizing device which has means supporting it for turning about an altitude axis through a range of altitude angles and for turning about an azimuth axis which is orthogonal to said altitude axis through a range of azimuth angles to enable said device to be directed toward the sun as the sun moves across the sky, said device including reversible azimuth axis drive motor means and reversible altitude axis drive motor means, said controller being operative in an open loop mode and comprising:

central processor means including first memory means for storing program data for controlling said processor means and second memory means for storing data, means for entering time data into said memory means representative of the present day of the year, the hour in said day, the minute in said hour and location data representative of the longitude and latitude at which said device is used, said program controlling said processor to use said time and location data to produce data representative of the azimuth and altitude angles at which said device should be disposed for it to be directed at the sun at the end of a predetermined interval beginning with the present time, said program further controlling said processor to determine data representative of the amount which said device must turn about said azimuth and altitude axes for said device to be directed at the sun at the end of said predetermined interval, control means responding to said amount represented by said determined data by controlling said motor means to run at a rate that will turn said solar energy utilizing device on its axis at a rate which will cause it to be directed at the sun at least by the end of said interval, said means for supporting said solar energy device for turning comprising a first shaft journaled for rotation about the vertical azimuth axis, said azimuth axis drive motor being operatively coupled to said first shaft, a second shaft coaxial with said first shaft, said altitude axis drive motor being mounted to said first shaft for swinging therewith and being operatively coupled with said second shaft, a member mounted to said first shaft for swinging in a horizontal plane when said first shaft turns about its vertical axis, cross shaft means journaled in said member and operatively coupled with said second shaft for being turned about a horizontally disposed altitude axis, said solar energy device being mounted to said cross shaft means for rotation therewith.

10. A controller for keeping a solar energy utilizing device directed toward the sun day after day as the sun traverses the sky regardless of whether the sun is obscured by clouds, comprising:

means for supporting a solar energy device for it to angulate about a first axis so it can follow the east to west component of the motion of the sun and for it to be set at an angle about a second axis so it can follow the altitude component of the motion of the sun, stepping type motors operative to angulate said device about its first and second axes, respectively, motor controller means having output means for supplying first types of signals independently to said motors to cause them to run clockwise (cw) and second types of signals to cause them to run counterclockwise (ccw), said motor controller means having input means for motor direction determining signals and for motor step command pulses corresponding with the number of motor steps to be taken, central processor means including memory means for storing data for a program and for storing operating data, said program controlling the functions of said processor means, means for inputting time data to said processor means representative of the day of the year, the hour of said day and the minute in said hour and for inputting location data representative of the latitude and longitude of the place where said solar energy device is used, time base means for producing a continuous train of timing pulses, counter means operative to count said timing pulses and produce interrupt signals at regular intervals, said processor means responding to certain ones of said interrupt signals by executing a part of the program which results in use of said time and location data to produce data representative of the angles to which said device should be turned on said axes within a predetermined interval to be directed toward the sun, means for using said data representative of said angles to determine the number of step command pulses that will be sent to said motor controller within said interval, and means responding to whether the angle data requires clockwise or counterclockwise rotation of said motors, respectively, by supplying the proper motor direction control signals to said motor controller.

11. The invention set forth in claim 10 wherein when said processor has calculated data corresponding with the azimuth and altitude angles at which said device is disposed at sunset said processor then provides signals for actuating said motor controller to cause said motors to drive said device about its azimuth and altitude axis until said device is restored to home position corresponding generally with the angles of said axes at sunrise, and limit switch means responsive, respectively, to said device reaching its azimuth and altitude axes home positions by causing said respective motors to stop.

12. An open loop controller for use with a solar energy utilizing device comprising means for mounting said device for angulating on azimuth and altitude axes to keep said device directed toward the sun as it moves across the sky, azimuth and altitude drive motor means for turning said device on said axes, respectively, said controller comprising:

central processor means including memory means, said memory means storing data corresponding with the declination of the sun for the day, the hour angle of the sun, the longitude at which said device is installed and the latitude at which said device is installed, said processor means having a program stored in said memory means for using said data to calculate data representative of the azimuth and altitude axes angles required for said device to be directed toward the sun at the prevailing time of the day, said memory means also storing positional data representative of the present angular positions of said device about said azimuth and azimuth axes, said program controlling said processor means to produce second positional data representative of the required angular positions of said device about said azimuth and altitude axes at the end of a predetermined interval for said device to be directed toward the sun, said program further controlling said processor means to determine data representative of the rate of movement required for said solar energy utilizing device to move about said axes to said required angular positions, said program further controlling said processor means to modify said first positional data to the new instantaneous values resulting from movement of said device about said axes at the rate of movement which has been determined, and means responding to said data representative of said rate of movement by controlling said motor means to turn said device about said azimuth and altitude axes toward an angular position corresponding with said second positional data.

13. The controller as in claim 12 wherein;

said data corresponding with declination of the sun stored in said memory means is a table of data corresponding with the declination of the sun on predetermined equally spaced days in the year, and said processor means is programmed to interpolate said declination data to determine the more exact declination angle to be used for calculating said azimuth and altitude axes angles for the present time of the day.

14. An open loop controller for use with a solar energy utilizing device comprising means for mounting said device for angulating on azimuth and altitude axes to keep said device directed toward the sun as it moves across the sky, azimuth and altitude drive motor means for turning said device on said axes, respectively, said controller comprising:

central processor means including memory means, said memory means storing data corresponding with the declination of the sun for the day, the hour angle of the sun, the longitude at whch said device is installed and the latitude at which said device is installed, said processor means having a program stored in said memory means for using said data to calculate data representative of the azimuth and altitude axes angles required for said device to be directed toward the sun at the prevailing time of the day, said memory means also storing positional data representative of the present angular positions of said device about said azimuth and altitude axes, said program controlling said processor means to produce second positional data representative of the required angular positions of said device about said azimuth and altitude axes at the end of a predetermined interval for said device to be directed toward the sun, said program further controlling said processor means to determine data representative of the rate of movement required for said solar energy utilizing device to move about said axes to said required angular positions, said program further controlling said processor means to modify said first positional data to the new instantaneous values resulting from movement of said device about said axes at the rate of movement which has been determined, and means responding to said data representative of said rate of movement by controlling said motor means to turn said device about said azimuth and altitude axes toward an angular position corresponding with said second positional data, said azimuth and altitude drive motors being stepping motors having input means and being responsive, respectively, to input of phased trains of electric pulses by angulating said device on its azimuth and altitude axes by an amount corresponding with the number of pulses and in a direction corresponding with the phase of the pulse trains, motor controllers, respectively, for said azimuth and altitude drive motors having input and output means, said output means being coupled to the input means of said motors, said input means of said motor controller being for receiving pulses which cause said motors to step and said input means also being for receiving alternate pulses which cause said motor controllers to determine the durection in which said motors step to angulate said device on its respective axes, means responsive to said processor means calculating said data representative of the rate of movement of said device about said azimuth and altitude axes by providing direction determining pulses and pulses corresponding in rate with the rate at which said motors must be stepped for said device to be moved to said required angular position.

15. The controller as in claim 14 including a plurality of said solar energy devices each having an azimuth axis drive motor and an altitude drive motor, said motor control means controlling the respective azimuth and altitude motors to drive simultaneously in correspondence with each other.

16. The solar energy device controller as in any of claims 4, 5, 9, 12, 13, 14 or 15 wherein said central processor means is programmed to calculate data representing said azimuth and altitude axes angles based on evaluating the following equations at regular short intervals:

1. $\sin(B) = \cos(L) \times \cos(D) \times \cos(H) + \sin(L) \times \sin(D)$ for the altitude axes angle, and at least one of,
2. $\sin(\phi) = \cos(D) \times \sin(H)/\cos(B)$, and
3. $\cos(\phi) = [\sin(B) \times \sin(L) - \sin(D)]/\cos(B) \times \cos(L)$ where: B is the altitude angle of said device from horizontal; $\phi$ is the azimuth angle from due south; L is the latitude of the installation; D is the declination of the sun for a particular day; and, H is the hour angle expressed in terms of minutes from noon, said processor means being programmed to determine the arcsine of the angle B which corresponds with the data for the altitude axis angle and to determine alternately one of the arcsine of $\phi$ and the arccosine of $\phi$ which correspond, respectively, with the data for the azimuth axis angle to which said device must be angulated to be directed toward the sun.

* * * * *